(12) United States Patent
Murakami et al.

(10) Patent No.: US 12,534,431 B2
(45) Date of Patent: Jan. 27, 2026

(54) METHOD OF PRODUCING THIOURETHANE RESIN RAW MATERIAL AND APPLICATION THEREOF, METHOD OF PRODUCING POLYTHIOL COMPOSITION AND APPLICATION THEREOF, AND POLYTHIOL COMPOSITION

(71) Applicant: MITSUI CHEMICALS, INC., Tokyo (JP)

(72) Inventors: Masakazu Murakami, Omuta (JP); Shotaro Nakano, Omuta (JP); Shinnosuke Nakai, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 653 days.

(21) Appl. No.: 17/793,773

(22) PCT Filed: Feb. 5, 2021

(86) PCT No.: PCT/JP2021/004360
§ 371 (c)(1),
(2) Date: Jul. 19, 2022

(87) PCT Pub. No.: WO2021/157701
PCT Pub. Date: Aug. 12, 2021

(65) Prior Publication Data
US 2023/0088165 A1    Mar. 23, 2023

(30) Foreign Application Priority Data

| Feb. 5, 2020 | (JP) | 2020-017717 |
| Feb. 5, 2020 | (JP) | 2020-017718 |
| May 18, 2020 | (JP) | 2020-086644 |
| May 18, 2020 | (JP) | 2020-086645 |
| Nov. 19, 2020 | (JP) | 2020-192461 |

(51) Int. Cl.

| C08G 18/83 | (2006.01) |
| C07C 209/62 | (2006.01) |
| C07C 211/27 | (2006.01) |
| C07C 263/10 | (2006.01) |
| C07C 265/08 | (2006.01) |
| C07C 273/02 | (2006.01) |
| C07C 319/02 | (2006.01) |
| C07C 319/20 | (2006.01) |
| C07C 319/22 | (2006.01) |
| C07C 321/14 | (2006.01) |
| C07C 323/64 | (2006.01) |
| C08G 18/28 | (2006.01) |
| C08G 18/32 | (2006.01) |
| C08G 18/38 | (2006.01) |
| C08G 18/76 | (2006.01) |
| C08L 75/04 | (2006.01) |
| C09D 175/04 | (2006.01) |
| G02B 1/04 | (2006.01) |
| G02B 3/00 | (2006.01) |
| G02C 7/02 | (2006.01) |
| C07C 217/02 | (2006.01) |
| G02B 1/00 | (2006.01) |

(52) U.S. Cl.
CPC .......... C07C 319/22 (2013.01); C07C 209/62 (2013.01); C07C 211/27 (2013.01); C07C 263/10 (2013.01); C07C 265/08 (2013.01); C07C 273/02 (2013.01); C07C 319/02 (2013.01); C07C 319/20 (2013.01); C07C 321/14 (2013.01); C07C 323/64 (2013.01); C08G 18/2865 (2013.01); C08G 18/3228 (2013.01); C08G 18/3271 (2013.01); C08G 18/3855 (2013.01); C08G 18/3876 (2013.01); C08G 18/7642 (2013.01); C08G 18/833 (2013.01); C09D 175/04 (2013.01); G02B 1/041 (2013.01); G02B 3/00 (2013.01); G02C 7/02 (2013.01); C07C 217/02 (2013.01); G02B 1/00 (2013.01); Y02W 30/62 (2015.05)

(58) Field of Classification Search
CPC ........ C08L 75/04; C08L 81/02; C08G 18/833
See application file for complete search history.

(56) References Cited

U.S. PATENT DOCUMENTS

| 4,775,733 A | 10/1988 | Kanemura et al. |
| 5,087,758 A | 2/1992 | Kanemura et al. |
| 5,608,115 A | 3/1997 | Okazaki et al. |
| 2009/0099329 A1 | 4/2009 | Ryu et al. |
| 2009/0227745 A1 | 9/2009 | Kohgo et al. |
| 2009/0264613 A1* | 10/2009 | Kuma ............... C08G 18/3876 568/66 |
| 2014/0179532 A1 | 6/2014 | Klockemann |
| 2015/0126781 A1 | 5/2015 | Kawaguchi et al. |
| 2017/0247322 A1 | 8/2017 | Nishimori et al. |

FOREIGN PATENT DOCUMENTS

| CN | 104119499 A | * 10/2014 |
| CN | 104321306 A | 1/2015 |
| JP | S6346213 A | 2/1988 |
| JP | H02270859 A | 11/1990 |
| JP | H07252207 A | 10/1995 |
| WO | 2007020818 A1 | 2/2007 |
| WO | 2016010065 A1 | 1/2016 |

OTHER PUBLICATIONS

CN-104119499-A_2014-10-29_English Translation.*

* cited by examiner

*Primary Examiner* — Michael L Leonard
(74) *Attorney, Agent, or Firm* — BUCHANAN INGERSOLL & ROONEY PC

(57) ABSTRACT

A method of producing a thiourethane resin raw material, the method including comprising the step of generating the thiourethane resin raw material by reacting a thiourethane resin and an active hydrogen compound with each other.

6 Claims, No Drawings

METHOD OF PRODUCING THIOURETHANE RESIN RAW MATERIAL AND APPLICATION THEREOF, METHOD OF PRODUCING POLYTHIOL COMPOSITION AND APPLICATION THEREOF, AND POLYTHIOL COMPOSITION

TECHNICAL FIELD

The present disclosure relates to: a method of producing a thiourethane resin raw material, and an application thereof; a method of producing a polythiol composition, and an application thereof; and a polythiol composition.

BACKGROUND ART

Plastic lenses, which are resin-containing lenses, are lightweight, hardly breakable, and dyeable as compared to inorganic lenses; therefore, in recent years, the use of plastic lenses as eyeglass lenses, camera lenses, and the like has been rapidly increased.

For example, various studies have been conducted on thiourethane resin-containing lenses (see, for example, Patent Documents 1 to 3).
Patent Document 1: Japanese Patent Application Laid-Open (JP-A) No. S63-46213
Patent Document 2: JP-A No. H2-270859
Patent Document 3: JP-A No. H7-252207

SUMMARY OF THE INVENTION

Technical Problem

As raw materials for the production of a thiourethane resin (hereinafter, also referred to as "thiourethane resin raw materials"), a polythiol composition and a polyisocyanate compound are usually used. The polyisocyanate compound is produced from, for example, a polyamine compound. The polyamine compound that is a raw material of the polyisocyanate compound also falls under "thiourethane resin raw materials" (i.e., raw materials for the production of a thiourethane resin).

A thiourethane resin-containing lens (e.g., eyeglass lens) is produced by cutting and processing a thiourethane resin-containing formed body.

As a result, in a lens production process, a large amount of thiourethane resin-containing cut powder may be generated as waste.

In addition, in the step of producing the thiourethane resin-containing formed body, a defective formed article or a defective processed article may be generated.

Conventionally, such cut powder, defective formed article, and defective processed article that are generated as waste are simply incinerated or buried as industrial waste, without being effectively utilized.

However, from the standpoint of effective utilization of materials (i.e., recycle), a technology for producing a thiourethane resin raw material using, as a starting material, a thiourethane resin-containing cut powder or defective formed/processed article generated as a waste is desired.

The resulting thiourethane resin raw material can be used as a raw material for the production of a thiourethane resin.

Further, a technology for producing a thiourethane resin raw material using a thiourethane resin as a starting material, which is not limited to the use of a thiourethane resin contained in a cut powder or defective formed/processed article as a starting material, is desired.

An object of a first embodiment of the disclosure is to provide: a method of producing a thiourethane resin raw material, by which a thiourethane resin raw material can be produced using a thiourethane resin as a starting material; and an application thereof.

An object of a second embodiment of the disclosure is to provide: a method of producing a thiourethane resin raw material, by which a thiourethane resin raw material can be produced using a thiourethane resin-containing resin mixture as a starting material; and an application thereof.

An object of a third embodiment of the disclosure is to provide: a method of producing a polythiol composition, by which a polythiol composition can be produced using a thiourethane resin as a starting material; and an application thereof.

An object of a fourth embodiment of the disclosure is to provide: a method of producing a polythiol composition, by which a polythiol composition can be produced using a thiourethane resin as a starting material; and an application thereof.

An object of a fifth embodiment of the disclosure is to provide a polythiol composition having an excellent pot life, in which an increase in viscosity is inhibited.

Solution to Problem

Means for solving the above-described problems encompass the following aspects.

The method of producing a thiourethane resin raw material according to the first embodiment of the disclosure is the method of producing a thiourethane resin raw material according to the below-described <1>.

The method of producing a thiourethane resin raw material according to the second embodiment of the disclosure is the method of producing a thiourethane resin raw material according to the below-described <10>.

The method of producing a polythiol composition according to the third embodiment of the disclosure is the method of producing a polythiol composition according to the below-described <24>.

The method of producing a polythiol composition according to the fourth embodiment of the disclosure is the method of producing a polythiol composition according to the below-described <30>.

The polythiol composition according to the fifth embodiment of the disclosure is the polythiol composition according to the below-described <37>.

There may be an overlapping part between the embodiments.

<1> A method of producing a thiourethane resin raw material, the method comprising a step of generating the thiourethane resin raw material by reacting a thiourethane resin and an active hydrogen compound with each other.

<2> The method of producing a thiourethane resin raw material according to <1>, wherein the thiourethane resin is collected in at least one of an eyeglass lens production process, an eyeglass production process, or an eyeglass disposal process.

<3> The method of producing a thiourethane resin raw material according to <1> or <2>, wherein, the step of generating the thiourethane resin raw material comprises reacting the thiourethane resin and the active hydrogen compound react with each other by contacting a cut powder comprising the thiourethane resin and the active hydrogen compound with each other.

<4> The method of producing a thiourethane resin raw material according to <1> or <2>, wherein:

the method further comprises, prior to the step of generating the thiourethane resin raw material, a classification step of classifying a cut powder comprising the thiourethane resin to obtain a powder comprising the thiourethane resin, the obtained powder having a smaller average particle size than the cut powder, and the step of generating the thiourethane resin raw material comprises reacting the thiourethane resin in the obtained powder and the active hydrogen compound react with each other by contacting the obtained powder and the active hydrogen compound with each other.

<5> The method of producing a thiourethane resin raw material according to <1> or <2>, wherein:

the method further comprises, prior to the step of generating the thiourethane resin raw material, a sieving step of sieving a cut powder comprising the thiourethane resin to obtain a powder comprising the thiourethane resin, the obtained powder having through a sieve, and the step of generating the thiourethane resin raw material comprises reacting the thiourethane resin in the obtained powder and the active hydrogen compound react with each other by contacting the obtained powder and the active hydrogen compound with each other.

<6> The method of producing a thiourethane resin raw material according to <5>, wherein the sieve has a nominal mesh size of from 0.1 mm to 20 mm as defined by JIS Z-8801-1:2019.

<7> The method of producing a thiourethane resin raw material according to any one of <1> to <6>, wherein the method further comprises, prior to the step of generating the thiourethane resin raw material, a washing step of washing a powder comprising the thiourethane resin using a hydrocarbon compound having from 5 to 12 carbon atoms as a washing solvent, and the step of generating the thiourethane resin raw material comprises reacting the thiourethane resin in the powder washed in the washing step and the active hydrogen compound react with each other by contacting the powder washed in the washing step and the active hydrogen compound with each other.

<8> The method of producing a thiourethane resin raw material according to any one of <1> to <7>, wherein the thiourethane resin raw material comprises at least one selected from the group consisting of a polythiol composition, a polyamine compound, and a polyisocyanate compound.

<9> The method of producing a thiourethane resin raw material according to any one of <1> to <8>, wherein the active hydrogen compound is at least one selected from the group consisting of an amine compound and an alcohol compound.

<10> The method of producing a thiourethane resin raw material according to any one of <1> to <9>, wherein, the step of generating the thiourethane resin raw material comprises contacting the active hydrogen compound and a resin mixture comprising the thiourethane resin with each other to cause the active hydrogen compound and the thiourethane resin in the resin mixture to react with each other.

<11> The method of producing a thiourethane resin raw material according to <10>, wherein the resin mixture comprising the thiourethane resin is collected in at least one of an eyeglass lens production process, an eyeglass production process, or an eyeglass disposal process.

<12> The method of producing a thiourethane resin raw material according to <10> or <11>, wherein the resin mixture comprises a cut powder comprising the thiourethane resin.

<13> The method of producing a thiourethane resin raw material according to any one of <10> to <12>, wherein the resin mixture comprising the thiourethane resin further comprises at least one selected from the group consisting of a polycarbonate resin, a polyallylcarbonate resin, an acrylic resin, a urethane resin, and an episulfide resin.

<14> A method of producing a polymerizable composition, the method comprising:

a step of producing a polythiol composition as a thiourethane resin raw material by the method of producing a thiourethane resin raw material according to any one of claims 1 to 13; and a step of obtaining a polymerizable composition comprising the polythiol composition and a polyisocyanate compound by mixing together at least the polythiol composition and the polyisocyanate compound.

<15> A method of producing a resin, the method comprising:

the step of producing a polymerizable composition by the method of producing a polymerizable composition according to <14>; and the step of obtaining a resin by curing the polymerizable composition.

<16> A method of producing a resin-containing formed body, the method comprising:

the step of producing a polymerizable composition by the method of producing a polymerizable composition according to <14>; and the step of obtaining a resin-containing formed body by curing the polymerizable composition.

<17> A method of producing an optical material comprising a resin-containing formed body, the method comprising:

the step of producing a polymerizable composition by the method of producing a polymerizable composition according to <14>; and the step of obtaining a resin-containing formed body by curing the polymerizable composition.

<18> A method of producing a lens comprising a resin-containing formed body, the method comprising:

the step of producing a polymerizable composition by the method of producing a polymerizable composition according to <14>; and the step of obtaining a resin-containing formed body by curing the polymerizable composition.

<19> A polymerizable composition, comprising:

a polythiol composition as the thiourethane resin raw material obtained by the method of producing a thiourethane resin raw material according to any one of <1> to <13>; and a polyisocyanate compound.

<20> A resin, which is a cured product of the polymerizable composition according to <19>.

<21> A formed body, comprising the resin according to <20>.

<22> An optical material, comprising the formed body according to <21>.

<23> A lens, comprising the formed body according to <21>.

<24> A method of producing a polythiol composition, the method comprising the reaction step of reacting a thiourethane resin and an amine compound with each other to generate a polythiol composition.

<25> The method of producing a polythiol composition according to <24>, wherein, the thiourethane resin and the amine compound are reacted with each other under a temperature condition of from 70° C. to 140° C.

<26> The method of producing a polythiol composition according to <24> or <25>, wherein the amine compound is an amine compound of 300 or less in molecular weight, which comprises at least one of an amino group or a monoalkylamino group, and has a total number of amino groups and monoalkylamino groups of 1 or 2.

<27> The method of producing a polythiol composition according to any one of <24> to <25>, wherein
the reaction step comprises obtaining a reaction mixture comprising the polythiol composition, and
the method further comprises a separation step of separating the polythiol composition from the reaction mixture comprising the polythiol composition.

<28> The method of producing a polythiol composition according to <27>, wherein the separation step comprises:
filtering the reaction mixture comprising the polythiol composition to obtain a filtrate comprising the polythiol composition;
acid washing the filtrate comprising the polythiol composition; and
separating the polythiol composition from the thus acid-washed filtrate.

<29> The method of producing a polythiol composition according to <27>, wherein the separation step comprises:
filtering the reaction mixture comprising the polythiol composition to obtain a filtrate comprising the polythiol composition;
adding an alkali metal-containing base and then water to the filtrate comprising the polythiol composition to perform extraction and thereby obtain a water extract comprising an alkali metal salt of the polythiol composition;
adding an acid to the water extract comprising an alkali metal salt of the polythiol composition to obtain an aqueous liquid comprising the polythiol composition;
adding a hydrocarbon compound having from 5 to 12 carbon atoms as an extraction solvent to the aqueous liquid comprising the polythiol composition to perform extraction and thereby obtain an extract comprising the polythiol composition; and
separating the polythiol composition from the extract comprising the polythiol composition.

<30> A method of producing a polythiol composition, the method comprising a reaction step of reacting a thiourethane resin and an alcohol compound with each other in the presence of a tertiary amine compound to generate a polythiol composition.

<31> The method of producing a polythiol composition according to <30>, wherein the alcohol compound comprises a compound having a boiling point of from 135° C. to 250° C.

<32> The method of producing a polythiol composition according to <30> or <31>, wherein, the reaction step comprises reacting the thiourethane resin and the alcohol compound with each other under a temperature condition of from 70° C. to 200° C.

<33> The method of producing a polythiol composition according to any one of <30> to <32>, wherein
the reaction step comprises obtaining a reaction mixture comprising the polythiol composition, and
the method further comprises a separation step of separating the polythiol composition from the reaction mixture comprising the polythiol composition.

<34> The method of producing a polythiol composition according to <33>, wherein the separation step comprises:
filtering the reaction mixture comprising the polythiol composition to obtain a filtrate comprising the polythiol composition;
washing the filtrate comprising the polythiol composition with an acid and then with water;
adding an alkali metal-containing base and then water to the water-washed filtrate comprising the polythiol composition to perform extraction and thereby obtain a water extract comprising an alkali metal salt of the polythiol composition;
adding an acid to the water extract comprising an alkali metal salt of the polythiol composition to obtain an aqueous liquid comprising the polythiol composition;
adding a hydrocarbon compound having from 5 to 12 carbon atoms as an extraction solvent to the aqueous liquid comprising the polythiol composition to perform extraction and thereby obtain an extract comprising the polythiol composition; and
separating the polythiol composition from the extract comprising the polythiol composition.

<35> The method of producing a polythiol composition according to any one of <24> to <34>, wherein the polythiol composition comprises at least one selected from the group consisting of:
4-mercaptomethyl-1,8-dimercapto-3,6-dithiaoctane;
4,8-dimercaptomethyl-1,11-dimercapto-3,6,9-trithiaundecane;
4,7-dimercaptomethyl-1,11-dimercapto-3,6,9-trithiaundecane;
5,7-dimercaptomethyl-1,11-dimercapto-3,6,9-trithiaundecane;
pentaerythritol tetrakis(2-mercaptoacetate);
pentaerythritol tetrakis(3-mercaptopropionate);
2,5-dimercaptomethyl-1,4-dithiane;
bis(2-mercaptoethyl) sulfide; and
diethylene glycol bis(3-mercaptopropionate).

<36> The method of producing a polythiol composition according to any one of <24> to <35>, which is a method of producing a polythiol composition for the production of an optical material.

<37> A polythiol composition, comprising, as a main component, a polythiol compound (XA) comprising three or more mercapto groups, wherein:
a compound (XB), which is obtained by substituting at least one of the three or more mercapto groups in the polythiol compound (XA) with a group represented by the following Formula (N1), has a peak area of less than 0.1 with respect to a peak area of the polythiol composition of 100 in high-performance liquid chromatography measurement, and
a compound (XC), which is obtained by substituting at least one of the three or more mercapto groups in the polythiol compound (XA) with a hydroxy group, has a peak area of less than 0.1 with respect to a peak area of the polythiol composition of 100 in high-performance liquid chromatography measurement:

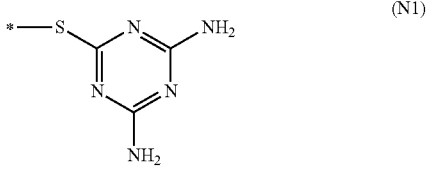

wherein, in Formula (N1), * represents a binding position.

Advantageous Effects of Invention

According to the first embodiment of the disclosure, a method of producing a thiourethane resin raw material by which a thiourethane resin raw material can be produced using a thiourethane resin as a starting material, and an application thereof are provided.

According to the second embodiment of the disclosure, a method of producing a thiourethane resin raw material by which a thiourethane resin raw material can be produced using a thiourethane resin-containing resin mixture as a starting material, and an application thereof are provided.

According to the third embodiment of the disclosure, a method of producing a polythiol composition by which a polythiol composition can be produced using a thiourethane resin as a starting material; and an application thereof are provided.

According to the fourth embodiment of the disclosure, a method of producing a polythiol composition by which a polythiol composition can be produced using a thiourethane resin as a starting material; and an application thereof are provided.

According to the fifth embodiment of the disclosure, a polythiol composition having an excellent pot life, in which an increase in viscosity is inhibited, is provided.

DESCRIPTION OF EMBODIMENTS

In the disclosure, those numerical ranges that are expressed with "to" each denote a range that includes the numerical values stated before and after "to" as the lower limit value and the upper limit value, respectively.

In the disclosure, the term "step" encompasses not only a discrete step but also a step that cannot be clearly distinguished from other steps, as long as the intended purpose of the step is achieved.

In the disclosure, when there are plural substances that correspond to a component of a composition, the indicated amount of the component in the composition means, unless otherwise specified, a total amount of the plural substances existing in the composition.

In a set of numerical ranges that are stated in a stepwise manner in the disclosure, the upper limit value or the lower limit value of one numerical range may be replaced with the upper limit value or the lower limit value of other numerical range. Further, in a numerical range stated in the disclosure, the upper limit value or the lower limit value of the numerical range may be replaced with a relevant value indicated in any of Examples.

The first to the fifth embodiments of the disclosure will now be described.

There may be an overlapping part between the embodiments. In other words, one embodiment may satisfy a characteristic feature of other embodiment. Accordingly, with regard to a preferred characteristic feature in one embodiment, reference can be made as appropriate to a characteristic feature of other embodiment.

First Embodiment

[Method of Producing Thiourethane Resin Raw Material]

The method of producing a thiourethane resin raw material according to the first embodiment of the disclosure includes a step of generating the thiourethane resin raw material by reacting a thiourethane resin and an active hydrogen compound with each other.

According to the production method of the first embodiment, a thiourethane resin raw material can be produced using a thiourethane resin as a starting material.

The reason why this effect is exerted is presumed as follows.

In the production method of the first embodiment, it is believed that a thiourethane resin and an active hydrogen compound react with each other, and thereby the thiourethane resin is chemically decomposed, as a result of which a thiourethane resin raw material is obtained as a decomposition product of the thiourethane resin.

<Step of Generating Thiourethane Resin Raw Material>

The step of generating the thiourethane resin raw material in the production method of the first embodiment includes generating the thiourethane resin raw material by reacting a thiourethane resin and an active hydrogen compound with each other.

(Thiourethane Resin)

The thiourethane resin is a starting material in the present step and the production method of the first embodiment.

The thiourethane resin is not particularly limited, and examples thereof include those thiourethane resins that are described in known documents, such as JP-A No. S63-46213, JP-A No. H2-270859, JP-A No. H7-252207, and WO 2008/047626.

The thiourethane resin is usually produced as a reaction product of a polyisocyanate compound and a polythiol composition that are used as raw materials.

Examples of the thiourethane resin include:

thiourethane resins obtained from MR-6, MR-7, MR-8, MR-8 Plus, MR-60, MR-10, and MR-20 (all of which are manufactured by Mitsui Chemicals, Inc.), which are high-refractive-index lens materials; and EYAS 1.60 (manufactured by HOYA Corporation).

The thiourethane resin is preferably one collected in at least one of an eyeglass lens production process, an eyeglass production process, or an eyeglass disposal process. According to this aspect, recycle of the thiourethane resin that is an eyeglass lens material is realized.

It is noted here that:

the "eyeglass lens production process" means a process of producing a resin by mixing and cast-polymerizing monomers that are raw materials of the resin, and/or a process of obtaining an eyeglass lens by cutting a resin formed body;

the "eyeglass production process" means a process of producing an eyeglass by combining eyeglass lenses and other members such as an eyeglass frame with each other; and the "eyeglass disposal process" means a process of disposing of, for example, an eyeglass that has been produced but is no longer needed, or a used eyeglass.

In all of these processes, a thiourethane resin, which is an eyeglass lens material, may be generated as a waste.

In the present aspect, a thiourethane resin generated in at least one of these processes is used as a starting material, and this thiourethane resin and an active hydrogen compound are reacted with each other to obtain a thiourethane resin raw material that is a decomposition product of the thiourethane resin.

As described above, in the methods of producing a thiourethane resin raw material according to the disclosure such as the production method of the first embodiment, the use of a used thiourethane resin for the production of a thiourethane resin raw material enables to reduce the amount of the thiourethane resin to be disposed of by incineration, as a result of which the generation of greenhouse gasses such as carbon dioxide, as well as the generation of air pollutants such as sulfur oxide and nitrogen oxide, can be reduced. In addition, since thiourea is not used for the production of a polythiol compound, no thiourea-containing waste water is generated; therefore, the methods of producing a thiourethane resin raw material according to the disclosure are environmentally-friendly production methods.

As a specific example, when 1 kg of the thiourethane resin produced in Reference Production Example 1, in which the content ratios of carbon atoms, nitrogen atoms, and sulfur atoms are 48.5%, 7.6%, and 30.2%, respectively, is disposed of by incineration, various kinds of oxides of carbon atom, nitrogen atom, and sulfur atoms are generated in the form of gases depending on the incineration method. Assuming that carbon dioxide, nitrogen monoxide, and sulfur dioxide are the products, the disposal of 1 kg of the thiourethane resin yields 1.78 kg of carbon dioxide, 0.16 kg of nitrogen monoxide, and 0.6 kg of sulfur dioxide.

In the methods of producing a thiourethane resin raw material according to the disclosure, the generation of these carbon dioxide, nitrogen monoxide, and sulfur dioxide can be reduced.

The above-described starting material preferably contains a cut powder containing a thiourethane resin.

In the step of generating the thiourethane resin raw material according to this aspect, the thiourethane resin and the active hydrogen compound react with each other by contacting a cut powder comprising the thiourethane resin and the active hydrogen compound with each other.

In this aspect, because of superior reactivity between the active hydrogen compound and the thiourethane resin contained in the starting material, a thiourethane resin raw material can be generated more effectively.

(Active Hydrogen Compound)

The active hydrogen compound functions as a decomposition agent against the thiourethane resin that is a starting material.

From the standpoint of this function, the active hydrogen compound is preferably at least one selected from the group consisting of an amine compound and an alcohol compound.

—Amine Compound—

The amine compound is preferably an amine compound which contains at least one of an amino group or a monoalkylamino group, and has a total number of amino groups and monoalkylamino groups of from 1 to 6 (preferably from 1 to 3, more preferably 1 or 2).

From the standpoint of further improving the reactivity with the thiourethane resin, the molecular weight of the amine compound is preferably 1,000 or less, more preferably 500 or less, still more preferably 300 or less, yet still more preferably 200 or less.

A lower limit of the molecular weight of the amine compound is, for example, not less than 45, preferably not less than 59, more preferably not less than 60.

One preferred example of the amine compound is an amine compound of 300 or less in molecular weight, which contains at least one of an amino group or a monoalkylamino group, and has a total number of amino groups and monoalkylamino groups of 1 or 2.

Specific examples of the amine compound include alkylamine having from 2 to 10 carbon atoms, aralkylamine having from 7 to 10 carbon atoms (e.g., benzylamine), dialkylamine having from 2 to 10 carbon atoms (e.g., di-n-butylamine), alkyldiamine having from 2 to 10 carbon atoms (e.g., ethylenediamine and bis(2-aminoethyl)ether), alkyltriamine having from 2 to 10 carbon atoms (e.g., bis(2-aminoethyl)amine), hydroxyalkylamine having from 2 to 10 carbon atoms (e.g., monoethanolamine), bis(hydroxyalkyl)amine having from 2 to 10 carbon atoms (e.g., bis(hydroxyethyl)amine), cyclic amine having from 2 to 10 carbon atoms (e.g., morpholine), and secondary amine such as alkyl(hydroxyalkyl)amine having from 2 to 10 carbon atoms (e.g., methylethanolamine and isopropylethanolamine).

The amine compound is preferably benzylamine, di-n-butylamine, ethylenediamine, or monoethanolamine.

—Alcohol Compound—

The alcohol compound may be a monoalcohol compound containing only one hydroxy group, or a polyol compound having two or more hydroxy groups.

From the standpoint of further improving the reactivity with the thiourethane resin, the molecular weight of the alcohol compound is preferably 1,000 or less, more preferably 500 or less, still more preferably 300 or less, yet still more preferably 200 or less.

A lower limit of the molecular weight of the alcohol compound is, for example, not less than 40, preferably not less than 50, more preferably not less than 60.

The alcohol compound preferably contains an alcohol compound having a boiling point of from 135° C. to 250° C. (hereinafter, also referred to as "alcohol compound A").

The term "boiling point" used herein means a boiling point under 1 atm (101,325 Pa).

A ratio of the alcohol compound A with respect to a total amount of the alcohol compound is preferably from 50% by mass to 100% by mass, more preferably from 60% by mass to 100% by mass, still more preferably from 80% by mass to 100% by mass.

The alcohol compound is preferably benzyl alcohol, phenethyl alcohol, 2-octanol, 2-ethyl-1-hexanol, 1-decanol, 1-nonanol, 1-octanol, 1-heptanol, 1-hexanol, 1-pentanol, propylene glycol, or ethylene glycol, more preferably benzyl alcohol, phenethyl alcohol, 1-decanol, 1-nonanol, 1-octanol, 1-heptanol, 1-hexanol, 1-pentanol, propylene glycol, or ethylene glycol, still more preferably benzyl alcohol, phenethyl alcohol, 2-octanol, 1-octanol, 1-heptanol, 1-hexanol, 1-pentanol, or propylene glycol.

(Thiourethane Resin Raw Material)

The thiourethane resin raw material is a target material (particularly a decomposition product of the thiourethane resin that is a starting material) in the present step and the production method of the first embodiment, and is a raw material for the production of a thiourethane resin.

The thiourethane resin raw material preferably contains at least one selected from the group consisting of a polythiol composition, a polyamine compound, and a diisocyanate compound.

—Polythiol Composition—

The term "polythiol composition" used herein means a composition containing at least one polythiol compound.

In the disclosure, a polythiol compound contained in the polythiol composition is also referred to as "polythiol component".

The polythiol composition may also contain, as an impurity, a component other than the polythiol compound.

It is preferred that the polythiol composition contains at least one polythiol compound as a main component.

It is noted here that "the polythiol composition contains at least one polythiol compound as a main component" means that a total content of the at least one polythiol compound is not less than 50% with respect to a total amount of the polythiol composition.

The total content of the at least one polythiol compound with respect to the total amount of the polythiol composition is preferably not less than 60%, more preferably not less than 70%, still more preferably not less than 80%.

Similarly, in the disclosure, a feature that a composition contains a certain component (hereinafter, referred to as "component X") "as a main component" means that the content of the component X (when the component X consists of two or more compounds, a total content of the two or more compounds) is not less than 50% with respect to a total amount of the composition.

The content of the component X as a main component with respect to the total amount of the composition is preferably not less than 60%, more preferably not less than 70%, still more preferably not less than 80%.

The "%" in the description of the above-described expression "contain . . . as a main component" means a ratio (% by area) of a total area of all peaks of the component X (e.g., at least one polythiol compound) with respect to a total area of all peaks of the composition (e.g., a polythiol composition), which ratio is determined by high-performance liquid chromatography.

The polythiol composition as a target material is, for example, a polythiol composition containing a known polythiol compound.

The polythiol compound is not particularly limited as long as it is a compound containing two or more thiol groups (other name: mercapto groups).

With regard to the polythiol compound, reference can be made as appropriate to the aforementioned known documents (i.e., JP-A No. S63-46213, JP-A No. H2-270859, JP-A No. H7-252207, WO 2008/047626, and the like).

The polythiol composition as a target material preferably contains at least one (hereinafter, also referred to as "polythiol component A") selected from the group consisting of
4-mercaptomethyl-1,8-dimercapto-3,6-dithiaoctane,
4,8-dimercaptomethyl-1,11-dimercapto-3,6,9-trithiaundecane,
4,7-dimercaptomethyl-1,11-dimercapto-3,6,9-trithiaundecane,
5,7-dimercaptomethyl-1,11-dimercapto-3,6,9-trithiaundecane,
pentaerythritol tetrakis(2-mercaptoacetate),
pentaerythritol tetrakis(3-mercaptopropionate),
2,5-dimercaptomethyl-1,4-dithiane,
bis(2-mercaptoethyl) sulfide, and
diethylene glycol bis(3-mercaptopropionate).

The polythiol composition more preferably contains the polythiol component A as a main component.

In this case, the polythiol composition may contain at least one other component (e.g., other polythiol compound or a component other than the polythiol compound) in addition to the polythiol component A.

Examples of the other polythiol compound include methanedithiol, 1,2-ethanedithiol, 1,2,3-propanetrithiol, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithiane, 2,5-dimercaptomethyl-2,5-dimethyl-1,4-dithiane, 1,1,3,3-tetrakis(mercaptomethylthio)propane, 1,1,2,2-tetrakis(mercaptomethylthio)ethane, and 4,6-bis(mercaptomethylthio)-1,3-dithiane.

Examples of a more specific aspect of the polythiol composition as a target material include:
an aspect in which the polythiol composition contains 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (hereinafter, these three compounds are also collectively referred to as "polythiol component A1") as main components;
an aspect in which the polythiol composition contains 4-mercaptomethyl-1,8-dimercapto-3,6-dithiaoctane (hereinafter, also referred to as "polythiol component A2") as a main component;
an aspect in which the polythiol composition contains pentaerythritol tetrakis(3-mercaptopropionate) (hereinafter, also referred to as "polythiol component A3") as a main component;
an aspect in which the polythiol composition contains, as main components, the polythiol component A1 and the polythiol component A3; and
an aspect in which the polythiol composition contains, as main components, the polythiol component A2 and the polythiol component A3.

The polythiol composition of each of the above-described aspects may contain at least one other component (e.g., other polythiol compound or a component other than the polythiol compound) in addition to the main component(s).

The polythiol composition as a target material and the polythiol composition as a raw material of a thiourethane resin used as a starting material are not required to be completely identical.

However, from the standpoint of the performance of the thiourethane resin produced from the polythiol composition that is a target material, it is preferred that the type of a polythiol component contained as a main component in the polythiol composition as a target material is the same as the type of a polythiol component contained as a main component in the polythiol composition as a raw material. In this case, for example, by using a cut powder (thiourethane resin) generated in the production of an optical material A as a raw material, an optical material B (thiourethane resin-containing optical material) having comparable performance to the optical material A can be produced.

As compared to the polythiol composition as a raw material of a thiourethane resin used as a starting material, the polythiol composition as a target material may contain the same polythiol component as a main component but may have a reduced content of impurities.

In the polythiol composition as a target material, when the content of impurities is reduced, there may be an advantage that an increase in the viscosity of the polythiol composition is inhibited, and the pot life of the polythiol composition is prolonged.

In this case, examples of the polythiol composition as a target material include the polythiol composition according to the below-described fifth embodiment. Examples of a combination of main component and impurities include the combination of the polythiol compound (XA) contained as a main component and the compounds (XB) and (XC) contained as impurities in the below-described fifth embodiment.

The use of the polythiol composition that is a target material is not particularly limited.

For example, the polythiol composition that is a target material can be used for the production of a thiourethane resin.

One example of specific use of the polythiol composition that is a target material is the use for the production of an optical material (e.g., an eyeglass lens).

—Polyamine Compound—

The polyamine compound as a target material may be any compound containing two or more amino groups.

The polyamine compound as a target material preferably contains a diamine compound containing two amino groups, more preferably contains at least one (hereinafter, also referred to as "polyamine component A") selected from the group consisting of pentamethylenediamine, hexamethylenediamine, m-xylylenediamine, p-xylylenediamine, isophoronediamine, bis(aminomethyl)cyclohexane, bis(aminocyclohexyl)methane, 2,5-bis(aminomethyl)bicyclo-[2.2.1]-heptane, 2,6-bis(aminomethyl)bicyclo-[2.2.1]-heptane, tolylenediamine, 4,4'-diphenylmethanediamine, and phenylenediamine, still more preferably contains the polyamine component A as a main component.

The polyamine compound as a target material yet still more preferably contains at least one selected from the group consisting of m-xylylenediamine, 2,5-bis(aminomethyl)bicyclo-[2.2.1]-heptane, and 2,6-bis(aminomethyl)bicyclo-[2.2.1]-heptane (hereinafter, also referred to as "polyamine component A1"), further more preferably contains the polyamine component A1 as a main component.

The use of the polyamine compound that is a target material is not particularly limited, and the polyamine compound can be applied to various uses.

The polyamine compound that is a target material can be used as, for example, a raw material of a polyisocyanate compound.

The resulting polyisocyanate compound can be used for, for example, the production of a thiourethane resin or a urethane resin.

One example of specific use of the polyamine compound that is a target material is the use for the production of an optical material (e.g., an eyeglass lens).

—Polyisocyanate Compound—

The polyisocyanate compound as a target material may be any compound containing two or more isocyanate groups.

The polyisocyanate compound as a target material preferably contains a diisocyanate compound containing two isocyanate groups, more preferably contains at least one (hereinafter, also referred to as "polyisocyanate component A") selected from the group consisting of pentamethylene diisocyanate, hexamethylene diisocyanate, m-xylylene diisocyanate, p-xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate, and phenylene diisocyanate, still more preferably contains the polyisocyanate component A as a main component.

The polyisocyanate compound as a target material yet still more preferably contains at least one (hereinafter, also referred to as "polyisocyanate component A1") selected from the group consisting of m-xylylene diisocyanate, 2,5-bis(isocyanatomethyl)bicyclo-[2.2.1]-heptane, and 2,6-bis(isocyanatomethyl)bicyclo-[2.2.1]-heptane, further more preferably contains the polyisocyanate component A1 as a main component.

The use of the polyisocyanate compound that is a target material is not particularly limited, and the polyisocyanate compound can be applied to various uses.

The polyisocyanate compound that is a target material can be used for, for example, the production of a thiourethane resin or a urethane resin.

One example of specific use of the polyisocyanate compound that is a target material is the use for the production of an optical material (e.g., an eyeglass lens).

(Reaction Solvent)

In the step of generating the thiourethane resin raw material, the thiourethane resin and the amine compound are preferably reacted with each other in the presence of a reaction solvent.

The reaction solvent is preferably a hydrocarbon compound having from 5 to 12 (preferably from 6 to 10, more preferably from 7 to 9) carbon atoms, an ether compound having from 4 to 12 carbon atoms, a ketone compound having from 3 to 12 carbon atoms, an ester compound having from 4 to 12 carbon atoms, an alcohol compound having from 2 to 12 carbon atoms, or a nitrile compound having from 2 to 12 carbon atoms.

The above-described hydrocarbon compound is preferably hexane, heptane, octane, nonane, decane, xylene, mesitylene, or toluene, more preferably heptane, octane, nonane, xylene, mesitylene, or toluene, particularly preferably xylene or toluene.

The above-described ether compound is preferably diethyl ether, tetrahydrofuran, 2-methyltetrahydrofuran, dimethoxyethane, or 1,4-dioxane, particularly preferably dimethoxyethane.

The above-described ketone compound is preferably acetone, methyl ethyl ketone, methyl isobutyl ketone, or 2-octanone, particularly preferably methyl isobutyl ketone.

The above-described ester compound is preferably ethyl acetate, butyl acetate, or pentyl acetate, particularly preferably pentyl acetate.

The above-described alcohol compound is preferably ethanol, 1-propanol, isopropanol, 1-butanol, 1-pentanol, 1-octanol, 2-octanol, benzyl alcohol, phenethyl alcohol, ethylene glycol, propylene glycol, or methyl cellosolve, particularly preferably benzyl alcohol or ethylene glycol.

The above-described nitrile compound is preferably acetonitrile or propionitrile, particularly preferably acetonitrile.

As the reaction solvent, these compounds may be used singly, or in combination of two or more kinds thereof.

(Preferred Aspect of Step of Generating Thiourethane Resin Raw Material)

The step of generating the thiourethane resin raw material is preferably the step of reacting a thiourethane resin and an active hydrogen compound with each other to generate a polythiol composition and a polyamine compound as the thiourethane resin raw materials.

In this preferred aspect, a decomposition reaction occurs in which the thiourethane resin is decomposed into the polythiol composition and the polyamine compound by the active hydrogen compound functioning as a decomposition agent.

When the active hydrogen compound is an amine compound, the decomposition reaction is an aminolysis reaction, whereas when the active hydrogen compound is an alcohol compound, the decomposition reaction is an alcoholysis reaction.

(Resin Mixture Containing Thiourethane Resin)

The step of generating the thiourethane resin raw material may includes contacting the active hydrogen compound and a resin mixture comprising the thiourethane resin with each other to cause the active hydrogen compound and the thiourethane resin in the resin mixture to react with each other.

The resin mixture containing a thiourethane resin further contains components other than the thiourethane resin.

Examples of the components other than the thiourethane resin include a resin other than the thiourethane resin, and an inorganic material (e.g., glass) for lens production.

The resin other than the thiourethane resin is not particularly limited.

The scope of the resin mixture containing a thiourethane resin and a resin other than the thiourethane resin includes, for example:

a hybrid material of a thiourethane resin and a urethane resin, which is produced by adding a polyol compound to a raw material in the production of the thiourethane resin; and a hybrid material of a thiourethane resin and a urea resin, which is produced by adding a polyamine compound to a raw material in the production of the thiourethane resin.

Examples of the resin other than the thiourethane resin include:

a polyolefin film that protects the surface of a resin formed body for eyeglass lens production;

a hard coat or a primer coat that protects the surface of a resin formed body used eyeglass lens production;

an abrasive agent used for grinding a resin formed body for eyeglass lens production;

a resin material used for immobilizing a resin formed body for eyeglass lens production during cutting of the resin formed body; and a tape or a tape glue that is used for immobilizing a glass mold used in the preparation of a resin formed body for eyeglass lens production.

The resin mixture preferably contains, as a resin other than the thiourethane resin, at least one selected from the group consisting of a polycarbonate resin, a polyallylcarbonate resin, an acrylic resin, a urethane resin, and an episulfide resin.

These resins can also be obtained as eyeglass lens materials in the same manner as a thiourethane resin.

The resin mixture containing a thiourethane resin is preferably one collected in at least one of an eyeglass lens production process, an eyeglass production process, or an eyeglass disposal process.

Meaning of each of the eyeglass lens production process, the eyeglass production process, and the eyeglass disposal process is as described above.

The resin mixture containing a thiourethane resin preferably contains a cut powder containing the thiourethane resin.

(Reaction Mixture Containing Thiourethane Resin Raw Material)

The step of generating the thiourethane resin raw material may also be a step of obtaining a reaction mixture containing a thiourethane resin raw material as a target material by reacting a thiourethane resin and an active hydrogen compound with each other, and thereby generating the thiourethane resin raw material.

Examples of components other than the thiourethane resin raw material in the reaction mixture include the above-described reaction solvent, residue of the raw material(s) (thiourethane resin and/or active hydrogen compound), and impurities contained in the raw materials.

<Separation Step>

The method of producing a thiourethane resin raw material according to the first embodiment may also include the separation step of separating the thiourethane resin raw material as a target material from the above-described reaction mixture containing the thiourethane resin raw material.

A separation method in the separation step is not particularly limited, and any known method can be applied.

Examples of the separation method in the separation step include filtration, decantation, extraction, distillation, drying (including vacuum drying), and purification (e.g., column chromatography). These separation methods may be used in combination of two or more thereof.

Examples of a method of separating a polythiol composition as the thiourethane resin raw material include a method of extracting the polythiol composition with an organic solvent or inorganic solvent that can dissolve a polythiol compound.

As a method of purifying the polythiol composition, a general purification method such as column purification, distillation purification, recrystallization purification, or salt extraction is employed.

Examples of a method of separating a polyamine compound as the thiourethane resin raw material include a method of extracting the polyamine compound with an organic solvent or inorganic solvent that can dissolve the polyamine compound.

As a method of purifying the polyamine compound, a general purification method such as column purification, distillation purification, recrystallization purification, or salt extraction is employed.

When the step of generating the thiourethane resin raw material is the above-described step of generating a polythiol composition and a polyamine compound as thiourethane resin raw materials, the separation step preferably includes at least one of obtaining a filtrate containing the polythiol composition as a filtrate or obtaining a mixture containing the polyurea compound that is a polyamine derivative as a filtration residue, by filtration of a reaction mixture containing the polythiol composition and the polyamine compound.

When the separation step includes obtaining a filtrate containing the polythiol composition as a filtrate, the polythiol composition as a thiourethane resin raw material can be obtained by separating the polythiol composition from the filtrate.

In this case, one example of the separation step is a method that includes:

filtering a reaction mixture containing a polythiol composition and a polyamine compound as thiourethane resin raw materials to obtain a filtrate containing the polythiol composition;

adding an alkali metal-containing base and then water to the filtrate containing the polythiol composition to perform extraction and thereby obtain a water extract containing an alkali metal salt of the polythiol composition;

adding an acid to the water extract containing an alkali metal salt of the polythiol composition to obtain an aqueous liquid containing the polythiol composition;

adding a hydrocarbon compound having from 5 to 12 carbon atoms as an extraction solvent to the aqueous liquid containing the polythiol composition to perform extraction and thereby obtain an extract containing the polythiol composition; and separating the polythiol composition from the extract containing the polythiol composition (for the above-described method, see the below-described Example 401).

In this example, first, the polythiol composition in the filtrate containing the polythiol composition is converted to an alkali metal salt and subsequently extracted with water to obtain a water extract containing the alkali metal salt of the polythiol composition. Next, an acid is added to this water extract to convert the alkali metal salt of the polythiol composition back to the polythiol composition. From the resulting aqueous liquid containing the polythiol composition, the polythiol composition is extracted with the above-described extraction solvent to obtain an extract containing the polythiol composition. The polythiol composition is then separated from the thus obtained extract containing the polythiol composition.

According to this example, even when the filtrate containing the polythiol composition contains a large amount of components other than the polythiol composition, a polythiol composition having a higher purity of a polythiol component as a main component can be obtained.

In the above-described example, the alkali metal in the alkali metal-containing base is preferably sodium, potassium, or lithium, more preferably sodium or potassium.

Examples of the alkali metal-containing base include sodium methoxide, sodium ethoxide, sodium propoxide, sodium hydroxide, potassium hydroxide, and lithium hydroxide.

If necessary, the alkali metal-containing base can be added to the filtrate in the form of an alcohol solution (e.g., a methanol solution or an ethanol solution).

In the above-described example, examples of the acid added to the water extract containing an alkali metal salt of the polythiol composition include hydrochloric acid, carbonic acid, nitric acid, sulfuric acid, acetic acid, formic acid, and oxalic acid.

In the above-described example, the extraction solvent may be used singly, or in combination of two or more kinds thereof.

In a separation aspect B, a preferred aspect of the extraction solvent is the same as that of the above-described reaction solvent.

It is noted here, however, that the reaction solvent and the extraction solvent may be the same or different.

When the separation step includes obtaining a mixture containing the polyurea compound as a filtration residue or as a residue obtained by decantation or extraction, an active hydrogen compound (preferably an amine compound and/or an alcohol compound) is brought into contact with the mixture containing the polyurea compound as the filtration residue or the residue to cause the polyurea compound in the mixture and the active hydrogen compound react with each other, whereby a polyamine compound can be generated as a thiourethane resin raw material. By separating the polyamine compound from the resulting reaction mixture containing the polyamine compound, the polyamine compound as a thiourethane resin raw material can be obtained (see the below-described Example 402).

<Other Steps>

The method of producing a thiourethane resin raw material according to the first embodiment, if necessary, may include other steps in addition to the above-described steps Examples of the other steps include:

the sieving step of applying the thiourethane resin to a sieve prior to the step of generating the thiourethane resin raw material;

the step of washing the thiourethane resin prior to the step of generating the thiourethane resin raw material; and the step of crushing and/or pulverizing the thiourethane resin prior to the step of generating the thiourethane resin raw material.

Specific examples of these other steps will now be described.

The method of producing a thiourethane resin raw material according to the first embodiment may include, prior to the step of generating the thiourethane resin raw material, the classification step of classifying a cut powder containing the thiourethane resin to obtain a powder containing the thiourethane resin, which the obtained powder having a smaller average particle size than the cut powder.

When the method of producing a thiourethane resin raw material according to the first embodiment includes this classification step, the step of generating the thiourethane resin raw material includes reacting the thiourethane resin in the obtained powder and the active hydrogen compound with each other by contacting the obtained powder and the active hydrogen compound with each other.

With regard to the classification step, reference can be made to the below-described third or fourth embodiment.

The method of producing a thiourethane resin raw material according to the first embodiment may also include, prior to the step of generating the thiourethane resin raw material, the sieving step of sieving a cut powder containing the thiourethane resin to obtain a powder containing the thiourethane resin, the obtained powder having through a sieve.

When the method of producing a thiourethane resin raw material according to the first embodiment includes this sieving step, the step of generating the thiourethane resin raw material includes reacting the thiourethane resin in the obtained powder and the active hydrogen compound with each other by contacting the obtained powder and the active hydrogen compound with each other.

With regard to the sieving step, reference can be made to the below-described third or fourth embodiment.

The sieve has a nominal mesh size of preferably from 0.1 mm to 20 mm as defined by JIS Z-8801-1:2019.

The method of producing a thiourethane resin raw material according to the first embodiment may also include, prior to the step of generating the thiourethane resin raw material, the washing step of washing the powder containing the thiourethane resin using a hydrocarbon compound having from 5 to 12 carbon atoms as a washing solvent.

When the method of producing a thiourethane resin raw material according to the first embodiment includes this washing step, the step of generating the thiourethane resin raw material includes reacting the thiourethane resin in the powder washed in the washing step and the active hydrogen compound with each other by contacting the powder washed in the washing step and the active hydrogen compound with each other.

With regard to the sieving step, reference can be made to the below-described third or fourth embodiment.

[Method of Producing Polymerizable Composition]

The method of producing a polymerizable composition according to the first embodiment of the disclosure includes:

a step of producing a polythiol composition as a thiourethane resin raw material by the above-described method of producing a thiourethane resin raw material according to the first embodiment; and a step of obtaining a polymerizable composition containing the polythiol composition and a polyisocyanate compound by mixing together at least the polythiol composition and the polyisocyanate compound.

The method of producing a polymerizable composition according to the first embodiment, if necessary, may also include other steps.

In the method of producing a polymerizable composition according to the first embodiment:

in the step of producing a polythiol composition, a polythiol composition is produced as a thiourethane resin raw material using a thiourethane resin (e.g., a thiourethane resin contained in a ground powder of a formed body of the thiourethane resin) as a starting material; and in the step of obtaining a polymerizable composition, a polymerizable composition containing the thus produced polythiol composition and a polyisocyanate compound is produced.

The thus obtained polymerizable composition can be used again for the production of a thiourethane resin.

In this manner, in the method of producing a polymerizable composition according to the first embodiment, effective utilization (i.e., recycle) of materials (i.e., a thiourethane resin and a polythiol composition that is a raw material of the thiourethane resin) is realized.

In addition, as described above, the method of producing a thiourethane resin raw material according to the first embodiment can yield a polythiol composition having a higher purity of a polythiol component as a main component as compared to a known method (e.g., a method of obtaining a polythiol composition by a reaction between a thiourethane resin and sodium hydroxide; see the below-described Comparative Example 1).

In the method of producing a polymerizable composition according to the first embodiment, such a polythiol composition is used; therefore, according to the polymerizable composition obtained by the method of producing a polymerizable composition according to the first embodiment, a resin that is excellent in various performance [for example, optical properties (e.g., refractive index and/or Abbe number), heat resistance, and specific gravity d] can be produced.

Hence, the polymerizable composition obtained by the method of producing a polymerizable composition according to the first embodiment is particularly suitable as a composition for the production of a thiourethane resin for an optical material.

<Step of Producing Polythiol Composition as Thiourethane Resin Raw Material>

With regard to the step of producing a polythiol composition as a thiourethane resin raw material, reference can be made as appropriate to the above-described method of producing a polythiol composition according to the disclosure.

<Step of Obtaining Polymerizable Composition>

In the step of obtaining a polymerizable composition, at least the above-described polythiol composition and a polyisocyanate compound are mixed to obtain a polymerizable composition containing the polythiol composition and the polyisocyanate compound.

A preferred aspect of the polyisocyanate compound used in the step of obtaining a polymerizable composition is the same as that of the "isocyanate compound as a raw material of a thiourethane resin" described in the section of "Method of Producing Polythiol Composition".

In the step of obtaining a polymerizable composition, a mixing ratio of the polythiol composition and the polyisocyanate compound is not particularly limited.

In the step of obtaining a polymerizable composition, a ratio of the charged mass of the polythiol composition with respect to the charged mass of the polyisocyanate compound (i.e., charged mass [polythiol composition/polyisocyanate compound]) is preferably from 0.10 to 10.0, more preferably from 0.20 to 5.00, still more preferably from 0.50 to 1.50, yet still more preferably from 0.70 to 1.30.

Further, a molar ratio between the mercapto groups of the polythiol compound contained in the polythiol composition and the isocyanato groups of the polyisocyanate compound (mercapto groups/isocyanato groups) is preferably from 0.5 to 3.0, more preferably from 0.6 to 2.0, still more preferably from 0.8 to 1.3.

In the step of obtaining a polymerizable composition, a total charged mass of the polythiol composition and the polyisocyanate compound is not particularly limited; however, it is preferably not less than 60% by mass, more preferably not less than 80% by mass, still more preferably not less than 90% by mass, with respect to a total amount of the polymerizable composition to be produced.

In the step of obtaining a polymerizable composition, at least the above-described polythiol composition and polyisocyanate compound are mixed and, if necessary, other components may also be mixed along with the polythiol composition and the polyisocyanate compound.

In the step of obtaining a polymerizable composition, after mixing the polythiol composition and the polyisocyanate compound, other components may be added to the resulting mixture.

Examples of these other components include a polymerization catalyst, an internal mold release agent, a resin modifier, a chain extender, a crosslinking agent, a radical scavenger, a light stabilizer, a UV absorber, an antioxidant, an oil-soluble dye, a filler, an adhesion improver, an anti-microbial agent, an antistatic agent, a dye, a fluorescent brightener, a fluorescent pigment, and an inorganic pigment.

Examples of the polymerization catalyst include tertiary amine compounds, inorganic and organic acid salts thereof, metal compounds, quaternary ammonium salts, and organic sulfonic acids.

As the internal mold release agent, an acidic phosphoric acid ester can be used. Examples of the acidic phosphoric acid ester include phosphoric acid monoesters and phosphoric acid diesters, and these may be used singly, or in combination of two or more kinds thereof.

Examples of the resin modifier include episulfide compounds, alcohol compounds, amine compounds, epoxy compounds, organic acids, organic acid anhydrides, and olefin compounds containing a (meth)acrylate compound or the like. The term "(meth)acrylate compound" used herein means at least one of an acrylate compound or a methacrylate compound.

In the step of obtaining a polymerizable composition, the above-described components can be mixed in accordance with a conventional method, and a mixing method is not particularly limited.

[Method of Producing Resin]

The method of producing a resin according to the first embodiment of the disclosure includes:

a step of producing a polymerizable composition by the above-described method of producing a polymerizable composition according to the first embodiment; and a step of obtaining a resin by curing the polymerizable composition.

The method of producing a resin according to the first embodiment, if necessary, may also include other steps.

According to the method of producing a resin according to the first embodiment, the same effects as those of the above-described method of producing a polymerizable composition according to the first embodiment are exerted.

The resin produced by the method of producing a resin according to the first embodiment and the below-described resin according to the first embodiment are both thiourethane resins, and they are each hereinafter simply referred to as "resin" so as to distinguish them from a thiourethane resin that is a starting material of a polythiol composition.

In the step of obtaining a resin, a resin is obtained by curing the above-described polymerizable composition.

The polymerizable composition can be cured by polymerizing the monomers contained in the polymerizable composition (specifically the polythiol composition and the polyisocyanate compound; the same applies hereinafter). As a pretreatment of this polymerization, the polymerizable composition may be subjected to filtration, degassing, and the like.

The conditions for the polymerization of the monomers contained in the polymerizable composition (e.g., polymerization temperature and polymerization time) are set as appropriate, taking into consideration the formulation of the composition, the types and the amounts of the monomers used in the composition, the type and the amount of a polymerization catalyst used in the composition, and the properties of the below-described mold if used, and the like.

The polymerization temperature is, for example, from −50° C. to 150° C., or from 10° C. to 150° C.

The polymerization time is, for example, from 1 hour to 200 hours, or from 1 hour to 80 hours.

In the step of obtaining a resin, a resin may be obtained by performing a treatment such as annealing on a polymer obtained by the polymerization of the monomers.

The temperature of this annealing is, for example, from 50° C. to 150° C., from 90° C. to 140° C., or from 100° C. to 130° C.

[Method of Producing Formed Body]

The method of producing a formed body according to the first embodiment of the disclosure is a method of producing a resin-containing formed body, and includes:

a step of producing a polymerizable composition by the above-described method of producing a polymerizable composition according to the first embodiment; and a step of obtaining a resin-containing formed body by curing the polymerizable composition.

The method of producing a formed body according to the disclosure, if necessary, may also include other steps.

According to the method of producing a formed body according to the first embodiment, the same effects as those of the above-described method of producing a polymerizable composition according to the first embodiment are exerted.

In the step of obtaining a resin-containing formed body, a resin-containing formed body is obtained by curing the above-described polymerizable composition.

With regard to preferred conditions for the curing of the polymerizable composition, i.e., the polymerization of the monomers contained in the polymerizable composition, reference can be made as appropriate to the above section of "Method of Producing Resin".

One example of the polymerization in this step is cast polymerization.

In the cast polymerization, first, the above-described polymerizable composition is injected between casting molds held by a gasket, a tape, or the like. In this process, if necessary, a defoaming treatment, a filtration treatment, and the like may be performed.

Next, the monomers contained in the polymerizable composition injected between the casting molds are polymerized to cure the composition between the casting molds and thereby obtain a cured product. Subsequently, the cured product is removed from the casting molds to obtain a resin-containing formed body.

The polymerization of the monomers may also be performed by heating the polymerizable composition. This heating can be performed using, for example, a heating apparatus equipped with a mechanism for heating a material to be heated in an oven, water, or the like.

[Method of Producing Optical Material and Method of Producing Lens]

The method of producing an optical material (e.g., a lens) according to the first embodiment of the disclosure is a method of producing an optical material (e.g., a lens) containing a resin-containing formed body, and includes:

a step of producing a polymerizable composition by the above-described method of producing a polymerizable composition according to the first embodiment; and a step of obtaining a resin-containing formed body by curing the polymerizable composition.

The method of producing an optical material (e.g., a lens; the same applies hereinafter) according to the disclosure, if necessary, may also include other steps.

According to the method of producing an optical material according to the first embodiment, the same effects as those of the above-described method of producing a polymerizable composition according to the first embodiment are exerted.

The method of producing an optical material according to the first embodiment is an application of the method of producing a formed body according to the first embodiment.

For example, by appropriately selecting the shape of the casting molds used in the above-described cast polymerization in the method of producing a formed body according to the first embodiment, a formed body that is applicable to an optical material (e.g., a lens) can be obtained.

Examples of the optical material include lenses (e.g., eyeglass lenses, camera lenses, and polarizing lenses), and light-emitting diodes (LEDs).

The method of producing an optical material (e.g., a lens) according to the first embodiment may also include the step of forming a coating layer on one side or both sides of a resin-containing formed body.

Specific examples of the coating layer include a primer layer, a hard coat layer, an anti-reflection layer, an anti-fog coating layer, an anti-fouling layer, and a water-repellent layer.

These coating layers may each be formed singly, or plural coating layers may be formed in the form of a multilayer structure. When coating layers are formed on both sides, the same coating layer may be formed on the respective sides, or different coating layers may be formed on the respective sides.

Components of the coating layer can be selected as appropriate in accordance with the intended purpose.

Examples of the components of the coating layer include a resin (e.g., a urethane resin, an epoxy resin, a polyester resin, a melamine resin, or a polyvinyl acetal resin), an infrared absorber, a light stabilizer, an antioxidant, a photochromic compound, a dye, a pigment, and an antistatic agent.

With regard to the eyeglass lens and the coating layer, reference can be made as appropriate to the descriptions of known documents, such as WO 2017/047745.

[Polymerizable Composition]

The polymerizable composition according to the first embodiment of the disclosure contains: a polythiol composition obtained by the above-described method of producing a thiourethane resin raw material according to the first embodiment; and a polyisocyanate compound.

The polymerizable composition of the first embodiment can be produced by the above-described method of producing a polymerizable composition according to the first embodiment.

According to the polymerizable composition of the first embodiment, the same effects as those of the above-described method of producing a polymerizable composition according to the first embodiment are exerted.

With regard to a preferred aspect of the polymerizable composition of the first embodiment, reference can be made as appropriate to the above-described method of producing a polymerizable composition according to the first embodiment.

It is noted here, however, that "charged mass [polythiol composition/polyisocyanate compound]" is replaced with "content mass ratio [polythiol composition/polyisocyanate compound]", and "total charged mass of the polythiol composition and the polyisocyanate compound" is replaced with "total content of the polythiol composition and the polyisocyanate compound".

[Resin, Formed Body, and Optical Material (e.g., Lens)]

The resin according to the first embodiment of the disclosure is a cured product of the above-described polymerizable composition according to the first embodiment of the disclosure.

The formed body according to the first embodiment of the disclosure is a formed body containing the above-described resin according to the first embodiment of the disclosure.

The optical material (e.g., a lens) according to the first embodiment of the disclosure is an optical material (e.g., a lens) containing the above-described resin according to the first embodiment of the disclosure.

According to the resin of the first embodiment, the formed body of the first embodiment, and the optical material (e.g., a lens) of the first embodiment, the same effects as those of the above-described method of producing a polymerizable composition according to the first embodiment are exerted.

The resin of the first embodiment, the formed body of the first embodiment, and the optical material (e.g., a lens) of the first embodiment can be produced by the above-described method of producing a resin according to the first embodiment, the above-described method of producing a formed body according to the first embodiment, and the above-described method of producing an optical material (e.g., a lens) according to the first embodiment, respectively.

With regard to preferred aspects of the resin of the first embodiment, the formed body of the first embodiment, and the optical material (e.g., a lens) of the first embodiment, reference can be made to the above-described preferred aspects of the method of producing a resin according to the first embodiment, the method of producing a formed body according to the first embodiment, and the method of producing an optical material (e.g., a lens) according to the first embodiment, respectively.

<Preferred Performance of Resin or Formed Body>

From the standpoint of heat resistance, the resin (or formed body) according to the first embodiment of the disclosure has a glass transition temperature Tg of preferably 70° C. or higher, more preferably 80° C. or higher, still more preferably 85° C. or higher.

The glass transition temperature Tg may be 130° C. or lower, 120° C. or lower, or 110° C. or lower.

From the standpoint of application to an optical material, the resin (or formed body) according to the first embodiment of the disclosure has a refractive index (ne) of preferably 1.500 or higher, more preferably 1.540 or higher, still more preferably 1.590 or higher.

An upper limit of the refractive index (ne) is not particularly limited, and it is, for example, 1.750.

From the standpoint of application to an optical material, the resin (or formed body) according to the first embodiment of the disclosure has an Abbe number of preferably 28 or greater, more preferably 30 or greater.

An upper limit of the Abbe number is not particularly limited, and it is, for example, 50, preferably 45.

From the standpoint of application to an optical material, the resin (or formed body) according to the first embodiment of the disclosure has a specific gravity d of preferably 1.10 or higher, more preferably 1.20 or higher.

An upper limit of the specific gravity d is not particularly limited, and it is, for example, 1.50, preferably 1.40.

Second Embodiment

[Method of Producing Thiourethane Resin Raw Material]

The method of producing a thiourethane resin raw material according to the second embodiment of the disclosure includes a step of generating the thiourethane resin raw material by contacting the active hydrogen compound and a resin mixture comprising the thiourethane resin with each other to generate a thiourethane resin raw material.

The method of producing a thiourethane resin raw material according to the second embodiment, if necessary, may also include other steps.

According to the method of producing a thiourethane resin raw material according to the second embodiment, a thiourethane resin raw material can be produced using a resin mixture containing a thiourethane resin as a starting material.

The reason why this effect is exerted is presumed as follows.

In the method of producing a thiourethane resin raw material according to the second embodiment, it is believed that, by contacting an active hydrogen compound and a resin mixture comprising the thiourethane resin with each other, the active hydrogen compound and the thiourethane resin in the resin mixture are allowed to selectively react with each other. It is believed that the thiourethane resin is chemically decomposed by this reaction, as a result of which a thiourethane resin raw material is obtained as a decomposition product of the thiourethane resin.

The resin mixture containing a thiourethane resin in the second embodiment is the same as the resin mixture containing a thiourethane resin in the first embodiment.

The method of producing a thiourethane resin raw material according to the second embodiment is the same as the method of producing a thiourethane resin raw material according to the first embodiment, except for contacting an active hydrogen compound and a resin mixture comprising the thiourethane resin with each other, and preferred ranges of these methods are also the same.

<Examples of Specific Aspects>

The second embodiment encompasses the following specific aspects.

<2-1> A method of producing a thiourethane resin raw material, the method including step of generating the thiourethane resin raw material by contacting the active hydrogen compound and a resin mixture comprising the thiourethane resin with each other to generate a thiourethane resin raw material.

<2-2> The method of producing a thiourethane resin raw material according to <2-1>, wherein the resin mixture containing a thiourethane resin is collected in at least one of an eyeglass lens production process, an eyeglass production process, or an eyeglass disposal process.

<2-3> The method of producing a thiourethane resin raw material according to <2-1> or <2-2>, wherein the resin mixture containing a thiourethane resin contains a cut powder containing the thiourethane resin.

<2-4> The method of producing a thiourethane resin raw material according to any one of <2-1> to <2-3>, wherein the thiourethane resin raw material contains at least one selected from the group consisting of a polythiol composition, a polyamine compound, and a polyisocyanate compound.

<2-5> The method of producing a thiourethane resin raw material according to any one of <2-1> to <2-4>, wherein the active hydrogen compound is at least one selected from the group consisting of an amine compound and an alcohol compound.

<2-6> The method of producing a thiourethane resin raw material according to any one of <2-1> to <2-5>, wherein the resin mixture containing a thiourethane resin further contains at least one selected from the group consisting of a polycarbonate resin, a polyallylcarbonate resin, an acrylic resin, a urethane resin, and an episulfide resin.

Third Embodiment

[Method of Producing Thiourethane Resin Raw Material]

The method of producing a polythiol composition according to the third embodiment of the disclosure includes the reaction step of reacting a thiourethane resin and an amine compound with each other to generate a polythiol composition.

According to the method of producing a polythiol composition according to the third embodiment, a polythiol composition can be produced as a target material using a thiourethane resin as a starting material.

In the reaction step, aminolysis, which is a reaction in which the thiourethane resin is decomposed by the amine compound, occurs, and a polythiol composition that is a target material is generated as a result of this aminolysis.

The meaning and preferred aspect of the polythiol composition in the third embodiment are the same as those of the polythiol composition in the first embodiment.

The steps that may be included in the method of producing a polythiol composition according to the third embodiment will now be described.

<Reaction Step>

The reaction step in the third embodiment is the step of generating a polythiol composition by reacting a thiourethane resin and an amine compound with each other.

The reaction step in the third embodiment is the same as the step of generating the thiourethane resin raw material in the first embodiment, except that the active hydrogen compound reacted with the thiourethane resin and the thiourethane resin raw material that is a target material are limited to be an amine compound and a polythiol composition, respectively.

(Thiourethane Resin)

The thiourethane resin used in the reaction step according to the third embodiment is the same as the thiourethane resin used in the step of generating the thiourethane resin raw material according to the first embodiment, and preferred ranges of these thiourethane resins are also the same.

The thiourethane resin usually contains a polymer of an isocyanate compound and a polythiol composition. In other words, the thiourethane resin is usually produced using an isocyanate compound and a polythiol composition as raw materials.

—Isocyanate Compound as Raw Material of Thiourethane Resin—

The isocyanate compound as a raw material of the thiourethane resin may be used singly, or in combination of two or more kinds thereof.

Examples of the isocyanate compound as a raw material of the thiourethane resin include those known isocyanate compounds that are described in the aforementioned known documents.

The isocyanate compound as a raw material of the thiourethane resin preferably contains a polyisocyanate compound containing two or more isocyanato groups.

A preferred aspect of the isocyanate compound as a raw material of the thiourethane resin in the third embodiment is the same as that of the polyisocyanate compound as a target material in the first embodiment.

—Polythiol Composition as Raw Material of Thiourethane Resin—

The polythiol composition as a raw material of the thiourethane resin contains at least one polythiol compound.

The polythiol compound as a raw material of the thiourethane resin may be any compound containing two or more thiol groups (i.e., mercapto groups), and has no other particular limitation.

Examples of the polythiol compound contained in the polythiol composition as a raw material of the thiourethane resin include those known polythiol compounds that are described in the aforementioned known documents.

A preferred aspect of the polythiol composition as a raw material of the thiourethane resin is the same as that of the polythiol composition as a target material in the first embodiment.

—Other Components—

The thiourethane resin may also contain at least one other component in addition to a polymer of the isocyanate compound and the polythiol composition.

With regard to other components that may be contained in the thiourethane resin, reference can be made as appropriate to the components that may be contained in the below-described polymerizable composition.

—Powder Containing Thiourethane Resin—

In the reaction step, it is preferred to contact a powder containing the thiourethane resin (hereinafter, also referred to as "thiourethane resin powder") and an amine compound with each other to cause the thiourethane resin in the powder and the amine compound react with each other. By this, the efficiency of the reaction between the thiourethane resin and the amine compound can be further improved.

A method of contacting the thiourethane resin powder and the amine compound with each other is not particularly limited, and one example thereof is a method of charging the thiourethane resin powder and the amine compound (and a reaction solvent if necessary) to a reaction vessel and stirring the charged materials. In this example, the order of charging the thiourethane resin powder and the amine compound (and a reaction solvent if necessary) to the reaction vessel is not particularly limited.

The thiourethane resin powder is not particularly limited; however, it is preferably a cut powder (encompassing the concept of ground powder; the same applies hereinafter) of a formed body containing the thiourethane resin and/or the above-described cut powder applied to a sieve (i.e., the cut powder passed through the sieve).

The cut powder of a formed body containing the thiourethane resin is generated in, for example, the process of producing an optical material (e.g., a lens) by cutting the formed body containing the thiourethane resin.

The thiourethane resin powder may be a massive powder obtained by crushing and/or pulverizing a formed body containing the thiourethane resin.

(Amine Compound)

As the amine compound in the reaction step, any known amine compound can be used with no particular limitation.

In the reaction step, the amine compound may be used singly, or in combination of two or more kinds thereof.

A preferred aspect of the amine compound used in the reaction step according to the third embodiment is the same as that of the amine compound used as an active hydrogen compound in the first embodiment.

One preferred example of the amine compound is an amine compound of 300 or less in molecular weight, which contains at least one of an amino group or a monoalkylamino group, and has a total number of amino groups and monoalkylamino groups of 1 or 2.

A preferred charged amount of the amine compound used in the reaction step will now be described.

The below-described preferred charged amount also corresponds to a preferred charged amount of the amine compound described above as a preferred example (i.e., an amine compound of 300 or less in molecular weight, which contains at least one of an amino group or a monoalkylamino group, and has a total number of amino groups and monoalkylamino groups of 1 or 2).

—Charged amount of Amine Compound—

In the reaction step, a charged mass ratio of the amine compound with respect to the thiourethane resin (i.e., charged mass ratio [amine compound/thiourethane resin]) can be adjusted as appropriate, and it is preferably 0.10 or higher but lower than 1.0.

When the charged mass ratio [amine compound/thiourethane resin] is 0.10 or higher, the generation of a polythiol composition is further facilitated.

When the charged mass ratio [amine compound/thiourethane resin] is lower than 1.0, the amine compound can be further prevented from remaining in a reaction mixture.

The charged mass ratio [amine compound/thiourethane resin] is preferably from 0.15 to 0.95, more preferably from 0.20 to 0.90.

In the reaction step, the number of charged millimoles of the amine compound with respect to 1 g of the thiourethane resin is preferably from 1.0 mmol/g to 30 mmol/g, more preferably from 2.0 mmol/g to 20 mmol/g, still more preferably from 3.0 mmol/g to 10.0 mmol/g.

In the reaction step, a charged equivalent of the amine compound with respect to the thiourethane resin (charged equivalent [amine compound/thiourethane resin]) is preferably from 1.0 to 2.0, more preferably more than 1.0 but 1.8 or less, still more preferably more than 1.0 but 1.6 or less.

When the charged equivalent [amine compound/thiourethane resin] is 1.0 or more, the generation of a polythiol composition is further facilitated.

When the charged equivalent [amine compound/thiourethane resin] is 2.0 or less, the amine compound can be further prevented from remaining in a reaction mixture.

It is noted here that the charged equivalent of the amine compound with respect to the thiourethane resin (charged equivalent [amine compound/thiourethane resin]) means a ratio of a total number of amino groups and monoalkylamino groups in the charged amine compound with respect to a total number of thiourethane bonds in the charged thiourethane resin.

(Reaction Solvent)

In the reaction step, the thiourethane resin and the amine compound are preferably reacted in the presence of a reaction solvent.

The reaction solvent is preferably a hydrocarbon compound having from 5 to 12 (preferably from 6 to 10, more preferably from 7 to 9) carbon atoms, an ether compound having from 4 to 12 carbon atoms, a ketone compound having from 3 to 12 carbon atoms, an ester compound having from 4 to 12 carbon atoms, an alcohol compound having from 2 to 12 carbon atoms, or a nitrile compound having from 2 to 12 carbon atoms.

Compounds preferred as the reaction solvent in the second embodiment are the same as the compounds preferred as the reaction solvent in the first embodiment.

As the reaction solvent, such compounds may be used singly, or in combination of two or more kinds thereof.

(Reaction Temperature)

A reaction temperature of the thiourethane resin and the amine compound in the reaction step can be adjusted as appropriate.

In the reaction step, the thiourethane resin and the amine compound are preferably reacted under a temperature condition (i.e., reaction temperature) of from 50° C. to 150° C. (more preferably from 60° C. to 145° C., still more preferably from 70° C. to 140° C.).

When the reaction temperature is from 50° C. to 150° C., the purity of a polythiol component as a main component in the polythiol composition as a target material (i.e., the content of the main component with respect to a total amount of the polythiol composition) can be further improved.

(Reaction Time)

A reaction time of the thiourethane resin and the amine compound in the reaction step can be adjusted as appropriate, and it is preferably from 0.1 hours to 20 hours, more preferably from 0.5 hours to 16 hours, still more preferably from 1 hour to 10 hours.

(Polythiol Composition as Target Material)

Examples of the polythiol composition as a target material in the third embodiment include the same ones as those exemplified above for the polythiol composition as a target material (i.e., thiourethane resin raw material) in the first embodiment, and preferred aspects of these polythiol compositions are also the same.

The polythiol composition as a target material and the polythiol composition as a raw material of a thiourethane resin used as a starting material are not required to be completely identical.

However, from the standpoint of the performance of the thiourethane resin produced from the polythiol composition that is a target material, it is preferred that the type of a polythiol component contained as a main component in the polythiol composition as a target material is the same as the type of a polythiol component contained as a main component in the polythiol composition as a raw material. In this case, for example, by using a cut powder (thiourethane resin) generated in the production of an optical material A as a raw material, an optical material B (thiourethane resin-containing optical material) having comparable performance to the optical material A can be produced.

The use of the polythiol composition that is a target material is not particularly limited.

For example, the polythiol composition that is a target material can be used for the production of a thiourethane resin.

One example of specific use of the polythiol composition that is a target material is the use for the production of an optical material (e.g., a lens).

In other words, one specific example of the method of producing a polythiol composition according to the disclosure is a method of producing a polythiol composition for the production of an optical material. In this specific example, when a cut powder containing a thiourethane resin, which is generated in the production of an optical material, is used as a starting material, effective utilization (i.e., recycle) of materials (the thiourethane resin and a polythiol composition that is a raw material of the thiourethane resin) is realized effectively.

In addition, in the reaction step of the disclosure, by obtaining a polythiol composition by a reaction between the thiourethane resin and the amine compound, a polythiol composition having a higher purity of a polythiol component as a main component can be obtained as compared to a known method (e.g., a method of obtaining a polythiol composition by a reaction between a thiourethane resin and sodium hydroxide; see the below-described Comparative Example 1).

Therefore, also when the polythiol composition obtained as a target material is used for the production of an optical material (e.g., a lens), an optical material having favorable performance can be obtained.

Examples of the performance of the optical material include optical properties (e.g., refractive index and/or Abbe number), heat resistance, and specific gravity d.

(Reaction Mixture Containing Polythiol Composition)

The reaction step may also be the step of obtaining a reaction mixture containing the polythiol composition as a target material.

In this case, the reaction step includes preferably obtaining a reaction mixture containing the polythiol composition by reacting the thiourethane resin and the amine compound with each other in the presence of a reaction solvent (preferably a hydrocarbon compound having from 5 to 12 carbon atoms).

The reaction mixture may also contain a polythiol composition that is a main product generated by aminolysis, and components other than this polythiol composition.

Examples of such other components include by-products generated by aminolysis (e.g., a polyurea compound), the above-described reaction solvent, residue of the raw material(s) (thiourethane resin and/or amine compound), and impurities contained in the raw materials.

<Separation Step>

The method of producing a polythiol composition according to the third embodiment may also include the separation step of separating the polythiol composition as a target material from the above-described reaction mixture containing the polythiol composition.

A separation method in the separation step is not particularly limited, and any known method can be applied.

Examples of the separation method in the separation step include filtration, decantation, extraction, distillation, drying (including vacuum drying), and purification (e.g., column chromatography). These separation methods may be used in combination of two or more thereof.

The separation step preferably includes obtaining a filtrate containing the polythiol composition by filtration of the reaction mixture containing the polythiol composition obtained in the reaction step.

According to this aspect, solids (e.g., a solid containing a by-product) contained in the reaction mixture can be removed more easily.

One example of a more preferred aspect in which the separation step includes obtaining a filtrate containing the polythiol composition is an aspect (hereinafter, referred to as "separation aspect A") in which the separation step includes:

filtering the reaction mixture containing the polythiol composition to obtain a filtrate containing the polythiol composition;

acid washing the filtrate containing the polythiol composition; and separating the polythiol composition from the thus acid-washed filtrate.

According to this separation aspect A, since alkali components (e.g., a residue of the amine compound) are easily removed from the filtrate by the acid washing, a polythiol composition having a higher purity of a polythiol component as a main component can be obtained.

In the separation aspect A, water washing may be additionally performed after the acid washing, and the polythiol composition may be separated from the thus water-washed filtrate.

In the separation aspect A, examples of an acid used in the acid washing include hydrochloric acid, carbonic acid, nitric acid, sulfuric acid, acetic acid, formic acid, and oxalic acid.

Another example of a more preferred aspect in which the separation step includes obtaining a filtrate containing the polythiol composition is an aspect (hereinafter, referred to as "separation aspect B") in which the separation step includes:

filtering the reaction mixture containing the polythiol composition to obtain a filtrate containing the polythiol composition;

adding an alkali metal-containing base and then water to the filtrate containing the polythiol composition to perform extraction and thereby obtain a water extract containing an alkali metal salt of the polythiol composition;

adding an acid to the water extract containing an alkali metal salt of the polythiol composition to obtain an aqueous liquid containing the polythiol composition;

adding a hydrocarbon compound having from 5 to 12 carbon atoms as an extraction solvent to the aqueous liquid containing the polythiol composition to perform extraction and thereby obtain an extract containing the polythiol composition; and separating the polythiol composition from the extract containing the polythiol composition.

In the separation aspect B, first, the polythiol composition in the filtrate containing the polythiol composition is converted to an alkali metal salt and subsequently extracted with water to obtain a water extract containing the alkali metal salt of the polythiol composition. Next, an acid is added to this water extract to convert the alkali metal salt of the polythiol composition back to the polythiol composition. From the resulting aqueous liquid containing the polythiol composition, the polythiol composition is extracted with the above-described extraction solvent to obtain an extract containing the polythiol composition. The polythiol composition is then separated from the thus obtained extract containing the polythiol composition.

According to this separation aspect B, even when the filtrate containing the polythiol composition contains a large amount of components other than the polythiol composition, a polythiol composition having a higher purity of a polythiol component as a main component can be obtained.

In the separation aspect B, the alkali metal in the alkali metal-containing base is preferably sodium, potassium, or lithium, more preferably sodium or potassium.

Examples of the alkali metal-containing base include sodium methoxide, sodium ethoxide, sodium propoxide, sodium hydroxide, potassium hydroxide, and lithium hydroxide.

If necessary, the alkali metal-containing base can be added to the filtrate in the form of an alcohol solution (e.g., a methanol solution or an ethanol solution).

In the separation aspect B, examples of the acid added to the water extract containing an alkali metal salt of the polythiol composition include hydrochloric acid, carbonic acid, nitric acid, sulfuric acid, acetic acid, formic acid, and oxalic acid.

In the separation aspect B, the hydrocarbon compound as the extraction solvent may be used singly, or in combination of two or more kinds thereof.

In the separation aspect B, a preferred aspect of the hydrocarbon compound used as the extraction solvent is the same as that of the hydrocarbon compound used as the above-described reaction solvent.

It is noted here, however, that the reaction solvent and the extraction solvent may be the same or different.

Yet another example of a more preferred aspect in which the separation step includes obtaining a filtrate containing the polythiol composition is an aspect (hereinafter, referred to as "separation aspect C") in which the separation step includes:

separating the reaction mixture containing the polythiol composition by decantation to obtain a residue containing the polythiol composition;

adding an alkali metal-containing base and then water to the residue containing the polythiol composition to perform extraction and thereby obtain a water extract containing an alkali metal salt of the polythiol composition;

adding an acid to the water extract containing an alkali metal salt of the polythiol composition to obtain an aqueous liquid containing the polythiol composition;

adding a hydrocarbon compound having from 5 to 12 carbon atoms as an extraction solvent to the aqueous liquid containing the polythiol composition to perform extraction and thereby obtain an extract containing the polythiol composition; and separating the polythiol composition from the extract containing the polythiol composition.

The separation aspect C is the same as the separation aspect B, except for obtaining a residue containing the polythiol composition by a decantation method.

<Classification Step>

The method of producing a polythiol composition according to the third embodiment may further include, prior to the reaction step, the classification step of classifying a cut powder containing the thiourethane resin to obtain a powder containing the thiourethane resin (i.e., the cut powder whose average particle size has been reduced), which powder has a smaller average particle size (e.g., number-average value of the equivalent circle diameter) than the cut powder. In this case, the thiourethane resin in the obtained powder and the amin compound react with each other by contacting the obtained powder and the amin compound with each other.

When the method of producing a polythiol composition according to the third embodiment includes this classification step, since the powder consisting of particles having a small particle size (i.e., average particle size) and the amine compound contact with each other in the reaction step, the efficiency of the reaction between the thiourethane resin and the amine compound can be further improved.

The "average particle size" in the third embodiment is, for example, a number-average particle size.

The "particle size" is, for example, equivalent circle diameter.

Examples of a classification method include sieving and centrifugation.

With regard to an aspect in which classification is performed by sieving, reference can be made to the below-described sieving step.

<Sieving Step>

The method of producing a polythiol composition according to the third embodiment may further include, prior to the reaction step, the sieving step of applying a cut powder containing the thiourethane resin to a sieve to obtain a powder containing the thiourethane resin and passing through the sieve (i.e., the cut powder passed through the sieve). In this case, in the reaction step, the thiourethane resin in the obtained powder and the amine compound react with each other by contacting the obtained powder and the amine compound with each other.

When the method of producing a polythiol composition according to the third embodiment includes this sieving step, since the powder consisting of particles having a small particle size and the amine compound with each other in the reaction step, the efficiency of the reaction between the thiourethane resin and the amine compound can be further improved.

The above-described sieve is not particularly limited.

The nominal mesh size of the sieve, which is defined by JIS Z-8801-1:2019, is, for example, from 0.1 mm to 20 mm, preferably from 0.1 mm to 10 mm, more preferably from 0.1 mm to 5 mm, still more preferably from 0.1 mm to 2 mm, yet still more preferably from 0.3 mm to 2 mm, further more preferably from 0.5 mm to 1.5 mm.

<Washing Step>

The method of producing a polythiol composition according to the third embodiment may further include, prior to the reaction step, the washing step of washing the thiourethane resin powder (i.e., powder containing the thiourethane resin) using a hydrocarbon compound having from 5 to 12 carbon atoms as a washing solvent. In this case, in the reaction step, the thiourethane resin in the thiourethane resin powder washed in the washing step and the amine compound react with each other. As a result, a polythiol composition having a higher purity of a polythiol component as a main component can be obtained.

Particularly, in the method of producing a polythiol composition according to the third embodiment, when a cut powder containing the thiourethane resin is used as a starting material, an oil adhering to the cut powder, which is originated from a cutting machine, can be effectively removed by the washing step; therefore, a polythiol composition having a higher purity of a polythiol component as a main component can be obtained.

The hydrocarbon compound as the washing solvent may be used singly, or in combination of two or more kinds thereof.

A preferred aspect of the hydrocarbon compound used as the washing solvent is the same as that of the hydrocarbon compound used as the above-described reaction solvent.

It is noted here, however, that the reaction solvent and the washing solvent may be the same or different.

A washing method in the washing step is not particularly limited, and any known method, such as a method of adding the above-described washing solvent to the thiourethane resin powder and mixing the resultant, can be applied.

When the method of producing a polythiol composition according to the third embodiment includes the above-described sieving step and washing step, the sieving step and the washing step are preferably performed in this order. In this case, since it is not necessary to wash the cut powder not passing through the sieve, the amount of the washing solvent to be used can be further reduced.

[Method of Producing Polymerizable Composition]

The method of producing a polymerizable composition according to the third embodiment of the disclosure includes:

the step of producing a polythiol composition by the above-described method of producing a polythiol composition according to the third embodiment; and the step of obtaining a polymerizable composition containing the polythiol composition and a polyisocyanate compound by mixing at least the polythiol composition and the polyisocyanate compound.

The method of producing a polymerizable composition according to the third embodiment, if necessary, may also include other steps.

In the method of producing a polymerizable composition according to the third embodiment:

in the step of producing a polythiol composition, a polythiol composition is produced using a thiourethane resin (e.g., a thiourethane resin contained in a ground powder of a formed body of the thiourethane resin) as a starting material; and in the step of obtaining a polymerizable composition, a polymerizable composition containing the thus produced polythiol composition and a polyisocyanate compound is produced.

The thus obtained polymerizable composition can be used again for the production of a thiourethane resin.

In this manner, in the method of producing a polymerizable composition according to the third embodiment, effective utilization (i.e., recycle) of materials (i.e., a thiourethane resin and a polythiol composition that is a raw material of the thiourethane resin) is realized.

In addition, the method of producing a polythiol composition according to the third embodiment can yield a polythiol composition having a higher purity of a polythiol component as a main component as compared to a known method (e.g., a method of obtaining a polythiol composition by a reaction between a thiourethane resin and sodium hydroxide; see the below-described Comparative Example 1).

In the method of producing a polymerizable composition according to the third embodiment, such a polythiol composition is used; therefore, according to the polymerizable composition obtained by the method of producing a polymerizable composition according to the third embodiment, a resin that is excellent in various performance [for example, optical properties (e.g., refractive index and/or Abbe number), heat resistance, and specific gravity d] can be produced.

Hence, the polymerizable composition obtained by the method of producing a polymerizable composition according to the third embodiment is particularly suitable as a composition for the production of a thiourethane resin for an optical material.

In the method of producing a polymerizable composition according to the third embodiment, the step of producing a polythiol composition is the step of producing a polythiol composition by the method of producing a polythiol composition according to the third embodiment.

Meanwhile, in the method of producing a polymerizable composition according to the first embodiment, the step of producing a polythiol composition is the step of producing a polythiol composition as a thiourethane resin raw material by the method of producing a thiourethane resin raw material according to the first embodiment.

Except for this point, the method of producing a polymerizable composition according to the third embodiment is the same as the method of producing a polymerizable composition according to the first embodiment, and preferred aspects of these methods are also the same.

[Method of Producing Resin]

The method of producing a resin according to the third embodiment of the disclosure includes:

the step of producing a polymerizable composition by the above-described method of producing a polymerizable composition according to the third embodiment of the disclosure; and the step of obtaining a resin by curing the polymerizable composition.

The method of producing a resin according to the third embodiment of the disclosure, if necessary, may also include other steps.

According to the method of producing a resin according to the third embodiment of the disclosure, the same effects as those of the above-described method of producing a polymerizable composition according to the third embodiment of the disclosure are exerted.

In the method of producing a resin according to the third embodiment, a polymerizable composition is produced by the method of producing a polymerizable composition according to the third embodiment in the step of producing a polymerizable composition.

Meanwhile, in the method of producing a resin according to the first embodiment, a polymerizable composition is produced by the method of producing a polymerizable composition according to the first embodiment in the step of producing a polymerizable composition.

Except for this point, the method of producing a resin according to the third embodiment is the same as the method of producing a resin according to the first embodiment, and preferred aspects of these methods are also the same.

[Method of Producing Formed Body]

The method of producing a formed body according to the third embodiment of the disclosure is a method of producing a resin-containing formed body, and includes:

the step of producing a polymerizable composition by the above-described method of producing a polymerizable composition according to the third embodiment; and the step of obtaining a resin-containing formed body by curing the polymerizable composition.

The method of producing a formed body according to the third embodiment, if necessary, may also include other steps.

According to the method of producing a formed body according to the third embodiment, the same effects as those of the above-described method of producing a polymerizable composition according to the third embodiment are exerted.

In the method of producing a formed body according to the third embodiment, a polymerizable composition is produced by the method of producing a polymerizable composition according to the third embodiment in the step of producing a polymerizable composition.

Meanwhile, in the method of producing a formed body according to the first embodiment, a polymerizable composition is produced by the method of producing a polymerizable composition according to the first embodiment in the step of producing a polymerizable composition.

Except for this point, the method of producing a formed body according to the third embodiment is the same as the method of producing a formed body according to the first embodiment, and preferred aspects of these methods are also the same.

[Method of Producing Optical Material and Method of Producing Lens]

The method of producing an optical material (e.g., a lens) according to the third embodiment of the disclosure is a method of producing an optical material (e.g., a lens) containing a resin-containing formed body, and includes:

the step of producing a polymerizable composition by the above-described method of producing a polymerizable composition according to the third embodiment; and the step of obtaining a resin-containing formed body by curing the polymerizable composition.

The method of producing an optical material (e.g., a lens; the same applies hereinafter) according to the third embodiment of the disclosure, if necessary, may also include other steps.

According to the method of producing an optical material according to the third embodiment, the same effects as those of the above-described method of producing a polymerizable composition according to the third embodiment are exerted.

In the method of producing an optical material according to the third embodiment, a polymerizable composition is produced by the method of producing a polymerizable composition according to the third embodiment in the step of producing a polymerizable composition.

Meanwhile, in the method of producing an optical material according to the first embodiment, a polymerizable composition is produced by the method of producing a polymerizable composition according to the first embodiment in the step of producing a polymerizable composition.

Except for this point, the method of producing an optical material according to the third embodiment is the same as the method of producing an optical material according to the first embodiment, and preferred aspects of these methods are also the same.

[Polymerizable Composition]

The polymerizable composition according to the third embodiment of the disclosure contains: a polythiol composition obtained by the above-described method of producing a polythiol composition according to the third embodiment; and a polyisocyanate compound.

The polymerizable composition of the third embodiment can be produced by the above-described method of producing a polymerizable composition according to the third embodiment.

According to the polymerizable composition of the third embodiment, the same effects as those of the above-described method of producing a polymerizable composition according to the third embodiment are exerted.

With regard to a preferred aspect of the polymerizable composition of the third embodiment, reference can be made as appropriate to the above-described method of producing a polymerizable composition according to the third embodiment.

[Resin, Formed body, and Optical Material (e.g., Lens)]

The resin according to the third embodiment of the disclosure is a cured product of the above-described polymerizable composition of the third embodiment.

The formed body according to the third embodiment of the disclosure is a formed body containing the above-described resin of the third embodiment.

The optical material (e.g., a lens) according to the third embodiment of the disclosure is an optical material (e.g., a lens) containing the above-described resin of the third embodiment.

According to the resin of the third embodiment, the formed body of the third embodiment, and the optical material (e.g., a lens) of the third embodiment, the same effects as those of the above-described method of producing a polymerizable composition according to the third embodiment are exerted.

The resin of the third embodiment, the formed body of the third embodiment, and the optical material (e.g., a lens) of the third embodiment can be produced by the above-described method of producing a resin according to the third embodiment, the above-described method of producing a formed body according to the third embodiment, and the above-described method of producing an optical material (e.g., a lens) according to the third embodiment, respectively.

With regard to preferred aspects of the resin of the third embodiment, the formed body of the third embodiment, and the optical material (e.g., a lens) of the third embodiment, reference can be made to the above-described preferred aspects of the method of producing a resin according to the third embodiment, the method of producing a formed body according to the third embodiment, and the method of producing an optical material (e.g., a lens) according to the third embodiment, respectively.

<Preferred Performance of Resin or Formed Body>

Preferred performance of the resin (or formed body) according to the third embodiment of the disclosure are the same as the above-described preferred performance of the resin (or formed body) according to the first embodiment.

<Examples of Specific Aspects>

The third embodiment encompasses the following specific aspects.

<3-1> A method of producing a polythiol composition, the method including a reaction step of reacting a thiourethane resin and an amine compound with each other to generate a polythiol composition.

<3-2> The method of producing a polythiol composition according to <3-1>, wherein, the reaction step includes reacting the thiourethane resin and the amine compound with each other by contacting a powder containing the thiourethane resin and the amine compound with each other.

<3-3> The method of producing a polythiol composition according to <3-2>, wherein the method further includes, prior to the reaction step, the sieving step of sieving a cut powder containing the thiourethane resin to obtain a powder containing the thiourethane resin, the obtained powder having through a sieve, and the reaction step includes reacting the thiourethane resin in the obtained powder and the amine compound react with each other by contacting the obtained powder and the amine compound with each other.

<3-4> The method of producing a polythiol composition according to <3-3>, wherein the sieve has a nominal mesh size of from 0.1 mm to 2 mm as defined by JIS Z-8801-1: 2019.

<3-5> The method of producing a polythiol composition according to any one of <3-1> to <3-4>, wherein the method further includes, prior to the reaction step, a washing step of washing a powder containing the thiourethane resin using a hydrocarbon compound having from 5 to 12 carbon atoms as a washing solvent, and the reaction step includes reacting the thiourethane resin in the powder washed in the washing step and the amine compound with each other by contacting the powder washed in the washing step and the amine compound with each other.

<3-6> The method of producing a polythiol composition according to any one of <3-1> to <3-5>, wherein, the reaction step includes reacting the thiourethane resin and the amine compound with each other under a temperature condition of from 70° C. to 140° C.

<3-7> The method of producing a polythiol composition according to any one of <3-1> to <3-6>, wherein the amine compound is an amine compound of 300 or less in molecular weight, which contains at least one of an amino group or a monoalkylamino group, and has a total number of amino groups and monoalkylamino groups of 1 or 2.

<3-8> The method of producing a polythiol composition according to any one of <3-1> to <3-7>, wherein the polythiol composition contains at least one selected from the group consisting of 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-dimercaptomethyl-1,4-dithiane, bis(mercaptoethyl) sulfide, and diethylene glycol bis(mercaptopropionate).

<3-9> The method of producing a polythiol composition according to any one of <3-1> to <3-8>, which is a method of producing a polythiol composition for the production of an optical material.

<3-10> The method of producing a polythiol composition according to any one of <3-1> to <3-9>, wherein
the reaction step includes obtaining a reaction mixture containing the polythiol composition by reacting the thiourethane resin and the amine compound with each other in the presence of a hydrocarbon compound having from 5 to 12 carbon atoms as a reaction solvent, and
the method further includes a separation step of separating the polythiol composition from the reaction mixture containing the polythiol composition.

<3-11> The method of producing a polythiol composition according to <3-10>, wherein the separation step includes:
filtering the reaction mixture containing the polythiol composition to obtain a filtrate containing the polythiol composition;
acid washing the filtrate containing the polythiol composition; and
separating the polythiol composition from the thus acid-washed filtrate.

<3-12> The method of producing a polythiol composition according to <3-10>, wherein the separation step includes:
filtering the reaction mixture containing the polythiol composition to obtain a filtrate containing the polythiol composition;
adding an alkali metal-containing base and then water to the filtrate containing the polythiol composition to perform extraction and thereby obtain a water extract containing an alkali metal salt of the polythiol composition;
adding an acid to the water extract containing an alkali metal salt of the polythiol composition to obtain an aqueous liquid containing the polythiol composition;
adding a hydrocarbon compound having from 5 to 12 carbon atoms as an extraction solvent to the aqueous liquid containing the polythiol composition to perform extraction and thereby obtain an extract containing the polythiol composition; and
separating the polythiol composition from the extract containing the polythiol composition.

<3-13> A method of producing a polymerizable composition, the method including:
a step of producing a polythiol composition by the method of producing a polythiol composition according to any one of <3-1> to <3-12>; and
a step of obtaining a polymerizable composition containing the polythiol composition and a polyisocyanate compound by mixing together at least the polythiol composition and the polyisocyanate compound.

<3-14> A method of producing a resin, the method including:
a step of producing a polymerizable composition by the method of producing a polymerizable composition according to <3-13>; and
a step of obtaining a resin by curing the polymerizable composition.

<3-15> A method of producing a resin-containing formed body, the method including:
a step of producing a polymerizable composition by the method of producing a polymerizable composition according to <3-13>; and
a step of obtaining a resin-containing formed body by curing the polymerizable composition.

<3-16> A method of producing an optical material containing a resin-containing formed body, the method including:
a step of producing a polymerizable composition by the method of producing a polymerizable composition according to <3-13>; and
a step of obtaining a resin-containing formed body by curing the polymerizable composition.

<3-17> A method of producing a lens containing a resin-containing formed body, the method including:
a step of producing a polymerizable composition by the method of producing a polymerizable composition according to <3-13>; and
a step of obtaining a resin-containing formed body by curing the polymerizable composition.

<3-18> A polymerizable composition, containing:
a polythiol composition obtained by the method of producing a polythiol composition according to any one of <3-1> to <3-12>; and
a polyisocyanate compound.

<3-19> A resin, which is a cured product of the polymerizable composition according to <3-18>.

<3-20> A formed body, containing the resin according to <3-19>.

<3-21> An optical material, containing the formed body according to <3-20>.

<3-22> A lens, containing the formed body according to <3-20>.

Fourth Embodiment

[Method of Producing Polythiol Composition]

The method of producing a polythiol composition according to the fourth embodiment of the disclosure includes a reaction step of reacting a thiourethane resin and an alcohol compound with each other in the presence of a tertiary amine compound to generate a polythiol composition.

According to the method of producing a polythiol composition according to the fourth embodiment, a polythiol composition can be produced as a target material using a thiourethane resin as a starting material.

In the reaction step, alcoholysis, which is a reaction in which the thiourethane resin is decomposed by the alcohol compound, occurs, and a polythiol composition that is a target material is generated as a result of this alcoholysis.

In the reaction step, it is believed that the alcohol compound functions as a decomposition agent in the alcoholysis while the tertiary amine compound functions as a decomposition aid in the alcoholysis.

The meaning and preferred aspect of the polythiol composition in the fourth embodiment are the same as those of the polythiol composition in the first embodiment.

The steps that may be included in the method of producing a polythiol composition according to the fourth embodiment will now be described.

<Reaction Step>

The reaction step in the fourth embodiment is the step of generating a polythiol composition by reacting a thiourethane resin and an alcohol compound with each other in the presence of a tertiary amine compound.

The reaction step in the fourth embodiment is the same as the step of generating the thiourethane resin raw material in the first embodiment, except that the active hydrogen compound reacted with the thiourethane resin is limited to be an alcohol compound, the reaction of the thiourethane resin and the alcohol compound is limited to be performed in the presence of a tertiary amine compound, and the thiourethane resin raw material that is a target material is limited to be a polythiol composition.

(Thiourethane Resin)

The thiourethane resin used in the reaction step according to the fourth embodiment is the same as the thiourethane resin used in the reaction step according to the third embodiment, and preferred ranges of these thiourethane resins are also the same.

—Powder Containing Thiourethane Resin—

In the reaction step, it is preferred to contact a powder containing the thiourethane resin (hereinafter, also referred to as "thiourethane resin powder") and an alcohol compound with each other to cause the thiourethane resin in the powder and the alcohol compound to react with each other. By this, the efficiency of the reaction between the thiourethane resin and the alcohol compound can be further improved.

A method of contacting the thiourethane resin powder and the alcohol compound with each other is not particularly limited, and one example thereof is a method of charging the thiourethane resin powder and the alcohol compound (and a reaction solvent if necessary) to a reaction vessel and stirring the charged materials. In this example, the order of charging the thiourethane resin powder and the alcohol compound (and a reaction solvent if necessary) to the reaction vessel is not particularly limited.

The thiourethane resin powder is not particularly limited; however, it is preferably a cut powder (encompassing the concept of ground powder; the same applies hereinafter) of a formed body containing the thiourethane resin and/or the above-described cut powder applied to a sieve (i.e., the cut powder passed through the sieve).

The cut powder of a formed body containing the thiourethane resin is generated in the process of producing an optical material (e.g., a lens) by cutting the formed body containing the thiourethane resin.

The thiourethane resin powder may be a massive powder obtained by crushing and/or pulverizing a formed body containing the thiourethane resin.

(Alcohol Compound)

In the reaction step, the thiourethane resin is reacted with at least one alcohol compound.

The alcohol compound is believed to function as a decomposition agent for the thiourethane resin.

As the alcohol compound in the reaction step, any known alcohol compound can be used with no particular limitation.

In the reaction step, the alcohol compound (i.e., the alcohol compound reacted with the thiourethane resin) may be used singly, or in combination of two or more thereof.

A preferred aspect of the alcohol compound used in the reaction step according to the fourth embodiment is the same as that of the alcohol compound used as an active hydrogen compound in the first embodiment.

One preferred example of the alcohol compound used in the reaction step is an alcohol compound having a boiling point of from 135° C. to 250° C. (hereinafter, also referred to as "alcohol compound A").

A preferred charged amount of the alcohol compound used in the reaction step will now be described.

The below-described preferred charged amount also corresponds to a preferred charged amount of the alcohol compound A (i.e., an alcohol compound having a boiling point of from 135° C. to 250° C.).

—Charged amount of Alcohol Compound—

In the reaction step, a charged mass ratio of the alcohol compound with respect to the thiourethane resin (i.e., charged mass ratio [alcohol compound/thiourethane resin]) can be adjusted as appropriate, and it is preferably from 0.10 to 20.

When the charged mass ratio [alcohol compound/thiourethane resin] is 0.10 or higher, the generation of a polythiol composition is further facilitated.

When the charged mass ratio [alcohol compound/thiourethane resin] is 20 or lower, the alcohol compound can be further prevented from remaining in a reaction mixture.

The charged mass ratio [alcohol compound/thiourethane resin] is more preferably from 0.30 to 15, still more preferably from 0.40 to 10.

In the reaction step, the number of charged millimoles of the alcohol compound with respect to 1 g of the thiourethane resin is preferably from 1.0 mmol/g to 100 mmol/g, more preferably from 2.0 mmol/g to 80 mmol/g, still more preferably from 5.0 mmol/g to 60 mmol/g.

In the reaction step, a charged equivalent of the alcohol compound with respect to the thiourethane resin (charged equivalent [alcohol compound/thiourethane resin]) is preferably from 1 to 25, more preferably from 1.2 to 20, still more preferably from 1.5 to 15.

When the charged equivalent [alcohol compound/thiourethane resin] is 1 or more, the generation of a polythiol composition is further facilitated.

When the charged equivalent [alcohol compound/thiourethane resin] is 50 or less, the alcohol compound can be further prevented from remaining in a reaction mixture.

It is noted here that the charged equivalent of the alcohol compound with respect to the thiourethane resin (charged equivalent [alcohol compound/thiourethane resin]) means a ratio of the number of hydroxy groups in the charged alcohol compound with respect to a total number of thiourethane bonds in the charged thiourethane resin.

(Tertiary Amine Compound)

In the reaction step, the thiourethane resin and the alcohol compound are reacted in the presence of a tertiary amine compound.

The tertiary amine compound is believed to function as a decomposition aid.

The tertiary amine compound is not particularly limited.

The tertiary amine compound may be a chain amine compound or a cyclic amine compound.

The tertiary amine compound has a molecular weight of preferably 1,000 or less, more preferably 500 or less, still more preferably 300 or less, yet still more preferably 200 or less.

A lower limit of the molecular weight of the tertiary amine compound is, for example, not less than 59, preferably not less than 70.

The tertiary amine compound used in the reaction step is:
preferably N,N-dimethylethanolamine, N,N-dimethylaminopropanol, N,N-diethylaminoethanol, N-methyldiethanolamine, diisopropylethylamine, triethylamine, triisopropylamine, triisobutylamine, N,N-dimethylcyclohexylamine, N-methylmorpholine, N-ethylmorpholine, dimethylpiperazine, 1-ethylpiperidine, 4-(2-hydroxyethyl)morpholine, 1,4-diazabicyclo[2,2,2]octane [abbreviation: DABCO], diazabicyclononene, or diazabicycloundecene;
more preferably N,N-dimethylethanolamine, N,N-diethylaminoethanol, N-methyldiethanolamine, diisopropylethylamine, triisopropylamine, triisobutylamine, N,N-dimethylcyclohexylamine, N-methylmorpholine, N-ethylmorpholine, dimethylpiperazine, 1-ethylpiperidine, 1,4-diazabicyclo[2,2,2]octane, diazabicyclononene, or diazabicycloundecene;
still more preferably N,N-dimethylethanolamine, diisopropylethylamine, N,N-dimethylcyclohexylamine, N-ethylmorpholine, or 1,4-diazabicyclo[2,2,2]octane.

In the reaction step, a charged mass ratio of the tertiary amine compound with respect to the alcohol compound (i.e., charged mass ratio [tertiary amine compound/alcohol compound]) can be adjusted as appropriate, and it is preferably from 0.001 to 2.00.

The charged mass ratio [tertiary amine compound/alcohol compound] is more preferably from 0.002 to 1.50, still more preferably from 0.004 to 1.20.

In the reaction step, a charged molar ratio of the tertiary amine compound with respect to the alcohol compound (i.e., charged molar ratio [tertiary amine compound/alcohol compound]) can be adjusted as appropriate, and it is preferably from 0.001 to 3.00.

The charged molar ratio [tertiary amine compound/alcohol compound] is more preferably from 0.002 to 2.50, still more preferably from 0.003 to 2.00, yet still more preferably from 0.004 to 1.50, further more preferably from 0.004 to 1.00.

(Reaction Solvent)

In the reaction step, the thiourethane resin and the amine compound are preferably reacted in the presence of a reaction solvent.

The reaction solvent is preferably a hydrocarbon compound having from 5 to 12 (preferably from 6 to 10, more preferably from 7 to 9) carbon atoms, an ether compound having from 4 to 12 carbon atoms, a ketone compound having from 3 to 12 carbon atoms, an ester compound having from 4 to 12 carbon atoms, an alcohol compound having from 2 to 12 carbon atoms, or a nitrile compound having from 2 to 12 carbon atoms.

Compounds preferred as the reaction solvent in the third embodiment are the same as the compounds preferred as the reaction solvent in the first embodiment.

As the reaction solvent, such compounds may be used singly, or in combination of two or more kinds thereof.

(Reaction Temperature)

A reaction temperature of the thiourethane resin and the alcohol compound in the reaction step can be adjusted as appropriate.

In the reaction step, the thiourethane resin and the alcohol compound are preferably reacted under a temperature condition (i.e., reaction temperature) of from 70° C. to 200° C. (more preferably from 90° C. to 180° C., still more preferably from 100° C. to 170° C.).

When the reaction temperature is from 70° C. to 200° C., the purity of a polythiol component as a main component in the polythiol composition as a target material (i.e., the content of the main component with respect to a total amount of the polythiol composition) can be further improved.

Further, in the reaction step, the reaction may be performed under a pressurized condition. When the reaction is performed under a pressurized condition, the reaction time may be shortened.

(Reaction Time)

A reaction time of the thiourethane resin and the alcohol compound in the reaction step can be adjusted as appropriate, and it is preferably from 0.1 hours to 50 hours, more preferably from 0.5 hours to 30 hours, still more preferably from 1 hour to 20 hours.

(Polythiol Composition as Target Material)

Examples of the polythiol composition as a target material in the fourth embodiment include the same ones as those exemplified above for the polythiol composition as a target material (i.e., thiourethane resin raw material) in the first embodiment, and preferred aspects of these polythiol compositions are also the same.

The polythiol composition as a target material and the polythiol composition as a raw material of a thiourethane resin used as a starting material are not required to be completely identical.

However, from the standpoint of the performance of the thiourethane resin produced from the polythiol composition that is a target material, it is preferred that the type of a polythiol component contained as a main component in the polythiol composition as a target material is the same as the type of a polythiol component contained as a main component in the polythiol composition as a raw material. In this case, for example, by using a cut powder (thiourethane resin) generated in the production of an optical material A as a raw material, an optical material B (thiourethane resin-containing optical material) having comparable performance to the optical material A can be produced.

The use of the polythiol composition that is a target material is not particularly limited.

For example, the polythiol composition that is a target material can be used for the production of a thiourethane resin.

One example of specific use of the polythiol composition that is a target material is the use for the production of an optical material (e.g., a lens).

In other words, one specific example of the method of producing a polythiol composition according to the disclosure is a method of producing a polythiol composition for the production of an optical material. In this specific example, when a cut powder containing a thiourethane resin, which is generated in the production of an optical material, is used as a starting material, effective utilization (i.e., recycle) of materials (the thiourethane resin and a polythiol composition that is a raw material of the thiourethane resin) is realized effectively.

In addition, in the reaction step of the disclosure, by obtaining a polythiol composition by a reaction between the thiourethane resin and the alcohol compound, a polythiol composition having a higher purity of a polythiol component as a main component can be obtained as compared to a known method (e.g., a method of obtaining a polythiol composition by a reaction between a thiourethane resin and sodium hydroxide; see the below-described Comparative Example 201).

Therefore, also when the polythiol composition obtained as a target material is used for the production of an optical material (e.g., a lens), an optical material having favorable performance can be obtained.

Examples of the performance of the optical material include optical properties (e.g., refractive index and/or Abbe number), heat resistance, and specific gravity d.

(Reaction Mixture Containing Polythiol Composition)

The reaction step may also be the step of obtaining a reaction mixture containing the polythiol composition as a target material.

In this case, the reaction step is preferably the step of obtaining a reaction mixture containing the polythiol composition by reacting the thiourethane resin and the alcohol compound with each other in the presence of a reaction solvent (preferably a hydrocarbon compound having from 5 to 12 carbon atoms).

The reaction mixture may also contain a polythiol composition that is a main product generated by alcoholysis, and components other than this polythiol composition.

Examples of such other components include by-products generated by alcoholysis (e.g., a polycarbamate compound), the above-described reaction solvent, residue of the raw material(s) (thiourethane resin and/or alcohol compound), and impurities contained in the raw materials.

<Separation Step>

The method of producing a polythiol composition according to the fourth embodiment may also include the separation step of separating the polythiol composition as a target material from the above-described reaction mixture containing the polythiol composition.

A separation method in the separation step is not particularly limited, and any known method can be applied.

Examples of the separation method in the separation step include filtration, decantation, extraction, distillation, drying (including vacuum drying), and purification (e.g., column chromatography). These separation methods may be used in combination of two or more thereof.

The separation step preferably includes obtaining a filtrate containing the polythiol composition by filtration of the reaction mixture containing the polythiol composition obtained in the reaction step.

According to this aspect, solids contained in the reaction mixture can be removed more easily.

One example of a more preferred aspect in which the separation step includes obtaining a filtrate containing the polythiol composition is an aspect (hereinafter, referred to as "separation aspect X") in which the separation step includes:

filtering the reaction mixture containing the polythiol composition to obtain a filtrate containing the polythiol composition;

washing the filtrate containing the polythiol composition with an acid and then with water;

adding an alkali metal-containing base and then water to the thus water-washed filtrate containing the polythiol composition to perform extraction and thereby obtain a water extract containing an alkali metal salt of the polythiol composition;

adding an acid to the water extract containing an alkali metal salt of the polythiol composition to obtain an aqueous liquid containing the polythiol composition;

adding a hydrocarbon compound having from 5 to 12 carbon atoms as an extraction solvent to the aqueous liquid containing the polythiol composition to perform extraction and thereby obtain an extract containing the polythiol composition; and separating the polythiol composition from the extract containing the polythiol composition.

In the separation aspect X, first, the filtrate containing the polythiol composition is washed with an acid (hereinafter, also referred to as "acid washing"), and amines (e.g., tertiary amine compound) are thereby removed from the filtrate. Examples of the acid used in this acid washing include hydrochloric acid, carbonic acid, nitric acid, sulfuric acid, acetic acid, formic acid, and oxalic acid.

Next, the thus acid-washed filtrate is washed with water to remove the acid from the filtrate. At this stage after the removal of the acid, the filtrate contains the polythiol composition that is a target material, and it is believed that the filtrate also contains a polycarbamate compound, which is a by-product, in addition to the polythiol composition.

In the separation aspect X, an alkali metal-containing base is added to the thus water-washed filtrate containing the polythiol composition. By this, the polythiol composition in the filtrate is converted to an alkali metal salt.

In the separation aspect X, extraction is subsequently performed with water to obtain a water extract containing the alkali metal salt of the polythiol composition. In the separation aspect A, an acid is then added to this water extract to convert the alkali metal salt of the polythiol composition back to the polythiol composition. From the resulting aqueous liquid containing the polythiol composition, the polythiol composition is extracted with the above-described extraction solvent to obtain an extract containing the polythiol composition. The polythiol composition is then separated from the thus obtained extract containing the polythiol composition.

According to this separation aspect X, even when the filtrate containing the polythiol composition contains a large amount of components other than the polythiol composition (e.g., a polycarbamate compound that is a by-product), a polythiol composition having a higher purity of a polythiol component as a main component can be obtained.

In the separation aspect X, the alkali metal in the alkali metal-containing base is preferably sodium, potassium, or lithium, more preferably sodium or potassium.

Examples of the alkali metal-containing base include sodium methoxide, sodium ethoxide, sodium propoxide, sodium hydroxide, potassium hydroxide, and lithium hydroxide.

If necessary, the alkali metal-containing base can be added to the filtrate in the form of an alcohol solution (e.g., a methanol solution or an ethanol solution).

In the separation aspect X, examples of the acid added to the water extract containing an alkali metal salt of the polythiol composition include hydrochloric acid, carbonic acid, nitric acid, sulfuric acid, acetic acid, formic acid, and oxalic acid.

In the separation aspect X, the hydrocarbon compound as the extraction solvent may be used singly, or in combination of two or more kinds thereof.

In the separation aspect X, a preferred aspect of the hydrocarbon compound used as the extraction solvent is the same as that of the hydrocarbon compound used as the above-described reaction solvent.

It is noted here, however, that the reaction solvent and the extraction solvent may be the same or different.

Further, in the separation aspect X, prior to the acid washing of the filtrate containing the polythiol composition, a solvent (hereinafter, also referred to as "separation solvent") may be added to the filtrate containing the polythiol composition, and this filtrate to which the separation solvent has been added may be sequentially washed with an acid and water.

As the separation solvent, the same solvent as the reaction solvent may be used, or an alcohol solvent may be used.

When the reaction solvent is used in the reaction step, the addition of the separation solvent to the filtrate may be omitted.

<Classification Step>

The method of producing a polythiol composition according to the fourth embodiment may further include the classification step prior to the reaction step.

The classification step that can be applied to the fourth embodiment is the same as the above-described classification step that can be applied to the third embodiment, and preferred aspects of these classification steps are also the same.

<Sieving Step>

The method of producing a polythiol composition according to the fourth embodiment may further include the sieving step prior to the reaction step.

The sieving step that can be applied to the fourth embodiment is the same as the above-described sieving step that can be applied to the third embodiment, and preferred aspects of these sieving steps are also the same.

<Washing Step>

The method of producing a polythiol composition according to the fourth embodiment may further include the washing step prior to the reaction step.

The washing step that can be applied to the fourth embodiment is the same as the above-described washing step that can be applied to the third embodiment, and preferred aspects of these washing steps are also the same.

When the method of producing a polythiol composition according to the fourth embodiment includes the above-described sieving step and washing step, the sieving step and the washing step are preferably performed in this order. In this case, since it is not necessary to wash the cut powder not passing through the sieve, the amount of the washing solvent to be used can be further reduced.

[Method of Producing Polymerizable Composition]

The method of producing a polymerizable composition according to the fourth embodiment of the disclosure includes:

the step of producing a polythiol composition by the above-described method of producing a polythiol composition according to the fourth embodiment; and the step of obtaining a polymerizable composition containing the polythiol composition and a polyisocyanate compound by mixing at least the polythiol composition and the polyisocyanate compound.

The method of producing a polymerizable composition according to the fourth embodiment, if necessary, may also include other steps.

In the method of producing a polymerizable composition according to the fourth embodiment:

in the step of producing a polythiol composition, a polythiol composition is produced using a thiourethane resin (e.g., a thiourethane resin contained in a ground powder of a formed body of the thiourethane resin) as a starting material; and in the step of obtaining a polymerizable composition, a polymerizable composition containing the thus produced polythiol composition and a polyisocyanate compound is produced.

The thus obtained polymerizable composition can be used again for the production of a thiourethane resin.

In this manner, in the method of producing a polymerizable composition according to the fourth embodiment, effective utilization (i.e., recycle) of materials (i.e., a thiourethane resin and a polythiol composition that is a raw material of the thiourethane resin) is realized.

In addition, the method of producing a polythiol composition according to the fourth embodiment can yield a polythiol composition having a higher purity of a polythiol component as a main component as compared to a known method (e.g., a method of obtaining a polythiol composition by a reaction between a thiourethane resin and sodium hydroxide; see the below-described Comparative Example 201).

In the method of producing a polymerizable composition according to the fourth embodiment, such a polythiol composition is used; therefore, according to the polymerizable composition obtained by the method of producing a polymerizable composition according to the fourth embodiment, a resin that is excellent in various performance [for example, optical properties (e.g., refractive index and/or Abbe number), heat resistance, and specific gravity d] can be produced.

Hence, the polymerizable composition obtained by the method of producing a polymerizable composition according to the fourth embodiment is particularly suitable as a composition for the production of a thiourethane resin for an optical material.

In the method of producing a polymerizable composition according to the fourth embodiment, the step of producing a polythiol composition is the step of producing a polythiol composition by the method of producing a polythiol composition according to the fourth embodiment.

Meanwhile, in the method of producing a polymerizable composition according to the first embodiment, the step of producing a polythiol composition is the step of producing a polythiol composition as a thiourethane resin raw material by the method of producing a thiourethane resin raw material according to the first embodiment.

Except for this point, the method of producing a polymerizable composition according to the fourth embodiment is the same as the method of producing a polymerizable composition according to the first embodiment, and preferred aspects of these methods are also the same.

[Method of Producing Resin]

The method of producing a resin according to the fourth embodiment of the disclosure includes:

the step of producing a polymerizable composition by the above-described method of producing a polymerizable composition according to the fourth embodiment of the disclosure; and the step of obtaining a resin by curing the polymerizable composition.

The method of producing a resin according to the fourth embodiment of the disclosure, if necessary, may also include other steps.

According to the method of producing a resin according to the fourth embodiment of the disclosure, the same effects as those of the above-described method of producing a polymerizable composition according to the fourth embodiment are exerted.

In the method of producing a resin according to the fourth embodiment, a polymerizable composition is produced by the method of producing a polymerizable composition according to the fourth embodiment in the step of producing a polymerizable composition.

Meanwhile, in the method of producing a resin according to the first embodiment, a polymerizable composition is produced by the method of producing a polymerizable composition according to the first embodiment in the step of producing a polymerizable composition.

Except for this point, the method of producing a resin according to the fourth embodiment is the same as the method of producing a resin according to the first embodiment, and preferred aspects of these methods are also the same.

[Method of Producing Formed Body]

The method of producing a formed body according to the fourth embodiment of the disclosure is a method of producing a resin-containing formed body, and includes:

a step of producing a polymerizable composition by the above-described method of producing a polymerizable composition according to the fourth embodiment; and a step of obtaining a resin-containing formed body by curing the polymerizable composition.

The method of producing a formed body according to the fourth embodiment, if necessary, may also include other steps.

According to the method of producing a formed body according to the fourth embodiment, the same effects as those of the above-described method of producing a polymerizable composition according to the fourth embodiment are exerted.

In the method of producing a formed body according to the fourth embodiment, a polymerizable composition is produced by the method of producing a polymerizable composition according to the fourth embodiment in the step of producing a polymerizable composition.

Meanwhile, in the method of producing a formed body according to the first embodiment, a polymerizable composition is produced by the method of producing a polymerizable composition according to the first embodiment in the step of producing a polymerizable composition.

Except for this point, the method of producing a formed body according to the fourth embodiment is the same as the method of producing a formed body according to the first embodiment, and preferred aspects of these methods are also the same.

[Method of Producing Optical Material and Method of Producing Lens]

The method of producing an optical material (e.g., a lens) according to the fourth embodiment of the disclosure is a method of producing an optical material (e.g., a lens) containing a resin-containing formed body, and includes:

the step of producing a polymerizable composition by the above-described method of producing a polymerizable composition according to the fourth embodiment; and the step of obtaining a resin-containing formed body by curing the polymerizable composition.

The method of producing an optical material (e.g., a lens; the same applies hereinafter) according to the fourth embodiment of the disclosure, if necessary, may also include other steps.

According to the method of producing an optical material according to the fourth embodiment, the same effects as those of the above-described method of producing a polymerizable composition according to the fourth embodiment are exerted.

In the method of producing an optical material according to the fourth embodiment, a polymerizable composition is produced by the method of producing a polymerizable composition according to the fourth embodiment in the step of producing a polymerizable composition.

Meanwhile, in the method of producing an optical material according to the first embodiment, a polymerizable composition is produced by the method of producing a polymerizable composition according to the first embodiment in the step of producing a polymerizable composition.

Except for this point, the method of producing an optical material according to the fourth embodiment is the same as the method of producing an optical material according to the first embodiment, and preferred aspects of these methods are also the same.

[Polymerizable Composition]

The polymerizable composition according to the fourth embodiment of the disclosure contains: a polythiol composition obtained by the above-described method of producing a polythiol composition according to the fourth embodiment; and a polyisocyanate compound.

The polymerizable composition of the fourth embodiment can be produced by the above-described method of producing a polymerizable composition according to the fourth embodiment.

According to the polymerizable composition of the fourth embodiment, the same effects as those of the above-described method of producing a polymerizable composition according to the fourth embodiment are exerted.

With regard to a preferred aspect of the polymerizable composition of the fourth embodiment, reference can be made as appropriate to the above-described method of producing a polymerizable composition according to the fourth embodiment.

[Resin, Formed body, and Optical Material (e.g., Lens)]

The resin according to the fourth embodiment of the disclosure is a cured product of the above-described polymerizable composition of the fourth embodiment.

The formed body according to the fourth embodiment of the disclosure is a formed body containing the above-described resin of the fourth embodiment.

The optical material (e.g., a lens) according to the fourth embodiment of the disclosure is an optical material (e.g., a lens) containing the above-described resin of the fourth embodiment.

According to the resin of the fourth embodiment, the formed body of the fourth embodiment, and the optical material (e.g., a lens) of the fourth embodiment, the same effects as those of the above-described method of producing a polymerizable composition according to the fourth embodiment are exerted.

The resin of the fourth embodiment, the formed body of the fourth embodiment, and the optical material (e.g., a lens) of the fourth embodiment can be produced by the above-described method of producing a resin according to the fourth embodiment, the above-described method of producing a formed body according to the fourth embodiment, and the above-described method of producing an optical material (e.g., a lens) according to the fourth embodiment, respectively.

With regard to preferred aspects of the resin of the fourth embodiment, the formed body of the fourth embodiment, and the optical material (e.g., a lens) of the fourth embodiment, reference can be made to the above-described preferred aspects of the method of producing a resin according to the fourth embodiment, the method of producing a formed body according to the fourth embodiment, and the method of producing an optical material (e.g., a lens) according to the fourth embodiment, respectively.

<Preferred Performance of Resin or Formed Body>

Preferred performance of the resin (or formed body) according to the fourth embodiment of the disclosure are the same as the above-described preferred performance of the resin (or formed body) according to the first embodiment.

<Specific Aspects>

The fourth embodiment encompasses the following specific aspects.

<4-1> A method of producing a polythiol composition, the method including a reaction step of reacting a thiourethane resin and an alcohol compound with each other to generate a polythiol composition.

<4-2> The method of producing a polythiol composition according to <4-1>, wherein, the reaction step includes reacting the thiourethane resin and the alcohol compound with each other by contacting a powder containing the thiourethane resin and the alcohol compound with each other.

<4-3> The method of producing a polythiol composition according to <4-2>, wherein the method further includes, prior to the reaction step, a classification step of classifying a cut powder containing the thiourethane resin to obtain a powder containing the thiourethane resin, the obtained powder having a smaller average particle size than the cut powder, and the reaction step includes reacting the thiourethane resin in the obtained powder and the alcohol compound react with each other by contacting the obtained powder and the alcohol compound with each other.

<4-4> The method of producing a polythiol composition according to <4-2>, wherein the method further includes, prior to the reaction step, a sieving step of sieving a cut powder containing the thiourethane resin to obtain a powder containing the thiourethane resin, the obtained powder having through a sieve, and the reaction step includes reacting the thiourethane resin in the obtained powder and the alcohol compound react with each other by contacting the obtained powder and the alcohol compound with each other.

<4-5> The method of producing a polythiol composition according to <4-4>, wherein the sieve has a nominal mesh size of from 0.1 mm to 2 mm as defined by JIS Z-8801-1: 2019.

<4-6> The method of producing a polythiol composition according to any one of <4-1> to <4-5>, wherein the method further includes, prior to the reaction step, a washing step of washing the powder containing the thiourethane resin using a hydrocarbon compound having from 5 to 12 carbon atoms as a washing solvent, and the reaction step includes reacting the thiourethane resin in the powder washed in the washing step and the alcohol compound with each other by contacting the powder washed in the washing step and the alcohol compound with each other.

<4-7> The method of producing a polythiol composition according to any one of <4-1> to <4-5>, wherein the alcohol compound contains a compound having a boiling point of from 135° C. to 250° C.

<4-8> The method of producing a polythiol composition according to any one of <4-1> and <4-7>, wherein, the reaction step includes reacting the thiourethane resin and the alcohol compound with each other under a temperature condition of from 70° C. to 200° C.

<4-9> The method of producing a polythiol composition according to any one of <4-1> to <4-8>, wherein the polythiol composition contains at least one selected from the group consisting of 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, pentaerythritol tetrakis(2-mercaptoacetate), pentaerythritol tetrakis(3-mercaptopropionate), 2,5-dimercaptomethyl-1,4-dithiane, bis(mercaptoethyl) sulfide, and diethylene glycol bis(mercaptopropionate).

<4-10> The method of producing a polythiol composition according to any one of <4-1> to <4-9>, which is a method of producing a polythiol composition for the production of an optical material.

<4-11> The method of producing a polythiol composition according to any one of <4-1> to <4-10>, wherein the reaction step includes obtaining a reaction mixture containing the polythiol composition, and the method further includes a separation step of separating the polythiol composition from the reaction mixture containing the polythiol composition.

<4-12> The method of producing a polythiol composition according to <4-11>, wherein the separation step includes:

filtering the reaction mixture containing the polythiol composition to obtain a filtrate containing the polythiol composition;

washing the filtrate containing the polythiol composition with an acid and then with water;

adding an alkali metal-containing base and then water to the thus water-washed filtrate containing the polythiol composition to perform extraction and thereby obtain a water extract containing an alkali metal salt of the polythiol composition;

adding an acid to the water extract containing an alkali metal salt of the polythiol composition to obtain an aqueous liquid containing the polythiol composition;

adding a hydrocarbon compound having from 5 to 12 carbon atoms as an extraction solvent to the aqueous liquid containing the polythiol composition to perform extraction and thereby obtain an extract containing the polythiol composition; and separating the polythiol composition from the extract containing the polythiol composition.

<4-13> A method of producing a polymerizable composition, the method including:

a step of producing a polythiol composition by the method of producing a polythiol composition according to any one of <4-1> to <4-12>; and a step of obtaining a polymerizable composition containing the polythiol composition and a polyisocyanate compound by mixing together at least the polythiol composition and the polyisocyanate compound.

<4-14> A method of producing a resin, the method including:

a step of producing a polymerizable composition by the method of producing a polymerizable composition according to <4-13>; and a step of obtaining a resin by curing the polymerizable composition.

<4-15> A method of producing a resin-containing formed body, the method including:

a step of producing a polymerizable composition by the method of producing a polymerizable composition according to <4-13>; and a step of obtaining a resin-containing formed body by curing the polymerizable composition.

<4-16> A method of producing an optical material containing a resin-containing formed body, the method including:

a step of producing a polymerizable composition by the method of producing a polymerizable composition according to <4-13>; and a step of obtaining a resin-containing formed body by curing the polymerizable composition.

<4-17> A method of producing a lens containing a resin-containing formed body, the method including:

a step of producing a polymerizable composition by the method of producing a polymerizable composition according to <4-13>; and a step of obtaining a resin-containing formed body by curing the polymerizable composition.

<4-18> A polymerizable composition, containing:

a polythiol composition obtained by the method of producing a polythiol composition according to any one of <4-1> to <4-12>; and a polyisocyanate compound.

<4-19> A resin, which is a cured product of the polymerizable composition according to <4-18>.

<4-20> A formed body, containing the resin according to <4-19>.

<4-21> An optical material, containing the formed body according to <4-20>.

<4-22> A lens, containing the formed body according to <4-20>.

Fifth Embodiment

[Polythiol Composition]

The polythiol composition according to the fifth embodiment of the disclosure is a polythiol composition containing, as a main component, a polythiol compound (XA) containing three or more mercapto groups.

In this polythiol composition, a compound (XB), which is obtained by substituting at least one of the three or more mercapto groups in the polythiol compound (XA) with a group represented by the following Formula (N1), has a peak area of less than 0.1 with respect to a peak area of the polythiol composition of 100 in high-performance liquid chromatography measurement, and a compound (XC), which is obtained by substituting at least one of the three or more mercapto groups in the polythiol compound (XA) with a hydroxy group, has a peak area of less than 0.1 with respect to a peak area of the polythiol composition of 100 in high-performance liquid chromatography measurement:

$$\ast-S-\underset{\underset{NH_2}{\big|}}{\underset{N}{\bigcirc}}-NH_2 \quad (N1)$$

In Formula (N1), * represents a binding position.

In the fifth embodiment, the polythiol compound (XA) is a compound containing three or more mercapto groups.

The polythiol composition according to the fifth embodiment contains the polythiol compound (XA) as a main component.

The meaning of "as a main component" is as described above in the section of "First Embodiment".

In the fifth embodiment, the compound (XB) is a compound obtained by substituting at least one of the three or more mercapto groups in the polythiol compound (XA) with a group represented by the following Formula (N1), and the compound (XC) is a compound obtained by substituting at least one of the three or more mercapto groups in the polythiol compound (XA) with a hydroxy group.

The compound (XB) and the compound (XC) are both compounds that facilitate polymerization of the polythiol compound (XA) contained in the polythiol composition to cause an increase in the viscosity of the polythiol composition, and consequently shorten the pot life of the polythiol composition.

The polythiol composition according to the fifth embodiment does not contain the compound (XB) or, even when the polythiol composition contains the compound (XB), a peak area of the compound (XB) in high-performance liquid chromatography measurement is less than 0.1 with respect to a peak area of the polythiol composition of 100.

Similarly, the polythiol composition according to the fifth embodiment does not contain the compound (XC) or, even when the polythiol composition contains the compound (XC), a peak area of the compound (XC) in high-performance liquid chromatography measurement is less than 0.1 with respect to a peak area of the polythiol composition of 100.

In the polythiol composition according to the fifth embodiment, since the content of the compounds (XB) and (XC) is limited in the above-described manner, unintended polymerization of the polythiol compound (XA) in the polythiol composition is inhibited, as a result of which an increase in viscosity is inhibited.

Therefore, the polythiol composition according to the fifth embodiment has an excellent pot life (i.e., a long pot life).

Examples of the used of the polythiol composition according to the fifth embodiment are the same as those of the use of the polythiol composition that is a target material in the first embodiment.

The polythiol composition according to the fifth embodiment contains the polythiol compound (XA) containing three or more mercapto groups, preferably as a main component.

The meaning of the term "main component" is as described above.

Examples of the polythiol compound (XA) include polythiol compounds constituting the above-described polythiol components A1 to A3.

The polythiol composition according to the fifth embodiment may contain the polythiol compound (XA) singly, or in combination of two or more kinds thereof.

The compound (XB) is a compound obtained by substituting at least one of the three or more mercapto groups in the polythiol compound (XA) with a group represented by the above-described Formula (N1).

Examples of the compound (XB) are shown below; however, the compound (XB) is not limited thereto.

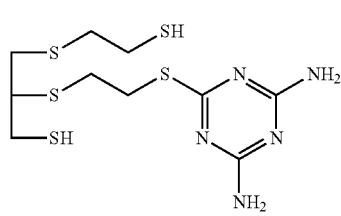
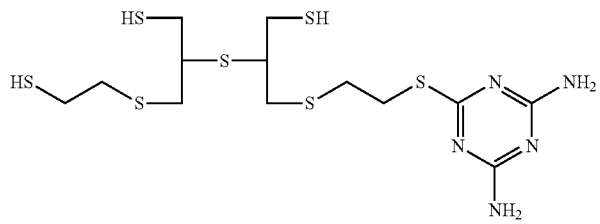

The compound (XC) is a compound obtained by substituting at least one of the three or more mercapto groups in the polythiol compound (XA) with a hydroxy group.

Examples of the compound (XC) are shown below; however, the compound (XC) is not limited thereto.

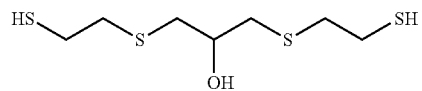
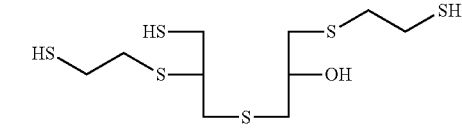

The polythiol composition according to the fifth embodiment is produced by, for example, at least one of the above-described production methods of the first to the fourth embodiments.

According to at least one of the above-described production methods of the first to the fourth embodiments, the polythiol composition according to the fifth embodiment, which contains the polythiol compound (XA) as a main component and in which the content of the compounds (XB) and (XC) that are impurities corresponding to the polythiol compound (XA) is reduced, can be produced by decomposition reaction of a thiourethane resin (see the below-described Examples 21 to 25), although the detailed reason for this is not clear.

EXAMPLES

Examples of the disclosure will now be described; however, the disclosure is not limited to the below-described Examples.

Unless otherwise specified, the term "room temperature" used herein means 25° C.

Hereinafter, the purity (%) of a polythiol component A1 in a polythiol composition means the content (%) of the polythiol component A1 with respect to a total amount of the polythiol composition, more specifically the ratio (% by area) of a peak total area of the polythiol component A1 with respect to a total area of all peaks of the polythiol composition, which ratio is determined by high-performance liquid chromatography under the following conditions.

(Conditions of High-Performance Liquid Chromatography)
Column: YMC-Pack ODS-A (particle size S: 5 μm, pore diameter: 12 nm, column shape: Φ6 mm×150 mm)
Mobile phase: acetonitrile/0.01 mol-aqueous potassium dihydrogen phosphate solution=60/40 (vol/vol)
Column temperature: 40° C.
Flow rate: 1.0 ml/min
Detector: UV detector, wavelength: 230 nm
Preparation of measurement solution: 160 mg of a sample is dissolved and mixed with 10 ml of acetonitrile.
Injection amount: 2 μL Hereinafter, the purity (% by mass) of a polythiol component A2 in a polythiol composition means the content (% by mass) of the polythiol component A2 with respect to a total amount of the polythiol composition, more specifically the content (% by mass) of the polythiol component A2 with respect to a total amount of the polythiol composition, which content is determined by high-performance liquid chromatography under the following conditions using an internal standard substance.

(Conditions of High-Performance Liquid Chromatography)
Column: YMC-Pack ODS-A (particle size S: 5 μm, pore diameter: 12 nm, column shape: Φ6 mm×150 mm)
Mobile phase: acetonitrile/0.01M aqueous potassium dihydrogen phosphate solution=60/40 (vol/vol)
Column temperature: 40° C.
Flow rate: 1.0 mL/min
Detector: UV detector, wavelength: 230 nm
Preparation of measurement solution: 150 mg of an internal standard substance (1,2,4-trimethylbenzene) and 160 mg of a sample are dissolved and mixed with 5 mL of acetonitrile.
Injection amount: 1 μL Reference Production Example 1

(Production of Formed body Containing Thiourethane Resin R1)
In a flask equipped with a stirrer,
dimethyl tin dichloride (trade name: NESTIN-P, manufactured by The Honjo Chemical Corporation) (100 ppm by mass with respect to a total amount of the polymerizable composition to be obtained) as a polymerization catalyst,
ZELEC-UN (manufactured by Stepan Company; acidic phosphoric acid ester) (1,000 ppm by mass with respect to a total amount of the polymerizable composition to be obtained) as a mold release agent,
m-xylylene diisocyanate (XDI) (50.8 parts by mass) as a polyisocyanate compound, and a polythiol composition X1 (49.2 parts by mass) containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component were added and mixed with stirring for 1 hour at room temperature to obtain a polymerizable composition in the form of a transparent homogeneous solution.

It is noted here that the purity of the polythiol component A1 in the polythiol composition X1 (i.e., the content of the polythiol component A1 with respect to a total amount of the polythiol composition X1) was 85.5%.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then, this pair of glass molds was placed in an oven, after which the oven internal temperature was set at 25° C. Subsequently, the oven internal temperature was raised from 25° C. to 120° C. over a period of 24 hours. By this process, monomers (the polyisocyanate compound and the polythiol composition) contained in the degassed polymerizable composition were polymerized to form a formed body containing a thiourethane resin R1 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.

(Production of Thiourethane Resin Powder R1)

A lens was produced by cutting the thus obtained formed body. A cut powder generated in this process was collected and applied to a sieve having a nominal mesh size of 1 mm as defined by JIS Z-8801-1:2019, whereby a thiourethane resin powder R1 passed through the sieve (i.e., powder containing the thiourethane resin R1) was obtained.

Reference Production Example 2

(Production of Formed body Containing Thiourethane Resin R2)

In a flask equipped with a stirrer,
dibutyl tin dichloride (100 ppm by mass with respect to a total amount of the polymerizable composition to be obtained) as a polymerization catalyst,
ZELEC-UN (manufactured by Stepan Company; acidic phosphoric acid ester) (1,000 ppm by mass with respect to a total amount of the polymerizable composition to be obtained) as a mold release agent,
m-xylylene diisocyanate (XDI) (52 parts by mass) as a polyisocyanate compound, and
a polythiol composition X2 (48 parts by mass) containing 4-mercaptomethyl-1,8-dimercapto-3,6-dithiaoctane (i.e., polythiol component A2) as a main component
were added and mixed with stirring for 1 hour at room temperature (25° C.) to obtain a polymerizable composition in the form of a transparent homogeneous solution.

It is noted here that the purity of the polythiol component A2 in the polythiol composition X2 (i.e., the content of the polythiol component A2 with respect to a total amount of the polythiol composition X2) was 92.2%.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then, this pair of glass molds was placed in an oven, after which the oven internal temperature was set at 10° C. Subsequently, the oven internal temperature was raised from 10° C. to 120° C. over a period of 38 hours. By this process, monomers (the polyisocyanate compound and the polythiol composition) contained in the degassed polymerizable composition were polymerized to form a formed body containing a thiourethane resin R2 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.

(Production of Thiourethane Resin Powder R2)

A lens was produced by cutting the thus obtained formed body. A cut powder generated in this process was collected to obtain a thiourethane resin powder R2 (i.e., powder containing the thiourethane resin R2).

Reference Production Example 3

(Production of Formed body Containing Thiourethane Resin R3)

In a flask equipped with a stirrer,
dibutyl tin dichloride (600 ppm by mass with respect to a total amount of the polymerizable composition to be obtained) as a polymerization catalyst,
ZELEC-UN (manufactured by Stepan Company; acidic phosphoric acid ester) (1,200 ppm by mass with respect to a total amount of the polymerizable composition to be obtained) as a mold release agent,
an isocyanate composition (NBDI) (50.6 parts by mass) containing 2,5-bis(isocyanatomethyl)bicyclo-[2.2.1]-heptane and 2,6-bis(isocyanatomethyl)bicyclo-[2.2.1]-heptane as main components,
a polythiol composition X2 (25.6 parts by mass) containing 4-mercaptomethyl-1,8-dimercapto-3,6-dithiaoctane (i.e., polythiol component A2) as a main component, and
a polythiol composition (23.9 parts by mass) containing pentaerythritol tetrakis(3-mercaptopropionate) as a main component
were added and mixed with stirring for 1 hour at room temperature (25° C.) to obtain a polymerizable composition in the form of a transparent homogeneous solution.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then, this pair of glass molds was placed in an oven, after which the oven internal temperature was set at 10° C. Subsequently, the oven internal temperature was raised from 10° C. to 120° C. over a period of 38 hours. By this process, monomers (the polyisocyanate compound and the polythiol compositions) contained in the degassed polymerizable composition were polymerized to form a formed body containing a thiourethane resin R3 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.

(Production of Thiourethane Resin Powder R3)

A lens was produced by cutting the thus obtained formed body. A cut powder generated in this process was collected to obtain a thiourethane resin powder R3 (i.e., powder containing the thiourethane resin R3).

Reference Production Example 4

(Production of Formed body 1 Containing Thiourethane Resin R4)
In a flask equipped with a stirrer,
dibutyl tin dichloride (600 ppm by mass with respect to a total amount of the polymerizable composition to be obtained) as a polymerization catalyst,
ZELEC-UN (manufactured by Stepan Company; acidic phosphoric acid ester) (1,200 ppm by mass with respect to a total amount of the polymerizable composition to be obtained) as a mold release agent,
an isocyanate composition (NBDI) (54.3 parts by mass) containing 2,5-bis(isocyanatomethyl)bicyclo-[2.2.1]-heptane and 2,6-bis(isocyanatomethyl)bicyclo-[2.2.1]-heptane as main components, and
a polythiol composition X2 (45.7 parts by mass) containing 4-mercaptomethyl-1,8-dimercapto-3,6-dithiaoctane (i.e., polythiol component A2) as a main component
were added and mixed with stirring for 1 hour at room temperature (25° C.) to obtain a polymerizable composition in the form of a transparent homogeneous solution.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then, this pair of glass molds was placed in an oven, after which the oven internal temperature was set at 10° C. Subsequently, the oven internal temperature was raised from 10° C. to 120° C. over a period of 38 hours. By this process, monomers (the polyisocyanate compound and the polythiol composition) contained in the degassed polymerizable composition were polymerized to form a formed body containing a thiourethane resin R4 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.
(Production of Thiourethane Resin Powder R4)
A lens was produced by cutting the thus obtained formed body. A cut powder generated in this process was collected to obtain a thiourethane resin powder R4 (i.e., powder containing the thiourethane resin R4).

Example 1 (Decomposition of Thiourethane Resin R1 by Benzylamine)

—Washing Step—
The thiourethane resin powder R1 (30 g) obtained in Reference Production Example 1 was weighed. Operations of washing this thiourethane resin powder R1 (30 g) by adding thereto 150 g of toluene and stirring the resultant, and then removing toluene by filtration were performed three times (the above operations are hereinafter referred to as "washing step").
—Reaction Step—
The whole amount of the thiourethane resin powder R1 washed in the above-described washing step was charged into a 500 mL flask equipped with a condenser, and benzylamine (manufactured by FUJIFILM Wako Pure Chemical Corporation) (25.98 g; 0.242 mol) and 349 g of toluene were added thereto, followed by heating with stirring at 100° C. for 3 hours, whereby a reaction mixture containing a polythiol composition was obtained (the above operations are hereinafter referred to as "reaction step").
—Separation Step—
The reaction mixture obtained in the above-described reaction step was cooled to 30° C., and solid was subsequently removed by filtration. The resulting filtrate was washed twice with 150 mL of 1N hydrochloric acid to remove excess amine from the filtrate. The thus obtained liquid was washed twice with 100 mL of water to obtain a toluene solution of the polythiol composition.

From the thus obtained toluene solution, high-polarity by-products were removed using a silica gel column, and toluene was subsequently distilled away using a rotary evaporator. The thus obtained mixture was sequentially subjected to removal of a low-boiling-point component by a vacuum pump and filtration through a 3-micron PTFE membrane filter in this order, whereby 9.10 g of a polythiol composition containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component was obtained (the above operations are hereinafter referred to as "separation step").

The results of analyzing the SH value in the thus obtained polythiol composition (i.e., the number of millimoles of thiol groups per 1 g of the polythiol composition; the same applies hereinafter) and the purity of the polythiol component A1 based on high-performance liquid chromatography were as shown in Table 1 below.

Example 2 (Decomposition of Thiourethane Resin R1 by Di-n-Butylamine)

—Washing Step—
The thiourethane resin powder R1 (15 g) obtained in Reference Production Example 1 was weighed. Operations of washing this thiourethane resin powder R1 (15 g) by adding thereto 75 g of toluene and stirring the resultant, and subsequently removing toluene by filtration were repeatedly performed three times (the above operations are hereinafter referred to as "washing step").
—Reaction Step—
The whole amount of the thiourethane resin powder R1 washed in the above-described washing step was charged into a 500-mL flask equipped with a condenser, and di-n-butylamine (manufactured by FUJIFILM Wako Pure Chemical Corporation) (11.33 g; 0.088 mol) and 176 g of toluene were added thereto, followed by heating with stirring at 100° C. for 4 hours, whereby a reaction mixture containing a polythiol composition was obtained (the above operations are hereinafter referred to as "reaction step").
—Separation Step—
The reaction mixture obtained in the above-described reaction step was cooled to 60° C., and solid was subsequently removed by filtration. To the resulting filtrate, 5.25 g of a 28% aqueous sodium methoxide methanol solution (manufactured by FUJIFILM Wako Pure Chemical Corporation) was added, followed by stirring. To the resultant, 150 g of water was added to extract soluble components, and the resulting water extract was washed twice with 50 g of toluene, followed by addition of 10 g of 35% hydrochloric acid and stirring. Soluble components were extracted from the thus obtained aqueous liquid with 125 g of toluene, and the resulting extract was washed and liquid-separated four times with 50 g of water to obtain a toluene solution of the polythiol composition.

From the thus obtained toluene solution, high-polarity by-products were removed using a silica gel column, and toluene was subsequently distilled away using a rotary evaporator. The thus obtained mixture was sequentially subjected to removal of a low-boiling-point component by a vacuum pump and filtration through a 3-micron PTFE membrane filter in this order, whereby 1.54 g of a polythiol composition containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component was obtained (the above operations are hereinafter referred to as "separation step").

The results of analyzing the SH value in the thus obtained polythiol composition and the purity of the polythiol component A1 based on high-performance liquid chromatography were as shown in Table 1 below.

Example 3 (Decomposition of Thiourethane Resin R1 by Ethylenediamine)

—Washing Step—

The thiourethane resin powder R1 (30 g) obtained in Reference Production Example 1 was weighed. Operations of washing this thiourethane resin powder R1 (30 g) by adding thereto 150 g of toluene and stirring the resultant, and subsequently removing toluene by filtration were repeatedly performed three times (the above operations are hereinafter referred to as "washing step").

—Reaction Step—

The whole amount of the thiourethane resin powder R1 washed in the above-described washing step was charged into a 500 mL flask equipped with a condenser, and ethylenediamine (manufactured by FUJIFILM Wako Pure Chemical Corporation) (10.68 g; 0.177 mol) and 368 g of toluene were added thereto, followed by heating with stirring at 80° C. for 2 hours and then at 100° C. for 3 hours, whereby a reaction mixture containing a polythiol composition was obtained (the above operations are hereinafter referred to as "reaction step").

—Separation Step—

The reaction mixture obtained in the above-described reaction step was cooled to 60° C., and solid was subsequently removed by filtration. The resulting filtrate was washed twice with 150 mL of 1N hydrochloric acid to remove excess amine from the filtrate. The thus obtained liquid was washed three times with 100 mL of water to obtain a toluene solution of the polythiol composition.

From the thus obtained toluene solution, high-polarity by-products were removed using a silica gel column, and toluene was subsequently distilled away using a rotary evaporator. The thus obtained mixture was sequentially subjected to removal of a low-boiling-point component by a vacuum pump and filtration through a 3-micron PTFE membrane filter in this order, whereby 10.68 g of a polythiol composition containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component was obtained (the above operations are hereinafter referred to as "separation step").

The results of analyzing the SH value in the thus obtained polythiol composition and the purity of the polythiol component A1 based on high-performance liquid chromatography were as shown in Table 1 below.

Example 4 (Decomposition of Thiourethane Resin R1 by Monoethanolamine)

—Washing Step—

The thiourethane resin powder R1 (30 g) obtained in Reference Production Example 1 was weighed. Operations of washing this thiourethane resin powder R1 (30 g) by adding thereto 150 g of toluene and stirring the resultant, and subsequently removing toluene by filtration were repeatedly performed three times (the above operations are hereinafter referred to as "washing step").

—Reaction Step—

The whole amount of the thiourethane resin powder R1 washed in the above-described washing step was charged into a 500 mL flask equipped with a condenser, and monoethanolamine (manufactured by FUJIFILM Wako Pure Chemical Corporation) (14.81 g; 0.242 mol) and 361 g of toluene were added thereto, followed by heating with stirring at 100° C. for 3 hours, whereby a reaction mixture containing a polythiol composition was obtained (the above operations are hereinafter referred to as "reaction step").

—Separation Step—

The thus obtained reaction mixture was cooled to 30° C., and solid was subsequently removed by filtration. The resulting filtrate was washed twice with 150 mL of 1N hydrochloric acid to remove excess amine from the filtrate. The thus obtained liquid was washed twice with 100 mL of water to obtain a toluene solution of the polythiol composition.

From the thus obtained toluene solution, high-polarity by-products were removed using a silica gel column, and toluene was subsequently distilled away using a rotary evaporator. The thus obtained mixture was sequentially subjected to removal of a low-boiling-point component by a vacuum pump and filtration through a 3-micron PTFE membrane filter in this order, whereby 11.68 g of a polythiol composition containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component was obtained (the above operations are hereinafter referred to as "separation step").

The results of analyzing the SH value in the thus obtained polythiol composition and the purity of the polythiol component A1 based on high-performance liquid chromatography were as shown in Table 1 below.

Comparative Example 1 (Decomposition of Thiourethane Resin R1 by Aqueous Sodium Hydroxide Solution)

—Washing Step—

The thiourethane resin powder R1 (10 g) obtained in Reference Production Example 1 was weighed. Operations of washing this thiourethane resin powder R1 (10 g) by adding thereto 50 g of toluene and stirring the resultant, and subsequently removing toluene by filtration were repeatedly performed three times (the above operations are hereinafter referred to as "washing step").

—Reaction Step—

The whole amount of the thiourethane resin powder R1 washed in the above-described washing step was charged into a 100 mL flask equipped with a condenser, and 40 g (0.486 mol) of a 48.6%-by-mass aqueous sodium hydroxide solution was added thereto, followed by heating with stirring at 100° C. for 3 hours, whereby a reaction mixture containing a polythiol composition was obtained (the above operations are hereinafter referred to as "reaction step").

—Separation Step—

The thus obtained reaction mixture was cooled to 30° C., and solid was subsequently removed by filtration. The resulting filtrate was washed twice with 50 mL of toluene, followed by addition of 60 g of 35% hydrochloric acid. Soluble components were extracted from the thus obtained mixture with 100 mL of toluene, and the resulting extract was washed three times with 100 mL of water to obtain a toluene solution of the polythiol composition.

From the thus obtained toluene solution, high-polarity by-products were removed using a silica gel column, and toluene was subsequently distilled away using a rotary evaporator. The thus obtained mixture was sequentially subjected to removal of a low-boiling-point component by a vacuum pump and filtration through a 3-micron PTFE membrane filter in this order, whereby 0.9 g of a polythiol composition containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) was obtained.

The results of analyzing the SH value in the thus obtained polythiol composition and the purity of the polythiol component A1 based on high-performance liquid chromatography were as shown in Table 1 below.

The above-obtained results are summarized in Table 1 below.

In Table 1, the meanings of "Separation aspect A" and "Separation aspect B" are as described above.

As shown in Table 1, in Examples 1 to 4 where a thiourethane resin and an amine compound react with each other, a polythiol composition having an excellent purity of the polythiol component A1 was obtained.

On the other hand, in Comparative Example 1 where a thiourethane resin was reacted with NaOH, although a polythiol composition was obtained, the purity of the polythiol component A1 in this polythiol composition was low as compared to Examples 1 to 4.

Examples 5 to 8, 10, and 11

The same operations as in Example 1 were performed, except that the charged amount of the thiourethane resin powder after the washing step, the type and the charged amount of the amine compound, and the charged amount of the reaction solvent were changed as shown in Table 2, and that the reaction time was changed to 5 hours.

The results thereof are shown in Table 2.

Example 9

The same operations as in Example 1 were performed, except that the charged amount of the thiourethane resin powder after the washing step, the type and the charged amount of the amine compound, and the charged amount of the reaction solvent were changed as shown in Table 2, that the reaction time was changed to 5 hours, and that the operations in the separation step were changed to the operations of the below-described separation aspect C.

The results thereof are shown in Table 2.

—Separation Step (Separation Aspect C)—

The reaction mixture obtained in the reaction step was subjected to the separation step according to the separation aspect C including decantation and the like, whereby the polythiol composition was separated from the reaction mixture. The details of this process will now be described.

TABLE 1

|  |  | Example 1 | Example 2 | Example 3 | Example 4 | Comparative Example 1 |
|---|---|---|---|---|---|---|
| Thiourethane resin | Type of resin powder | R1 | R1 | R1 | R1 | R1 |
|  | Charged mass (g) | 30 | 15 | 30 | 30 | 10 |
| Amine compound | Type | benzylamine | di-n-butylamine | ethylenediamine | monoethanolamine | — |
|  | Molecular weight | 107.15 | 129.24 | 60.10 | 61.08 | (NaOH was used) |
|  | Charged mass (g) | 25.98 | 11.33 | 10.68 | 14.81 |  |
|  | Charged amount (mol) | 0.242 | 0.088 | 0.178 | 0.242 |  |
| Reaction solvent | Type | toluene | toluene | toluene | toluene | — |
|  | Charged mass (g) | 349 | 176 | 368 | 361 | — |
| Charged mass ratio [amine compound/thiourethane resin] |  | 0.87 | 0.76 | 0.36 | 0.49 | — |
| Charged mass ratio [thiourethane resin/total charged weight] |  | 0.07 | 0.07 | 0.07 | 0.07 | 0.20 |
| Charged amount (mmol) of amine compound per 1 g of thiourethane resin |  | 8.1 | 5.8 | 5.9 | 8.1 | — |
| Charged equivalent [amine compound/thiourethane resin] |  | 1.5 | 1.1 | 1.1 | 1.5 | — |
| Separation step |  | Separation aspect A (e.g., acid washing) | Separation aspect B (e.g., extraction) | Separation aspect A (e.g., acid washing) | Separation aspect A (e.g., acid washing) | Separation aspect B (e.g., extraction) |
| Polythiol composition | Polythiol component | A1 | A1 | A1 | A1 | A1 |
|  | Yield (g) | 9.1 | 1.5 | 10.7 | 11.7 | 0.9 |
|  | SH value (mmol/g) | 9.82 | 10.92 | 10.39 | 10.75 | 10.53 |
|  | Purity of polythiol component A1 (%) | 81.5 | 88.7 | 83.6 | 84.7 | 34.9 |

The obtained reaction mixture was cooled to 30° C., and viscous insoluble matters were subsequently removed by decantation. The resulting residue was washed once with 20 mL of 35% hydrochloric acid to remove excess amine from the residue. The thus obtained liquid was washed twice with 100 mL of water to obtain a toluene solution of the polythiol composition. From this toluene solution, toluene was distilled away using a rotary evaporator. The thus obtained mixture was sequentially subjected to removal of a low-boiling-point component by a vacuum pump and filtration through a 3-micron PTFE membrane filter in this order, whereby a polythiol composition containing the polythiol component A1 as a main component was obtained in the amount shown in Table 2 (the above operations are hereinafter referred to as "separation aspect C").

TABLE 2

| | | Example 5 | Example 6 | Example 7 | Example 8 | Example 9 | Example 10 | Example 11 |
|---|---|---|---|---|---|---|---|---|
| Thiourethane resin | Type of resin powder | R1 | R1 | R1 | R1 | R1 | R1 | R1 |
| | Charged mass (g) | 24.2 | 34.3 | 50.0 | 33.6 | 50.0 | 45.6 | 23.1 |
| Amine compound | Type | octylamine | cyclohexyl-amine | N-methyl-ethanolamine | N-isopropyl-ethanolamine | N-aminoethyl-ethanolamine | morpholine | 1,1,3,3-tetramethyl-butylamine |
| | Molecular weight | 129.25 | 99.18 | 75.11 | 103.17 | 104.15 | 87.12 | 129.25 |
| | Charged mass (g) | 20.21 | 22.14 | 24.28 | 22.39 | 33.67 | 25.68 | 19.33 |
| | Charged amount (mol) | 0.156 | 0.223 | 0.323 | 0.217 | 0.323 | 0.295 | 0.150 |
| Reaction solvent | Type | toluene | toluene | toluene | toluene | toluene | toluene | toluene |
| | Charged mass (g) | 77 | 115 | 180 | 112 | 166 | 257 | 73 |
| Charged mass ratio [amine compound/thiourethane resin] | | 0.84 | 0.65 | 0.49 | 0.67 | 0.67 | 0.56 | 0.84 |
| Charged mass ratio [thiourethane resin/total charged weight] | | 0.20 | 0.20 | 0.20 | 0.20 | 0.20 | 0.14 | 0.20 |
| Charged amount (mmol) of amine compound per 1 g of thiourethane resin | | 6.5 | 6.5 | 6.5 | 6.5 | 6.5 | 6.5 | 6.5 |
| Charged equivalent [amine compound/thiourethane resin] | | 1.2 | 1.2 | 1.2 | 1.2 | 1.2 | 1.2 | 1.2 |
| Separation step | | Separation aspect A (e.g., acid washing) | Separation aspect A (e.g., acid washing) | Separation aspect A (e.g., acid washing) | Separation aspect A (e.g., acid washing) | Separation aspect C (e.g., decantation) | Separation aspect A (e.g., acid washing) | Separation aspect A (e.g., acid washing) |
| Polythiol composition | Polythiol component | A1 | A1 | A1 | A1 | A1 | A1 | A1 |
| | Yield (g) | 4.6 | 9.7 | 19.5 | 10.6 | 22.2 | 14.5 | 2.8 |
| | SH value (mmol/g) | 7.64 | 9.91 | 10.50 | 9.25 | 11.03 | 10.65 | 10.80 |
| | Purity of polythiol component A1 (%) | 86.1 | 79.8 | 78.5 | 82.1 | 72.3 | 67.8 | 82.8 |

As shown in Table 2, a polythiol composition having an excellent purity of the polythiol component A1 was obtained in each Example.

Examples 12 to 16 and 18 to 20

The same operations as in Example 4 were performed, except that the type and the charged amount of the reaction solvent were changed as shown in Table 3, and that the reaction time was changed to 5 hours.
The results thereof are shown in Table 3.

Example 17

The same operations as in Example 4 were performed, except that the type and the charged amount of the reaction solvent were changed as shown in Table 3, that the reaction time was changed to 5 hours, and that the operations in the separation step were changed to the operations of the separation aspect B of Example 2.
The results thereof are shown in Table 3.

TABLE 3

| | | Example 12 | Example 13 | Example 14 | Example 15 | Example 16 |
|---|---|---|---|---|---|---|
| Thiourethane resin | Type of resin powder | R1 | R1 | R1 | R1 | R1 |
| | Charged mass (g) | 50.0 | 50.0 | 50.0 | 50.0 | 50.0 |
| Amine compound | Type | monoethanol-amine | monoethanol-amine | monoethanol-amine | monoethanol-amine | monoethanol-amine |
| | Molecular weight | 61.08 | 61.08 | 61.08 | 61.08 | 61.08 |
| | Charged mass (g) | 19.75 | 19.75 | 19.75 | 19.75 | 19.75 |
| | Charged amount (mol) | 0.323 | 0.323 | 0.323 | 0.323 | 0.323 |
| Reaction solvent | Type | m-xylene | chlorobenzene | dimethoxy-ethane | methyl isobutyl ketone | pentyl acetate |
| | Charged mass (g) | 180 | 180 | 280 | 180 | 180 |

TABLE 3-continued

|  |  |  |  |  |  |  |
|---|---|---|---|---|---|---|
| Charged mass ratio [amine compound/thiourethane resin] |  | 0.40 | 0.40 | 0.40 | 0.40 | 0.40 |
| Charged mass ratio [thiourethane resin/total charged weight] |  | 0.20 | 0.20 | 0.14 | 0.20 | 0.20 |
| Charged amount (mmol) of amine compound per 1 g of thiourethane resin |  | 6.5 | 6.5 | 6.5 | 6.5 | 6.5 |
| Charged equivalent [amine compound/thiourethane resin] |  | 1.2 | 1.2 | 1.2 | 1.2 | 1.2 |
| Separation step |  | Separation aspect A (e.g., acid washing) | Separation aspect A (e.g., acid washing) | Separation aspect A (e.g., acid washing) | Separation aspect A (e.g., acid washing) | Separation aspect A (e.g., acid washing) |
| Polythiol composition | Polythiol component | A1 | A1 | A1 | A1 | A1 |
|  | Yield (g) | 19.5 | 18.7 | 15.4 | 17.1 | 24.6 |
|  | SH value (mmol/g) | 9.40 | 11.16 | 10.48 | 9.70 | 9.66 |
|  | Purity of polythiol component A1 (%) | 83.2 | 83.8 | 60.4 | 58.3 | 83.6 |

|  |  |  | Example 17 | Example 18 | Example 19 | Example 20 |
|---|---|---|---|---|---|---|
| Thiourethane resin | Type of resin powder |  | R1 | R1 | R1 | R1 |
|  | Charged mass (g) |  | 50.0 | 50.0 | 50.0 | 33.1 |
| Amine compound | Type |  | monoethanol-amine | monoethanol-amine | monoethanol-amine | aniline |
|  | Molecular weight |  | 61.08 | 61.08 | 61.08 | 93.13 |
|  | Charged mass (g) |  | 19.75 | 19.75 | 19.75 | 41.51 |
|  | Charged amount (mol) |  | 0.323 | 0.323 | 0.323 | 0.446 |
| Reaction solvent | Type |  | benzyl alcohol | ethylene glycol | acetonitrile | toluene/DABCO |
|  | Charged mass (g) |  | 180 | 180 | 280 | 90/1 |
| Charged mass ratio [amine compound/thiourethane resin] |  |  | 0.40 | 0.40 | 0.40 | 1.25 |
| Charged mass ratio [thiourethane resin/total charged weight] |  |  | 0.20 | 0.20 | 0.14 | 0.20 |
| Charged amount (mmol) of amine compound per 1 g of thiourethane resin |  |  | 6.5 | 6.5 | 6.5 | 13.5 |
| Charged equivalent [amine compound/thiourethane resin] |  |  | 1.2 | 1.2 | 1.2 | 2.5 |
| Separation step |  |  | Separation aspect B (e.g., extraction) | Separation aspect A (e.g., acid washing) | Separation aspect A (e.g., acid washing) | Separation aspect A (e.g., acid washing) |
| Polythiol composition | Polythiol component |  | A1 | A1 | A1 | A1 |
|  | Yield (g) |  | 15.0 | 14.5 | 18.9 | 13.9 |
|  | SH value (mmol/g) |  | 12.26 | 7.50 | 10.87 | 10.07 |
|  | Purity of polythiol component A1 (%) |  | 84.1 | 65.7 | 75.5 | 60.9 |

As shown in Table 3, a polythiol composition having an excellent purity of the polythiol component A1 was obtained in each Example.

Example 21

The same operations as in Example 4 were performed, except that the washing step of washing the thiourethane resin powder was omitted, that the charged amount of the thiourethane resin powder and that of the amine compound were changed as shown in Table 4, and that the reaction time was changed to 6 hours.

The results thereof are shown in Table 4.

Examples 22 to 25

The same operations as in Example 4 were performed, except that the type and the charged amount of the thiourethane resin powder, the charged amount of the amine compound, the charged amount of the reaction solvent, and the separation aspect in the separation step were changed as shown in Table 4, and that the reaction time was changed to 6 hours.

As the operations of the separation aspects A to C, the operations described in any of Examples prior to Example 20 were adopted.

The results thereof are shown in Table 4.

TABLE 4

|  |  | Example 21 | Example 22 | Example 23 | Example 24 | Example 25 |
|---|---|---|---|---|---|---|
| Thiourethane resin | Type of resin powder | R1 | R2 | R3 | R3 | R4 |
|  | Charged mass (g) | 100 | 200 | 200 | 100 | 30 |
| Amine compound | Type | monoethanol-amine | monoethanol-amine | monoethanol-amine | monoethanol-amine | monoethanol-amine |
|  | Molecular weight | 61.08 | 61.08 | 61.08 | 61.08 | 61.08 |
|  | Charged mass (g) | 39.49 | 81 | 108.1 | 44.95 | 14.47 |
|  | Charged amount (mol) | 0.647 | 1.326 | 1.770 | 0.736 | 0.237 |
| Solvent | Type | toluene | toluene | toluene | toluene | toluene |
|  | Charged mass (g) | 361 | 386 | 192 | 106 | 36 |

TABLE 4-continued

|  |  | Example 21 | Example 22 | Example 23 | Example 24 | Example 25 |
|---|---|---|---|---|---|---|
| Charged mass ratio [amine compound/thiourethane resin] | | 0.39 | 0.41 | 0.54 | 0.45 | 0.48 |
| Charged mass ratio [thiourethane resin/total charged weight] | | 0.20 | 0.30 | 0.40 | 0.40 | 0.38 |
| Charged amount (mmol) of amine compound per 1 g of thiourethane resin | | 6.5 | 6.6 | 8.8 | 7.4 | 7.9 |
| Charged equivalent [amine compound/thiourethane resin] | | 1.2 | 1.2 | 1.8 | 1.5 | 1.5 |
| Separation step | | Separation aspect A (e.g., acid washing) | Separation aspect B (e.g., extraction) | Separation aspect B (e.g., extraction) | Separation aspect C (e.g., decantation) | Separation aspect B (e.g., extraction) |
| Polythiol composition | Polythiol component | A1 | A2 | A2 | A2 | A2 |
|  | Yield (g) | 40.0 | 74.2 | 35.8 | 17.6 | 11.8 |
|  | SH value (mmol/g) | 10.90 | 11.55 | 12.00 | 11.60 | 11.61 |
|  | Purity of polythiol component (%) | 84.6 | 93.1 | 92.8 | 91.7 | 87.2 |

As shown in Table 4, a polythiol composition having an excellent purity of the polythiol component A1 or A2 was obtained in each Example.

<Measurement of Amounts of Compound (XB) and Compound (XC)>

For each of the polythiol compositions obtained in Examples 21 to 25, the type of the main component as well as the amount of each of the compound (XB) and the compound (XC) were verified by performing high-performance liquid chromatography measurement.

In Examples 21 to 25, the compound (XB) was the below-described compound (XB-A1) or the below-described compound (XB-A2), and the compound (XC) was the below-described compound (XC-A1) or the below-described compound (XC-A2).

Compound (XB-A1): a compound obtained by substituting at least one of mercapto groups in the polythiol component A1 with a group represented by Formula (N1)

Compound (XB-A2): a compound obtained by substituting at least one of mercapto groups in the polythiol component A2 with a group represented by Formula (N1)

Compound (XC-A1): a compound obtained by substituting at least one of mercapto groups in the polythiol component A1 with a hydroxy group Compound (XC-A2): a compound obtained by substituting at least one of mercapto groups in the polythiol component A2 with a hydroxy group In Example 21, as a result of the high-performance liquid chromatography measurement of the polythiol composition, it was confirmed that the polythiol component A1 was the main component, the peak area of the compound (XB-A1) was less than 0.1 with respect to the peak area of the polythiol composition of 100, and the peak area of the compound (XC-A1) was less than 0.1 with respect to the peak area of the polythiol composition of 100.

In all of Examples 22 to 25, as a result of the high-performance liquid chromatography measurement of each polythiol composition, it was confirmed that the polythiol component A2 was the main component, the peak area of the compound (XB-A2) was less than 0.1 with respect to the peak area of each polythiol composition of 100, and the peak area of the compound (XC-A2) was less than 0.1 with respect to the peak area of each polythiol composition of 100.

As described above, in Examples 21 to 25, it was confirmed that the content of the compound (XB) and the compound (XC), which are impurities, was reduced in each of the obtained polythiol compositions. The compound (XB) and the compound (XC) are both compounds that facilitate polymerization of the polythiol compound (XA) in a polythiol composition to cause an increase in the viscosity of the polythiol composition, and consequently shorten the pot life of the polythiol composition.

Therefore, the polythiol compositions obtained in Examples 21 to 25 are expected to exhibit effects that an increase in viscosity is inhibited and the pot life is prolonged.

<Measurement of Viscosity Increase Rate of Polymerizable Composition>

In a flask equipped with a stirrer, dibutyl tin dichloride (100 ppm by mass with respect to a total amount of the polymerizable composition to be obtained) as a polymerization catalyst, ZELEC-UN (manufactured by Stepan Company; acidic phosphoric acid ester) (1,000 ppm by mass with respect to a total amount of the polymerizable composition to be obtained) as a mold release agent, TINUVIN 329 (manufactured by BASF Japan Ltd., 2-(2H-benzotriazol-2-yl)-4-tert-octylphenol) (1.5% by mass with respect to a total amount of the polymerizable composition to be obtained) as a UV absorber, m-xylylene diisocyanate (XDI) (52 parts by mass) as a polyisocyanate compound, and the polythiol composition (48 parts by mass) obtained in Example 22 were added and mixed with stirring at room temperature (25° C.), and the resulting mixture was subsequently left to stand, whereby a polymerizable composition was obtained. The viscosity (mPa·s) of the thus obtained polymerizable composition at 20° C. was measured using a B-type viscometer manufactured by Brookfield Engineering Laboratories, Inc.

The viscosity was measured at one-hour intervals after the point when the components were mixed and left to stand.

The results thereof are shown in Table 5.

Next, the same operations as described above were performed, except that the polythiol composition obtained in Example 22 was changed to the polythiol composition X2.

The results thereof are shown in Table 5.

TABLE 5

| | | Viscosity of polymerizable composition (mPa · s) | | | | | |
|---|---|---|---|---|---|---|---|
| Elapsed time from the start of being left to stand (h) | | 1 | 2 | 3 | 4 | 5 | 6 |
| Polythiol composition in polymerizable composition | Polythiol composition obtained in Example 22 | 17 | 18 | 20 | 22 | 24 | 27 |
| | Polythiol composition X2 | 17 | 19 | 22 | 27 | 34 | 43 |

As shown in Table 5, the polymerizable compound containing the polythiol composition obtained by reacting a thiourethane resin and an amine compound with each other in Example 22 was confirmed to be a composition in which the viscosity increase rate (i.e., the increase in viscosity with respect to the elapsed time after the start of being left to stand) was reduced and the pot life was prolonged as compared to the polymerizable compound containing the polythiol composition X2.

Example 101

(Production of Formed body Containing Thiourethane Resin)

A formed body containing a thiourethane resin was obtained by performing the same operations as in the production of a formed body in Reference Production Example 1, except that the polythiol composition X1 (49.2 parts by mass) was changed to the polythiol composition (49.2 parts by mass) obtained in Example 1.

The thus obtained formed body had favorable transparency and favorable outer appearance with no distortion.

Performance tests were conducted for the thus obtained formed body.

The results thereof are shown in Table 6.

The items of the performance tests were optical properties (refractive index and Abbe number), heat resistance, and specific gravity d. These items were tested by the following respective test methods.

Refractive index (ne) and Abbe number (ve): using a Pulfrich refractometer KPR-30 manufactured by Shimadzu Corporation, the refractive indices (ne, nF', and nC') at 20° C. were measured at wavelengths of 546.1 nm (mercury e-line), 480.0 nm (Cd F'-line), and 643.9 nm (Cd C'-line), respectively, and the refractive index (ne) and the Abbe number (ve) were determined based on the measurement results.

Heat resistance: using a thermomechanical analyzer TMA-60 manufactured by Shimadzu Corporation, the glass transition temperature (Tg) was measured by a TMA penetration method (load: 50 g, pin tip: 0.5 mmφ, heating rate: 10° C./min), and the measured value was used as an index of the heat resistance.

Specific gravity d: measured at 20° C. by Archimedes' method.

The same performance tests were conducted also for each of the formed bodys obtained in Reference Production Examples 1 and 2.

The results thereof are shown in Table 6.

Examples 102 to 122

The same operations as in Example 101 were performed, except that the polythiol composition obtained in Example 1 (49.2 parts by mass) was changed to the respective polythiol compositions shown in Table 6.

The results thereof are shown in Table 6.

In Table 6, "Composition X1" means the polythiol composition X1 used in Reference Production Example 1, and "Example 1" to "Example 22" mean the respective polythiol compositions obtained in Examples 1 to 22.

TABLE 6

| | Polymerizable composition (parts by mass in parentheses) | | | Performance test of formed body | | | |
|---|---|---|---|---|---|---|---|
| | | | | Optical properties | | Heat | |
| | Isocyanate compound | Polythiol composition | | Refractive index | Abbe number | resistance Tg (° C.) | Specific gravity d |
| Reference Production Example 1 | XDI (51) | Composition X1 (49) | — | 1.668 | 31 | 96 | 1.36 |
| Reference Production Example 2 | XDI (52) | Composition X2 (48) | — | 1.665 | 32 | 85 | 1.35 |
| Example 101 | XDI (51) | Example 1 (49) | — | 1.667 | 31 | 90 | 1.35 |
| Example 102 | XDI (51) | Example 1 (24.5) | Composition X1 (24.5) | 1.667 | 31 | 94 | 1.36 |
| Example 103 | XDI (51) | Example 2 (24.5) | Composition X1 (24.5) | 1.668 | 32 | 97 | 1.37 |
| Example 104 | XDI (51) | Example 3 (49) | — | 1.667 | 31 | 86 | 1.36 |
| Example 105 | XDI (51) | Example 4 (49) | — | 1.667 | 32 | 92 | 1.36 |
| Example 106 | XDI (51) | Example 4 (24.5) | Composition X1 (24.5) | 1.667 | 32 | 96 | 1.36 |
| Example 107 | XDI (51) | Example 5 (16) | Composition X1 (33) | 1.668 | 32 | 93 | 1.36 |

TABLE 6-continued

|  | Polymerizable composition (parts by mass in parentheses) | | | Performance test of formed body | | | |
|---|---|---|---|---|---|---|---|
|  | | | | Optical properties | | Heat | |
|  | Isocyanate compound | Polythiol composition | | Refractive index | Abbe number | resistance Tg (° C.) | Specific gravity d |
| Example 108 | XDI (51) | Example 6 (49) | — | 1.668 | 32 | 101 | 1.37 |
| Example 109 | XDI (51) | Example 7 (49) | — | 1.669 | 31 | 100 | 1.36 |
| Example 110 | XDI (51) | Example 8 (49) | — | 1.667 | 32 | 98 | 1.35 |
| Example 111 | XDI (51) | Example 9 (49) | — | 1.668 | 31 | 94 | 1.37 |
| Example 112 | XDI (51) | Example 10 (49) | — | 1.666 | 31 | 102 | 1.36 |
| Example 113 | XDI (51) | Example 12 (49) | — | 1.669 | 31 | 102 | 1.37 |
| Example 114 | XDI (51) | Example 13 (49) | — | 1.667 | 31 | 102 | 1.37 |
| Example 115 | XDI (51) | Example 14 (49) | — | 1.667 | 31 | 102 | 1.37 |
| Example 116 | XDI (51) | Example 16 (49) | — | 1.666 | 31 | 101 | 1.37 |
| Example 117 | XDI (51) | Example 17 (49) | — | 1.667 | 32 | 95 | 1.36 |
| Example 118 | XDI (51) | Example 18 (49) | — | 1.668 | 31 | 96 | 1.37 |
| Example 119 | XDI (51) | Example 19 (49) | — | 1.666 | 31 | 100 | 1.37 |
| Example 120 | XDI (51) | Example 20 (49) | — | 1.667 | 31 | 93 | 1.37 |
| Example 121 | XDI (52) | Example 21 (48) | — | 1.665 | 31 | 89 | 1.36 |
| Example 122 | XDI (52) | Example 22 (48) | — | 1.665 | 31 | 88 | 1.36 |

As shown in Table 6, the formed bodys of these Examples, which were produced using the polythiol compositions of the respective Examples (i.e., the polythiol compositions obtained by reacting a polyurethane resin powder, which was generated by cutting the formed body of Reference Production Example 1 or 2, and an amine compound with each other), had performance comparable to those of the formed bodys of Reference Production Example 1 and 2.

Reference Production Example 201

(Production of Formed Body Containing Thiourethane Resin R1)

In a flask equipped with a stirrer, dimethyl tin dichloride (trade name: NESTIN-P, manufactured by The Honjo Chemical Corporation) (100 ppm by mass with respect to a total amount of the below-described polyisocyanate compound and the below-described polythiol composition X1) as a polymerization catalyst, ZELEC-UN (manufactured by Stepan Company; acidic phosphoric acid ester) (1,000 ppm by mass with respect to a total amount of the below-described polyisocyanate compound and the below-described polythiol composition X1) as a mold release agent, m-xylylene diisocyanate (XDI) (50.8 parts by mass) as a polyisocyanate compound, and a polythiol composition X1 (49.2 parts by mass) containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component were added and mixed with stirring for 1 hour at room temperature to obtain a polymerizable composition in the form of a transparent homogeneous solution.

It is noted here that the purity of the polythiol component A1 in the polythiol composition X1 (i.e., the content of the polythiol component A1 with respect to a total amount of the polythiol composition X1) was 85.5%.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then, this pair of glass molds was placed in an oven, after which the oven internal temperature was set at 25° C. Subsequently, the oven internal temperature was raised from 25° C. to 120° C. over a period of 24 hours. By this process, monomers (the polyisocyanate compound and the polythiol composition) contained in the degassed polymerizable composition were polymerized to form a formed body containing a thiourethane resin R1 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.

(Production of Thiourethane Resin Powder R1)

A lens was produced by cutting the thus obtained formed body. A cut powder generated in this process was collected and applied to a sieve having a nominal mesh size of 1 mm as defined by JIS Z-8801-1:2019, whereby a thiourethane resin powder R1 passed through the sieve (i.e., powder containing the thiourethane resin R1) was obtained.

Reference Production Example 202

(Production of Formed body 1 Containing Thiourethane Resin R2)

In a flask equipped with a stirrer,
dimethyl tin dichloride (trade name: NESTIN-P, manufactured by The Honjo Chemical Corporation) (100 ppm by mass with respect to a total amount of the below-described polyisocyanate compound and polythiol composition X2) as a polymerization catalyst,
ZELEC-UN (manufactured by Stepan Company; acidic phosphoric acid ester) (1,000 ppm by mass with respect to a total amount of the below-described polyisocyanate compound and polythiol composition X2) as a mold release agent,
m-xylylene diisocyanate (XDI) (52 parts by mass) as a polyisocyanate compound, and
a polythiol composition X2 (48 parts by mass) containing 4-mercaptomethyl-1,8-dimercapto-3,6-dithiaoctane (i.e., polythiol component A2) as a main component
were added and mixed with stirring for 1 hour at room temperature (25° C.) to obtain a polymerizable composition in the form of a transparent homogeneous solution.

It is noted here that the purity of the polythiol component A2 in the polythiol composition X2 (i.e., the content of the polythiol component A1 with respect to a total amount of the polythiol composition X2) was 92.2%.

Next, the thus obtained polymerizable composition was vacuum-filtered through a polytetrafluoroethylene (PTFE) filter, and then thoroughly degassed under a reduced pressure of 600 Pa until foaming was no longer observed. The thus degassed polymerizable composition was injected between a pair of glass molds immobilized by a tape, and then this pair of glass molds was placed in an oven, after which the oven internal temperature was set at 10° C. Subsequently, the oven internal temperature was raised from 10° C. to 120° C. over a period of 38 hours. By this process, monomers (the polyisocyanate compound and the polythiol composition) contained in the degassed polymerizable composition were polymerized to form a formed body containing a thiourethane resin R2 (i.e., a cured product of the polymerizable composition) between the pair of glass molds.

Thereafter, the inside of the oven was cooled, and the pair of glass molds was subsequently taken out of the oven, after which the formed body was obtained by removing it from the pair of glass molds.
(Production of Thiourethane Resin Powder R2)

A lens was produced by cutting the thus obtained formed body. A cut powder generated in this process was collected to obtain a thiourethane resin powder R2 (i.e., powder containing the thiourethane resin R2).

Example 201

(Decomposition of Thiourethane Resin by Benzyl Alcohol)
—Washing Step—
The thiourethane resin powder obtained in Reference Production Example 201 was weighed in an amount of 15.0 g. Operations of washing 15.0 g of this thiourethane resin powder by adding thereto 150 g of toluene and stirring the resultant, and subsequently removing toluene by filtration were repeatedly performed three times (the above operations are hereinafter referred to as "washing step").

—Reaction Step—
The whole amount of the thiourethane resin powder washed in the above-described washing step was charged into a 500 mL flask equipped with a condenser, and benzyl alcohol (manufactured by FUJIFILM Wako Pure Chemical Corporation) (87.4 g; 0.808 mol) as an alcohol compound and N,N-dimethylethanolamine (manufactured by FUJIFILM Wako Pure Chemical Corporation) (10.83 g; 0.121 mol) as a tertiary amine compound were added thereto, followed by heating with stirring at 115° C. (reaction temperature) for 3 hours (reaction time), whereby a reaction mixture containing a polythiol composition was obtained (the above operations are hereinafter referred to as "reaction step").

In this Example 201, no reaction solvent was used.
It is noted here that, in Examples where a reaction solvent was used (e.g., the below-described Example 205), the above-described alcohol compound, the above-described tertiary amine compound, and the reaction solvent were added to the above-described flask, and these materials were heated with stirring at a prescribed reaction temperature for a prescribed reaction time to obtain a reaction mixture containing a polythiol composition.
—Separation Step—
The reaction mixture obtained in the above-described reaction step was cooled to room temperature, and solid was subsequently removed by filtration. To the resulting filtrate, toluene (43 g) was added as a separation solvent. The thus obtained liquid was washed twice with 100 mL of 1N hydrochloric acid to remove excess amine, and then washed twice with 50 mL of water to remove excess hydrochloric acid.

To the thus obtained liquid, a 28% aqueous sodium methoxide methanol solution (manufactured by FUJIFILM Wako Pure Chemical Corporation) (16.40 g; 0.085 mol) was added, followed by stirring. To the resultant, 200 g of water was added to extract soluble components, and the resulting water extract was washed twice with 50 g of toluene, followed by addition of 20 g of 35% hydrochloric acid and stirring. Soluble components were extracted from the thus obtained aqueous liquid with 200 g of toluene, and the resulting extract was washed and liquid-separated twice with 50 g of water to obtain a toluene solution of the polythiol composition.

From the thus obtained toluene solution, high-polarity by-products were removed using a silica gel column, and toluene was subsequently distilled away using a rotary evaporator. The thus obtained mixture was sequentially subjected to removal of a low-boiling-point component by a vacuum pump and filtration through a 3-micron PTFE membrane filter in this order, whereby 4.73 g of a polythiol composition containing a combination of 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) as a main component was obtained (the above operations are hereinafter referred to as "separation step").

The results of analyzing the SH value in the thus obtained polythiol composition (i.e., the number of millimoles of thiol groups per 1 g of the polythiol composition; the same applies hereinafter) and the purity of the polythiol component A1 based on high-performance liquid chromatography are shown in Table 7.

Examples 202 to 208

The same operations as in Example 201 were performed, except that the amount of the thiourethane resin powder, the conditions of the reaction step (e.g., the types and the charged amounts of compounds, the presence or absence of a reaction solvent, the reaction temperature, and the reaction time), and the conditions of the separation step (e.g., the presence or absence of a separation solvent, and the type of a dispersion solvent) were changed as shown in Table 7.

The results of analyzing the SH value in the thus obtained polythiol compositions and the purity of the polythiol component A1 based on high-performance liquid chromatography are shown in Table 7.

Comparative Example 201

(Decomposition of Thiourethane Resin by Aqueous Sodium Hydroxide Solution)
—Washing Step—

The thiourethane resin powder obtained in Reference Production Example 201 was weighed in an amount of 10 g. Operations of washing 10 g of this thiourethane resin powder by adding thereto 50 g of toluene and stirring the resultant, and subsequently removing toluene by filtration were repeatedly performed three times (the above operations are hereinafter referred to as "washing step").

—Reaction Step—

The whole amount of the thiourethane resin powder washed in the above-described washing step was charged into a 100 mL flask equipped with a condenser, and 40 g (0.486 mol) of a 48.6%-by-mass aqueous sodium hydroxide solution was added thereto, followed by heating with stirring at 100° C. for 3 hours, whereby a reaction mixture containing a polythiol composition was obtained (the above operations are hereinafter referred to as "reaction step").

—Separation Step—

The thus obtained reaction mixture was cooled to 30° C., and solid was subsequently removed by filtration. The resulting filtrate was washed twice with 50 mL of toluene, followed by addition of 60 g of 35% hydrochloric acid. Soluble components were extracted from the thus obtained mixture with 100 mL of toluene, and the resulting extract was washed three times with 100 mL of water to obtain a toluene solution of the polythiol composition.

From the thus obtained toluene solution, high-polarity by-products were removed using a silica gel column, and toluene was subsequently distilled away using a rotary evaporator. The thus obtained mixture was sequentially subjected to removal of a low-boiling-point component by a vacuum pump and filtration through a 3-micron PTFE membrane filter in this order, whereby 0.9 g of a polythiol composition containing 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane (i.e., polythiol component A1) was obtained.

The results of analyzing the SH value in the thus obtained polythiol composition and the purity of the polythiol component A1 based on high-performance liquid chromatography are shown in Table 7.

TABLE 7

|  |  |  | Example 201 | Example 202 | Example 203 | Example 204 | Example 205 |
|---|---|---|---|---|---|---|---|
| Reaction step | Thiourethane resin | Type of resin powder | R1 | R1 | R1 | R1 | R1 |
|  |  | Charged amount (g) | 15.0 | 15.0 | 13.5 | 15.0 | 15.0 |
|  | Alcohol compound | Type | benzyl alcohol | benzyl alcohol | benzyl alcohol | benzyl alcohol | benzyl alcohol |
|  |  | Molecular weight | 108.14 | 108.14 | 108.14 | 108.14 | 108.14 |
|  |  | Boiling point (° C.) | 205 | 205 | 205 | 205 | 205 |
|  |  | Charged amount (g) | 87.4 | 87.4 | 78.5 | 87.4 | 13.1 |
|  |  | Charged amount (mol) | 0.808 | 0.808 | 0.726 | 0.808 | 0.121 |
|  | Tertiary amine compound | Type | N,N-dimethyl-ethanolamine | diisopropyl-ethylamine | N-ethyl-morpholine | N,N-dimethyl-ethanolamine | N,N-dimethyl-ethanolamine |
|  |  | Molecular weight | 89.14 | 129.25 | 115.18 | 89.14 | 89.14 |
|  |  | Boiling point (° C.) | 133 | 127 | 138 | 133 | 133 |
|  |  | Charged amount (g) | 10.83 | 15.67 | 12.44 | 0.36 | 10.83 |
|  |  | Charged amount (mol) | 0.121 | 0.121 | 0.108 | 0.004 | 0.121 |
|  | Charged mass ratio [alcohol compound/thiourethane resin] |  | 5.83 | 5.83 | 5.83 | 5.83 | 0.87 |
|  | Charged amount (mmol) of alcohol compound per 1 g of thiourethane resin |  | 53.9 | 53.9 | 53.9 | 53.9 | 8.1 |
|  | Charged equivalent [alcohol compound/thiourethane resin] |  | 10.0 | 10.0 | 10.0 | 10.0 | 1.5 |
|  | Reaction solvent |  | none | none | none | none | m-xylene (80 g) |
|  | Reaction temperature |  | 115° C. | 125° C. | 130° C. | 140° C. | 130° C. |
|  | Reaction time |  | 3 hours | 5 hours | 5 hours | 7 hours | 5 hours |
| Separation step | Separation solvent |  | toluene (43 g) | toluene (43 g) | toluene (43 g) | toluene (43 g) | none |
|  | 28% sodium methoxide/methanol | Charged amount (g) | 16.40 | 13.12 | 15.20 | 11.51 | 11.06 |
|  |  | Charged amount (mol) | 0.085 | 0.068 | 0.079 | 0.060 | 0.057 |
| Target material | Polythiol composition | Polythiol component | A1 | A1 | A1 | A1 | A1 |
|  |  | Yield (g) | 4.7 | 5.1 | 5.3 | 3.7 | 2.4 |
|  |  | SH value (mmol/g) | 10.4 | 9.1 | 9.9 | 9.9 | 10.5 |
|  |  | Purity of polythiol component A1 (%) | 80.9 | 75.8 | 81.5 | 82.6 | 84.3 |

|  |  |  | Example 206 | Example 207 | Example 208 | Comparative Example 201 |
|---|---|---|---|---|---|---|
| Reaction step | Thiourethane resin | Type of resin powder | R1 | R1 | R1 | R1 |
|  |  | Charged amount (g) | 15.0 | 12.5 | 15.0 | 10.0 |
|  | Alcohol compound | Type | 1-octanol | 1-octanol | propylene glycol | — (NaOH was |

TABLE 7-continued

|  |  |  |  |  |  |  | used) |
|---|---|---|---|---|---|---|---|
|  |  |  | Molecular weight | 130.23 | 130.23 | 76.10 |  |
|  |  |  | Boiling point (° C.) | 195 | 195 | 188 |  |
|  |  |  | Charged amount (g) | 105.2 | 87.7 | 9.2 |  |
|  |  |  | Charged amount (mol) | 0.808 | 0.673 | 0.121 |  |
|  |  | Tertiary amine compound | Type | N,N-dimethyl-ethanolamine | diisopropyl-ethylamine | N,N-dimethyl-ethanolamine | — |
|  |  |  | Molecular weight | 89.14 | 129.25 | 89.14 |  |
|  |  |  | Boiling point (° C.) | 133 | 127 | 133 |  |
|  |  |  | Charged amount (g) | 10.83 | 13.07 | 10.83 |  |
|  |  |  | Charged amount (mol) | 0.121 | 0.101 | 0.121 |  |
|  |  | Charged mass ratio [alcohol compound/thiourethane resin] |  | 7.02 | 7.02 | 0.61 | — |
|  |  | Charged amount (mmol) of alcohol compound per 1 g of thiourethane resin |  | 53.9 | 53.9 | 8.1 | — |
|  |  | Charged equivalent [alcohol compound/thiourethane resin] |  | 10.0 | 10.0 | 1.5 | — |
|  |  | Reaction solvent |  | none | none | m-xylene (80 g) | none |
|  |  | Reaction temperature |  | 130° C. | 130° C. | 130° C. | 100° C. |
|  |  | Reaction time |  | 6 hours | 20 hours | 14 hours | 3 hours |
|  | Separation step | Separation solvent |  | benzyl alcohol (50 g) | benzyl alcohol (50 g) | none | — |
|  |  | 28% sodium methoxide/methanol | Charged amount (g) | 11.04 | 10.59 | 14.97 | — |
|  |  |  | Charged amount (mol) | 0.057 | 0.055 | 0.078 |  |
| Target material | Polythiol composition |  | Polythiol component | A1 | A1 | A1 | A1 |
|  |  |  | Yield (g) | 4.4 | 4.9 | 5.4 | 0.9 |
|  |  |  | SH value (mmol/g) | 10.0 | 11.3 | 11.5 | 10.5 |
|  |  |  | Purity of polythiol component A1 (%) | 83.8 | 79.7 | 83.2 | 34.9 |

As shown in Table 7, in Examples 201 to 208 where a thiourethane resin and an alcohol compound react with each other in the presence of a tertiary amine compound, a polythiol composition having an excellent purity of the polythiol component A1 was obtained.

On the other hand, in Comparative Example 1 where a thiourethane resin and NaOH react with each other, although a polythiol composition was obtained, the purity of the polythiol component A1 in this polythiol composition was low as compared to Examples 201 to 208.

Examples 209 to 217

The same operations as in Example 201 were performed, except that the type and the amount of the thiourethane resin powder, the conditions of the reaction step (e.g., the types and the charged amounts of compounds, the presence or absence of a reaction solvent, the reaction temperature, and the reaction time), and the conditions of the separation step (e.g., the presence or absence of a separation solvent) were changed as shown in Table 8.

The results of analyzing the SH value in the thus obtained polythiol compositions and the purity of the polythiol components A1 and A2 based on high-performance liquid chromatography are shown in Table 8.

TABLE 8

|  |  |  | Example 209 | Example 210 | Example 211 | Example 212 | Example 213 |
|---|---|---|---|---|---|---|---|
| Reaction step | Thiourethane resin powder | Type of resin powder | R1 | R1 | R1 | R1 | R1 |
|  |  | Charged amount (g) | 33.1 | 33.1 | 33.1 | 48.6 | 33.1 |
|  | Alcohol compound | Type | 1-pentanol | phenethyl alcohol | 2-octanol | 1-octanol | 1-octanol |
|  |  | Molecular weight | 88.15 | 122.17 | 130.23 | 130.23 | 130.23 |
|  |  | Boiling point (° C.) | 137 | 219 | 179 | 195 | 195 |
|  |  | Charged amount (g) | 23.58 | 32.67 | 34.83 | 170.6 | 34.8 |
|  |  | Charged amount (mol) | 0.267 | 0.267 | 0.267 | 1.310 | 0.267 |
|  | Tertiary amine compound | Type | DABCO | DABCO | DABCO | dimethylamino cyclohexane | DABCO |
|  |  | Molecular weight | 112.18 | 112.18 | 112.18 | 127.23 | 112.18 |
|  |  | Boiling point (° C.) | 174 | 174 | 174 | 160 | 174 |
|  |  | Charged amount (g) | 1.00 | 1.00 | 1.00 | 25.00 | 1.00 |
|  |  | Charged amount (mol) | 0.009 | 0.009 | 0.009 | 0.196 | 0.009 |
|  | Charged mass ratio [alcohol compound/thiourethane resin] |  | 0.71 | 0.99 | 1.05 | 3.51 | 1.05 |
|  | Charged amount (mmol) of alcohol compound per 1 g of thiourethane resin |  | 8.1 | 8.1 | 8.1 | 26.9 | 8.1 |
|  | Charged equivalent [alcohol compound/thiourethane resin] |  | 1.5 | 1.5 | 1.5 | 5.0 | 1.5 |
|  | Reaction solvent |  | none | none | none | none | none |
|  | Reaction temperature |  | 160° C. | 160° C. | 160° C. | 160° C. | 160° C. |
|  | Reaction time |  | 5 hours | 5 hours | 7 hours | 7 hours | 7 hours |

TABLE 8-continued

| Separation step | Separation solvent | | benzyl alcohol (100 g) | benzyl alcohol (100 g) | benzyl alcohol (100 g) | benzyl alcohol (100 g) | benzyl alcohol (100 g) |
|---|---|---|---|---|---|---|---|
| | 28% sodium methoxide/methanol | Charged amount (g) | 29.64 | 56.44 | 25.75 | 42.14 | 33.70 |
| | | Charged amount (mol) | 0.154 | 0.293 | 0.133 | 0.218 | 0.175 |
| Target material | Polythiol composition | Polythiol component | A1 | A1 | A1 | A1 | A1 |
| | | Yield (g) | 9.2 | 12.4 | 8.2 | 15.3 | 13.8 |
| | | SH value (mmol/g) | 10.1 | 9.4 | 11.1 | 11.5 | 10.7 |
| | | Purity of polythiol component (%) | 89.1 | 79.7 | 84.4 | 82.3 | 82.5 |

| | | | Example 214 | Example 215 | Example 216 | Example 217 |
|---|---|---|---|---|---|---|
| Reaction step | Thiourethane resin powder | Type of resin powder | R1 | R1 | R2 | R2 |
| | | Charged amount (g) | 55.2 | 27.6 | 32.3 | 32.3 |
| | Alcohol compound | Type | 1-octanol | 1-octanol | 2-octanol | phenethyl alcohol |
| | | Molecular weight | 130.23 | 130.23 | 130.23 | 122.17 |
| | | Boiling point (° C.) | 195 | 195 | 179 | 219 |
| | | Charged amount (g) | 58.05 | 193.5 | 34.8 | 32.7 |
| | | Charged amount (mol) | 0.446 | 1.486 | 0.267 | 0.267 |
| | Tertiary amine compound | Type | DABCO | DABCO | DABCO | DABCO |
| | | Molecular weight | 112.18 | 112.18 | 112.18 | 112.18 |
| | | Boiling point (° C.) | 174 | 174 | 174 | 174 |
| | | Charged amount (g) | 25.00 | 12.50 | 1.00 | 1.00 |
| | | Charged amount (mol) | 0.223 | 0.111 | 0.009 | 0.009 |
| | Charged mass ratio [alcohol compound/thiourethane resin] | | 1.05 | 7.02 | 1.08 | 1.01 |
| | Charged amount (mmol) of alcohol compound per 1 g of thiourethane resin | | 8.1 | 53.9 | 8.3 | 8.3 |
| | Charged equivalent [alcohol compound/thiourethane resin] | | 1.5 | 10.0 | 1.5 | 1.5 |
| | Reaction solvent | | none | none | none | none |
| | Reaction temperature | | 160° C. | 160° C. | 160° C. | 160° C. |
| | Reaction time | | 5 hours | 7 hours | 7 hours | 5 hours |
| Separation step | Separation solvent | | benzyl alcohol (100 g) | benzyl alcohol (100 g) | benzyl alcohol (100 g) | benzyl alcohol (100 g) |
| | 28% sodium methoxide/methanol | Charged amount (g) | 44.45 | 33.41 | 31.06 | 31.72 |
| | | Charged amount (mol) | 0.230 | 0.173 | 0.161 | 0.164 |
| Target material | Polythiol composition | Polythiol component | A1 | A1 | A2 | A2 |
| | | Yield (g) | 13.1 | 9.8 | 10.2 | 10.1 |
| | | SH value (mmol/g) | 10.4 | 11.9 | 11.2 | 11.4 |
| | | Purity of polythiol component (%) | 66.8 | 82.2 | 95.8 | 91.9 |

As shown in Table 8, in Examples 209 to 217 where a thiourethane resin was reacted with an alcohol compound in the presence of a tertiary amine compound, a polythiol composition having an excellent purity of the polythiol component A1 or A2 was obtained.

Example 301

(Production of Formed body Containing Thiourethane Resin)

A formed body containing a thiourethane resin was obtained by performing the same operations as in the production of a formed body in Reference Production Example 201, except that the polythiol composition X1 (49.2 parts by mass) was changed to the polythiol composition (49.2 parts by mass) obtained in Example 201.

The thus obtained formed body had favorable transparency and favorable outer appearance with no distortion.

Performance tests were conducted for the thus obtained formed body.

The results thereof are shown in Table 9.

The items of the performance tests were optical properties (refractive index and Abbe number), heat resistance, and specific gravity d. These items were tested by the following respective test methods.

Refractive index (ne) and Abbe number (ve): using a Pulfrich refractometer KPR-30 manufactured by Shimadzu Corporation, the refractive indices (ne, nF', and nC') at 20° C. were measured at wavelengths of 546.1 nm (mercury e-line), 480.0 nm (Cd F'-line), and 643.9 nm (Cd C'-line), respectively, and the refractive index (ne) and the Abbe number (ve) were determined based on the measurement results.

Heat resistance: using a thermomechanical analyzer TMA-60 manufactured by Shimadzu Corporation, the glass transition temperature (Tg) was measured by a TMA penetration method (load: 50 g, pin tip: 0.5 mmφ, heating rate: 10° C./min), and the measured value was used as an index of the heat resistance.

Specific gravity d: measured at 20° C. by Archimedes' method.

The same performance tests were conducted also for each of the formed bodys obtained in Reference Production Examples 201 and 202.

The results thereof are shown in Table 9.

Examples 302 to 319

The same operations as in Example 301 were performed, except that the polythiol composition obtained in Example 201 (49.2 parts by mass) was changed to the respective polythiol compositions shown in Table 9.

The results thereof are shown in Table 9.

In Table 9, "Composition X1" and "Composition X2" mean the polythiol composition X1 used in Reference Production Example 201 and the polythiol composition X2 used in Reference Production Example 202, respectively, and "Example 201" to "Example 217" mean the respective polythiol compositions obtained in Examples 201 to 217.

cut powder of an acrylic resin; and
cut powder of an episulfide resin.

These cut powders were all obtained by cutting the periphery of an eyeglass lens.

TABLE 9

| | Polymerizable composition (parts by mass in parentheses) | | | Performance test of formed body | | | |
|---|---|---|---|---|---|---|---|
| | | | | Optical properties | | Heat | |
| | Isocyanate compound | Polythiol composition | | Refractive index | Abbe number | resistance Tg (° C.) | Specific gravity d |
| Reference Production Example 201 | XDI (50.8) | Composition X1 (49.2) | — | 1.668 | 31 | 96 | 1.36 |
| Reference Production Example 202 | XDI (52) | Composition X2 (48) | — | 1.665 | 32 | 85 | 1.35 |
| Example 301 | XDI (50.8) | Example 201 (49.2) | — | 1.655 | 31 | 70 | 1.33 |
| Example 302 | XDI (50.8) | Example 202 (49.2) | — | 1.655 | 32 | 74 | 1.32 |
| Example 303 | XDI (50.8) | Example 203 (49.2) | — | 1.660 | 31 | 82 | 1.35 |
| Example 304 | XDI (50.8) | Example 204 (49.2) | — | 1.663 | 31 | 86 | 1.36 |
| Example 305 | XDI (50.8) | Example 205 (49.2) | — | 1.663 | 31 | 86 | 1.32 |
| Example 306 | XDI (50.8) | Example 206 (49.2) | — | 1.668 | 32 | 96 | 1.35 |
| Example 307 | XDI (50.8) | Example 207 (49.2) | — | 1.664 | 32 | 88 | 1.35 |
| Example 308 | XDI (50.8) | Example 208 (49.2) | — | 1.668 | 31 | 95 | 1.36 |
| Example 309 | XDI (50.8) | Example 203 (24.6) | Composition X1 (24.6) | 1.665 | 31 | 91 | 1.34 |
| Example 310 | XDI (50.8) | Example 203 (13.1) | Composition X1 (36.1) | 1.666 | 32 | 96 | 1.34 |
| Example 311 | XDI (50.8) | Example 203 (5.1) | Composition X1 (44.1) | 1.668 | 32 | 98 | 1.34 |
| Example 312 | XDI (50.8) | Example 209 (49.2) | — | 1.666 | 31 | 100 | 1.37 |
| Example 313 | XDI (50.8) | Example 210 (49.2) | — | 1.668 | 31 | 97 | 1.36 |
| Example 314 | XDI (50.8) | Example 211 (49.2) | — | 1.666 | 32 | 94 | 1.37 |
| Example 315 | XDI (50.8) | Example 212 (49.2) | — | 1.669 | 30 | 96 | 1.37 |
| Example 316 | XDI (50.8) | Example 213 (49.2) | — | 1.668 | 31 | 101 | 1.37 |
| Example 317 | XDI (50.8) | Example 214 (49.2) | — | 1.667 | 31 | 94 | 1.37 |
| Example 318 | XDI (52.0) | Example 216 (48.0) | — | 1.664 | 32 | 85 | 1.36 |
| Example 319 | XDI (52.0) | Example 217 (48.0) | — | 1.663 | 32 | 83 | 1.35 |

As shown in Table 9, the formed bodys of these Examples, which were produced using the polythiol compositions of the respective Examples (i.e., the polythiol compositions obtained by reacting a polyurethane resin powder, which was generated by cutting the formed body of Reference Production Example 201 or 202, and an alcohol compound with each other in the presence of a tertiary amine compound), had performance comparable to those of the formed bodys of Reference Production Example 201 or 202.

Example 401

A resin mixture containing the followings was prepared:
cut powder of a thiourethane resin (MR-10, manufactured by Mitsui Chemicals, Inc.);
cut powder of a polycarbonate resin;
cut powder of a polyallylcarbonate resin;

The thus prepared resin mixture was charged into a four-necked flask equipped with a stirrer and a condenser, and toluene was added thereto.

Subsequently, monoethanolamine was charged into the flask as a decomposition agent of the thiourethane resin, and the resulting mixture was heated to a temperature of from 60° C. to 110° C. and stirred to obtain a reaction mixture containing a polythiol composition.

This reaction mixture was cooled to room temperature and then filtered to recover a toluene layer containing the polythiol composition as a filtrate. This polythiol composition is a decomposition product of the thiourethane resin that was generated by monoethanolamine (decomposition agent). It is noted here that a filtration residue was used in the below-described Example 402.

The toluene layer (filtrate) was washed with hydrochloric acid and water in this order to remove the decomposition agent and water-soluble unwanted matters from the toluene layer.

Next, the amount of the polythiol composition in the toluene layer was checked by iodometric titration. Then, an equivalent amount of sodium methoxide was added to the toluene layer to form a sodium salt of the polythiol composition, and extraction was subsequently performed with water to obtain a water extract containing the sodium salt of the polythiol composition. The thus obtained water extract was washed with toluene to remove toluene-soluble components from the water extract.

Thereafter, this water extract was neutralized with hydrochloric acid to convert the sodium salt of the polythiol composition back to the polythiol composition to obtain an aqueous liquid containing the polythiol composition.

The thus obtained aqueous liquid was extracted by addition of toluene to obtain an extract (toluene layer) containing the polythiol composition.

The thus obtained extract was washed with water and then concentrated. The resulting concentrate was dried to remove the organic solvent and low-boiling-point components, whereby a polythiol composition that can be used as a raw material of a thiourethane resin for an eyeglass lens was obtained.

Example 402

The filtration residue (i.e., toluene-insoluble component) obtained by filtration of the reaction mixture in Example 401 was charged into a four-necked flask. Subsequently, N-(2-aminoethyl)ethanolamine was added thereto, followed by heating at 135° C. or higher. The resulting product was analyzed by gas chromatography (GC), as a result of which the product was confirmed to contain a mixture of m-xylenediamine and monoethanolamine.

This mixture was transferred to a distillation apparatus and purified by distillation, whereby m-xylenediamine that can be used as a raw material of a thiourethane resin for an eyeglass lens was obtained.

In this Example 402, it is believed that the filtration residue obtained as a raw material contained a polyurea compound as a decomposition product of the thiourethane resin that was generated by monoethanolamine (decomposition agent), and that m-xylenediamine, which is a polyamine compound, was generated by a reaction between this polyurea compound and N-(2-aminoethyl)ethanolamine.

Comparative Example 401

A comparative resin mixture (i.e., a resin mixture containing no thiourethane resin) containing the followings was prepared:
cut powder of a polycarbonate resin;
cut powder of an acrylic resin;
cut powder of a polyallylcarbonate resin; and
cut powder of an episulfide resin.

These cut powders were all obtained by cutting the periphery of an eyeglass lens.

The thus prepared comparative resin mixture was charged into a four-necked flask equipped with a stirrer and a condenser, and toluene was added thereto.

Subsequently, monoethanolamine was charged into the flask as a decomposition agent, followed by heating to a temperature of from 60° C. to 110° C. and stirring. The thus obtained mixture did not contain any polythiol composition.

Comparative Example 402

The mixture obtained in Comparative Example 401 was cooled to room temperature and then filtered to recover a filtration residue.

Subsequently, N-(2-aminoethyl)ethanolamine was added to the thus collected filtration residue, followed by heating at 135° C. or higher. The resulting product was analyzed by gas chromatography (GC), as a result of which m-xylenediamine was not confirmed.

From the above-described results of Examples 401 and 402, it is seen that a polythiol composition and a polyamine compound, which are thiourethane resin raw materials, can each be collected by chemically decomposing a resin mixture containing a thiourethane resin.

The disclosures of Japanese Patent Application No. 2020-017717 filed on Feb. 5, 2020, Japanese Patent Application No. 2020-017718 filed on Feb. 5, 2020, Japanese Patent Application No. 2020-086644 filed on May 18, 2020, Japanese Patent Application No. 2020-086645 filed on May 18, 2020, and Japanese Patent Application No. 2020-192461 filed on Nov. 19, 2020 are hereby incorporated by reference in their entirety.

All the documents, patent applications and technical standards that are described in the present specification are hereby incorporated by reference to the same extent as if each individual document, patent application or technical standard is concretely and individually described to be incorporated by reference.

The invention claimed is:

1. A method of producing a polythiol composition, the method comprising:
   reacting a thiourethane resin and an amine compound with each other to generate a polythiol composition, wherein the reacting comprises obtaining a reaction mixture comprising the polythiol composition; and
   separating the polythiol composition from the reaction mixture comprising the polythiol composition,
   wherein the amine compound is an amine compound of 300 or less in molecular weight, which comprises at least one of an amino group or a monoalkylamino group, and has a total number of amino groups and monoalkylamino groups of 1 or 2.

2. The method of producing a polythiol composition according to claim 1, wherein the thiourethane resin and the amine compound are reacted with each other under a temperature condition of from 70° C. to 140° C.

3. The method of producing a polythiol composition according to claim 1, wherein the separating comprises:
   filtering the reaction mixture comprising the polythiol composition to obtain a filtrate comprising the polythiol composition;
   acid washing the filtrate comprising the polythiol composition; and
   separating the polythiol composition from the thus acid-washed filtrate.

4. The method of producing a polythiol composition according to claim 1, wherein the separating comprises:
   filtering the reaction mixture comprising the polythiol composition to obtain a filtrate comprising the polythiol composition;
   adding an alkali metal-containing base and then water to the filtrate comprising the polythiol composition to perform extraction and thereby obtain a water extract comprising an alkali metal salt of the polythiol composition;

adding an acid to the water extract comprising an alkali metal salt of the polythiol composition to obtain an aqueous liquid comprising the polythiol composition;

adding a hydrocarbon compound having from 5 to 12 carbon atoms as an extraction solvent to the aqueous liquid comprising the polythiol composition to perform extraction and thereby obtain an extract comprising the polythiol composition; and separating the polythiol composition from the extract comprising the polythiol composition.

5. The method of producing a polythiol composition according to claim 1, wherein the polythiol composition comprises at least one selected from the group consisting of:

4-mercaptomethyl-1,8-dimercapto-3,6-dithiaoctane;
4,8-dimercaptomethyl-1,11-dimercapto-3,6,9-trithiaundecane;
4,7-dimercaptomethyl-1,11-dimercapto-3,6,9-trithiaundecane;
5,7-dimercaptomethyl-1,11-dimercapto-3,6,9-trithiaundecane;
pentaerythritol tetrakis (2-mercaptoacetate);
pentaerythritol tetrakis (3-mercaptopropionate);
2,5-dimercaptomethyl-1,4-dithiane;
bis(2-mercaptoethyl) sulfide; and
diethylene glycol bis (3-mercaptopropionate).

6. The method of producing a polythiol composition according to claim 1, which is a method of producing a polythiol composition for the production of an optical material.

* * * * *